(12) United States Patent
Sakamoto

(10) Patent No.: US 6,333,993 B1
(45) Date of Patent: Dec. 25, 2001

(54) METHOD AND DEVICE OF OBJECT DETECTABLE AND BACKGROUND REMOVAL, AND STORAGE MEDIA FOR STORING PROGRAM THEREOF

(75) Inventor: Shizuo Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/166,213

(22) Filed: Oct. 5, 1998

(30) Foreign Application Priority Data

Oct. 3, 1997 (JP) .................................................. 9-270684

(51) Int. Cl.[7] ..................................................... G06K 9/34

(52) U.S. Cl. ........................... 382/173; 358/464; 358/466

(58) Field of Search ................................... 382/171, 172, 382/173, 174, 176, 180, 270; 385/455, 456, 462, 464, 465, 466

(56) References Cited

U.S. PATENT DOCUMENTS

| | | | |
|---|---|---|---|
| 4,741,046 | * | 4/1988 | Matsunawa et al. ................. 358/464 |
| 4,916,744 | * | 4/1990 | Watanable ............................ 358/464 |
| 5,003,616 | * | 3/1991 | Orita et al. ........................... 358/464 |
| 5,268,967 | * | 12/1993 | Jang et al. ........................... 382/132 |
| 5,282,061 | * | 1/1994 | Farrel .................................. 358/464 |
| 5,555,318 | * | 9/1996 | Ito et al. .............................. 382/468 |
| 5,748,775 | * | 5/1998 | Tsuchikawa et al. ................ 382/171 |
| 5,982,943 | * | 11/1999 | Hsu et al. ............................ 382/270 |

FOREIGN PATENT DOCUMENTS

| | | |
|---|---|---|
| 2-54267 | 2/1990 | (JP) . |
| 2-206882 | 8/1990 | (JP) . |
| 2-206885 | 8/1990 | (JP) . |
| 5-151471 | 6/1993 | (JP) . |
| 6-195461 | 7/1994 | (JP) . |
| 8-297742 | 11/1996 | (JP) . |

OTHER PUBLICATIONS

"Television Image Rejection Engineering Handbook", Television Society, p. 704, 1990.

"Image Analysis Handbook" (Supervision of M. Takagi, Y. Shimoda) , Tokyo University Publication Meeting, pp. 485–491, 502–505, and 550–564, 1991.

"Encyclopaedia of Mathematical Sciences", published by Maruzen Co., Ltd., p. 495, 1991.

(List continued on next page.)

Primary Examiner—Jon Chang
Assistant Examiner—Jingge Wu
(74) Attorney, Agent, or Firm—Foley & Lardner

(57) ABSTRACT

A method and device for an object detectable and background removal and storage media for storing program thereof enable automatic detection of an object to be executed minutely and high precisely for outline. A sectional image statistic calculation measure calculates a mean value and standard deviation of characteristic value of brightness and so forth of the sectional image with input image being subjected to division processing into sectional image. A background sectional image selection measure causes a sectional image whose standard deviation is the smallest value in the sectional images to be taken as the sectional image with high probability of including only the background. A background statistic estimation measure investigates the sectional image including only the background and another sectional image under the relationship between the mean value and the standard deviation. This investigation is implemented in terms of whole sectional images, a threshold generation object detectable and background removal measure discriminates the background and the detected target object based on predetermined calculation procedure. For instance, a second threshold is in use, which is obtained in such a way that the standard deviation multiplied by constant number given beforehand from the mean value is added thereto.

16 Claims, 20 Drawing Sheets

OTHER PUBLICATIONS

Takeuchi, Takashi, "Mathematical Statistics", published by Toyo Keizai, pp. 29 and 361, 1963.

"New Edited Color Science Handbook" (Ed. by Japan Congress), Tokyo University Publication Meeting, pp. 83–146, 1980.

* cited by examiner

FIG. 7

| SECTIONAL IMAGE 12 | SECTIONAL IMAGE 13 | SECTIONAL IMAGE 14 |
|---|---|---|
| SECTIONAL IMAGE 15 | SECTIONAL IMAGE 11 | SECTIONAL IMAGE 16 |
| SECTIONAL IMAGE 17 | SECTIONAL IMAGE 18 | SECTIONAL IMAGE 19 |

FIG. 20

| | | | |
|---|---|---|---|
| | PERIPHERAL PIXEL 30 | PERIPHERAL PIXEL 31 | PERIPHERAL PIXEL 32 |
| | PERIPHERAL PIXEL 33 | PERIPHERAL PIXEL 29 | PERIPHERAL PIXEL 34 |
| | PERIPHERAL PIXEL 35 | PERIPHERAL PIXEL 36 | PERIPHERAL PIXEL 37 |
| | | | |

METHOD AND DEVICE OF OBJECT DETECTABLE AND BACKGROUND REMOVAL, AND STORAGE MEDIA FOR STORING PROGRAM THEREOF

BACKGROUND OF THE INVENTION

The present invention relates to method and device of an object detectable and background removal and storage media for storing therein a program thereof for the sake of obtaining of an object with a background removed from an image. More to particularly this invention relates to method and device of object detectable and background removal and storage media for storing program for the sake of obtaining of an object from the image having virtually even background.

DESCRIPTION OF THE RELATED ART

A method and a device of object detectable and background removal, and a storage media for storing program thereof is applicable to various field of application. The object detectable and background removal method is based on a technology to isolate an object from an image with a virtually even background. The object is taken a photograph with the exception of a background area. FIG. 1 is a view showing one example of a processing target image. In the input image signal 1 of FIG. 1, a target object 3 whose photograph is taken is shown in virtually even background area 2. If it is capable of being isolated completely only the target object 3 while removing the background area 2, it is capable of being applied to the image composition technique in the field of computer vision instead of the object recognition processing, the robot visual sensation, or the chromakey technique.

In the television program, a scene in which a person is mated with another background is often televised. The chromakey technique which is one of techniques for cutting a target object out of the background is in use for the television station frequently. The chromakey is described in accordance with the literature: "Television Image Rejection Engineering Handbook" (Television Society, pp. 704, 1990).

One of the techniques for isolating the target object to be removed the background therefrom is described in accordance with the literature: Japanese Patent Application Laid-Open No. HEI 2-206885 "Image Processing Device". In the present literature, by way of the processing target, there is supposed that the image is composed of the background having intermediate brightness, and the object which comes to be target of cutting consists of either a brighter area than the background or a darker area than the background. The threshold which is established by some way or other is utilized, subsequently, implementing the threshold processing for isolating the pixel with brightness value beyond the threshold, thus isolating the pixel which is brighter than the background. Similarly, by virtue of the threshold processing of utilizing the threshold established separately, thus isolating the darker pixel than the back ground. Thus, it is capable of being isolated the whole object by synthesizing the results of the two threshold processing.

There is described one of the techniques for calculating stably the characteristic quantity such as the center of gravity location or the area thereof from the target object isolated out of the background. It is described in accordance with the literature: the Japanese Patent Publication No. HEI 4-116778 "Image Processing Method".

In general, there mostly exists so called shading which is a gentle slope of brightness value in the background. In most case, the brightness value of the object also has various values, and fluctuates. In these cases, it is difficult to detect a boundary line between the background and the object accurately over the whole areas by one kind of the threshold. Accordingly, in the present literature, the user establishes two kind thresholds. One threshold is capable of detecting the target object accurately and another threshold is capable of detecting the background area accurately. The user sets these two kind of thresholds interactively to be binarized, and in terms of the pixel having intermediate value in between the two thresholds, there is allocated the value corresponding to the intermediate value. Due to the use of this method, even though the boundary line is incapable of being obtained accurately, it is capable of obtaining the center of gravity location of the target object stably.

Another binarization method is described referring to the literature: "Image Analysis Handbook" (Supervision of M. Takagi, Y. Shimoda, Tokyo University Publication Party, pp 502–505, 1991).

In the method introduced thus far, the user determined the threshold applied to whole area of picture in such away that the user set the threshold interactively while watching the image of the processing result. As shown in the literature, there is proposed a p-tile way, a method of Otu, or a method of Kittler by way of automatic determining method of the threshold. For instance, the method of Otu is so called as a discriminant analysis way in that on the assumption that a gray level histogram of an image is constituted by the sum of two normal distributions, this is the method for obtaining the threshold enabling them to be separated completely. At the same time, it is capable of calculating a degree of separation which is in use for measuring scale that it is capable of judging two distributions are separated to what degree, and that it is capable of judging whether or not bimodality of the histogram is high. Namely, the degree of separation is capable of being utilized by way of determination scale for determining whether or not the threshold being obtained is appropriate.

However, as described above, generally, the shading exists in the background mostly, accordingly there is a limit in the binarization method which sets the same threshold on the whole picture. Now, there is a method of a dynamic threshold processing for calculating the most suitable threshold in every pixel. According to the literature, the dynamic threshold processing is classified into two methods of a movement mean method and a sectional image division method.

The movement mean method is a simple method that when it causes brightness value of some pixel to be binarized, obtaining the mean value of the sectional image including the neighborhood thereof to be taken as the threshold.

The sectional image division method determines automatically the most suitable threshold in every respective sectional images while dividing the whole picture into a plurality of sectional images. The method causes the determined thresholds to be connected smoothly, thus constituting surface of the threshold over the whole picture so that the image is binarized.

There is described one example of the sectional image division method referring to the literature. Firstly, the image is divided into small area sectional images. FIG. 2 is a typical view. When the input image signal 1 shown in FIG. 1 is inputted, dividing the inputted image into sectional image signals 4, 5, 6, 7, 8 and so forth such that these sectional image signals overlap one another as shown in FIG. 2. Within the respective sectional image signals, the threshold and the degree of separation are calculated at this position while applying the binarization method of Otu. In the sectional image whose degree of separation comes into high rather than value set beforehand, since there is included both of the background and the target object, thus being judged that appropriate threshold is obtained. The appropriate threshold is adopted by way of the threshold value in the pixel of the center position of the sectional image, while in the another position of the pixel, the thresholds are connected smoothly, thus surface of the threshold of the whole picture is determined. By virtue of the above described procedure, it is capable of obtaining appropriate threshold over the whole picture, thus enabling suitable binarization result to be obtained even though there exists the shading or the like.

There are two problems in the chromakey technique that it should be prepared the background constituted by peculiar color beforehand and it is incapable of being used clothing and so forth whose color are identical with background color. The method of the literature: Japanese Patent Application Laid-Open No. HEI 2-206885 is incapable of being applied to the case where the target object has brightness value which bears a close resemblance to the background, because the target object should be taken photograph by way of the brightness value in which the target object is always brighter than the background or the target object is darker than the background. The method of the literature: Japanese Patent Publication No. HEI is not intended to obtain boundary in between the background and the target object accurately from the beginning, accordingly, it is incapable of utilizing in the case where accurate boundary line is required.

With respect to the method which applies one threshold to the whole picture, it is difficult to obtain satisfactory boundary line in most case, if shading exists in the background or in cases where brightness value of the object or color of the object is not of simplicity. As is referred to in the literature: Japanese Patent Publication No. HEI 4-116778, or in the literature: "Pixel Position Analysis Handbook".

The object of the movement mean method or the sectional image division method of the dynamic threshold processing is to apply to such the case. In the movement mean method or the sectional image division method of the dynamic threshold processing, it is necessary to set a presupposition that the background and the object which are constituted by one kind of brightness value or color in the position of the pixel should be taken photography. For this reason, it is incapable of applying the method to the case where the target object is constituted by a plurality of brightness values or colors. For instance, in the politics section or the sports section of the news paper, the photograph of the large number of persons faces appear therein while making them even so as to come to be the same position of faces and size with the identical background. When it causes such the space to be edited, it is necessary to remove original background precisely to contours because the origin of the photography of the face is taken photography with respective different background or different size. In most of the cases the background is even, however it is incapable of being estimated beforehand because the shading exists, the color of the hair or the skin, further clothes of the person are not even. In particular, it is difficult to separate between whitish background and a long-sleeved sport shirt, accordingly, it is extremely difficult to detect automatically the person image accurately to contours by the conventional method. Under the condition, a man of experience implements the work for removing the background by hand-work.

There is one object which is taken photograph under the background in which the shading exists uniformly, and which consists of single or a plurality of brightness or color. There is the other object which has brightness and color extremely nearly equal to the background. Namely, there is the problem that it is extremely difficult to detect such the objects precisely to contour with the exception of someone else.

SUMMARY OF THE INVENTION

In view of the foregoing, it is an object of the present invention to provide method and device of an object detectable and background removal and a storage medium for storing program which enable an object to be automatically detected to isolate precisely and accurately as far as the contours.

According to a first aspect of the present invention, for achieving the above-mentioned object, there is provided a method of an object detectable and background removal for enabling an object to be automatically detected minutely and accurately as far as an outline comprising the steps of taking an image consisting both of a background and an object of detection target to be an input image by way of an input process of the image, selecting a sectional image including only the background while dividing the input image into the sectional image by way of a background only sectional image selection process, estimating a background on the input image based on a sectional image including the background by way of a background estimation process, and comparing the estimated background with the input image by way of a comparison process, wherein the method causes the object of detection target to be isolated from the input image.

In the first aspect of the present invention, a method of an object detectable and background removal is that a location of a pixel which is constituted by a background and an object of detection target is inputted, subsequently, a sectional image including only a background is selected while dividing the inputted location of the pixel into sectional images, then, estimating a background on an input image based on a sectional image including the background concerned, before comparing the estimated background with the above input image, thus isolating only an object of detection target.

Namely, in the first aspect of the present invention, a method of an object detectable and background removal firstly selects a sectional image including only a background while dividing image into sectional images, before estimating backgrounds in the whole images based on the sectional image concerned, thus enabling the background and unknown object for example, an object with brightness color distribution to be separated to detect accurately due to estimation of the background in the whole image based on the sectional image concerned.

In general, in order to separate accurately two things of a background and an object of detection target, it is necessary to find as precise as possible of a distribution of characteristic value such as brightness, color, edge and so forth which appear on image by way of a background or an object. In the first aspect of the present invention, a sectional image including only a background is selected, before a background in whole picture is estimated by using a technique of an interpolation and an extrapolation from the sectional image.

According to a second aspect of the present invention, there is provided a method of object detectable and background removal for enabling an object to be automatically detected minutely and accurately as far as an outline comprising the steps of, taking an image consisting both of a virtually even background and an object of detection target to be an input image by way of an input process of the image, calculating a statistic in every respective sectional images while dividing the input image into sectional images by way of a statistic calculation process, selecting a sectional image including only the background based on the statistic calculated in the statistic calculation process by way of a background only sectional image selection process, estimating a statistic of the whole picture from a statistic of a sectional image including only the background by way of a statistic estimation process, determining a threshold in the whole picture from the estimated statistic by way of a threshold determination process, and comparing the threshold determined in the whole picture with the input image by way of a comparison process, wherein the method causes the object of detection target to be isolated from the input image.

In the second aspect of the present invention, an object detectable and background removal method calculates a statistic in every respective sectional images while dividing the input image into sectional images with an image constituted by virtually even background and an object of detection target as inputs, subsequently determining a threshold in the whole picture from the statistic calculate previously, so that it causes a detection target to be isolated while comparing the determined threshold in the whole picture with the above input image.

According to a third aspect of the present invention, there is provided a method of object detectable and background removal for enabling an object to be automatically detected minutely and accurately as far as an outline, wherein said statistic calculation process consists of a sectional image division process dividing the input image into sectional images and a mean value and a standard deviation calculation process calculating a mean value and a standard deviation of a prescribed characteristic value of the divided sectional image.

In the second aspect of the invention, the object detectable and background removal method calculates a statistic in every respective sectional images while dividing the input image into sectional images, in the process of the second aspect concerned, in addition thereto, for instance, the object detectable and background removal method of a third aspect causes a mean value and a standard deviation of the brightness of a sectional image to be calculated while dividing the input image into sectional images.

Namely, in the third aspect of the present invention, an object detectable background removal method divides the input image into sectional images, subsequently, it is a characteristic of the method to calculate a mean value and a standard deviation using characteristic information of pixels within the respective sectional images. As shown in FIG. 1, when an input image signal 1 which is constituted from a background area 2 and a target object 3 is inputted to a device of the invention of the third aspect, firstly, dividing the input image signal 1 into sectional images 1-A, 1-B, ..., 9-I as shown in FIG. 4. Then, it causes a mean value and a standard deviation of brightness and so forth to be calculated in a location of the sectional image in every respective sectional image signals. For instance, in FIG. 4, an area of sectional image 1-A is mentioned as below mark (1) with number of row and column arranged.

$$C_{1-A} \qquad (1)$$

A brightness value for instance, a spot of coordinates (x, y) is mentioned as following (2).

$$I_{x,y} \qquad (2)$$

At this time, for instance, a mean value of the brightness in the sectional image i-p is defined with equation (3). Here, a denominator of the equation (3) is an area of the sectional image.

$$\mu_{i\text{-}p} = (\Sigma_{x,y \in C_{i\text{-}p}} I_{x,y}) / (\Sigma_{x,y \in C_{i\text{-}p}} 1) \qquad (3)$$

A standard deviation is defined with a equation (4) utilizing the mean value.

$$\sigma_{i\text{-}p} = \sqrt{\{\Sigma_{x,y \in C_{i\text{-}p}} (I_{x,y} - \mu_{i\text{-}p})^2\} / \{\Sigma_{x,y \in C_{i\text{-}p}} 1\}} \qquad (4)$$

The mean value and the standard deviation are calculated over the whole sectional images based on the equations (3), and (4).

Further, in the third aspect of the present invention, a geometrical mean or a harmonic mean or median or the like which are described in the literature: "Modern Mathematical Science Dictionary" published by Maruzen Co., Ltd, 1991 pp. 495 are capable of being used instead of an arithmetical mean shown in the above equation (3). Similarly, a statistic of an absolute deviation or a quarter deviation or the like are capable of being used instead of the standard deviation shown in the equation (4) or a distribution represented by square thereof.

Furthermore, as shown in FIG. 4, the sectional images are arranged in tile-shaped configuration, however as shown in FIG. 2, the sectional images are superimposed with each other in part thereof, or the sectional images are arranged while leaving a space therebetween. All of these configurations are of effectiveness by way of the third aspect of the present invention.

According to fourth aspect of the present invention, there is provided a method of an object detectable and background removal for enabling an object to be automatically detected minutely and accurately as far as an outline, wherein the sectional image selection process judges a sectional image whose standard deviation of the prescribed characteristic value is of the smallest value as a sectional image whose probability of including only a background is high, and judges a sectional image whose difference of comparison is less than prescribed threshold to be a sectional image including only the background while comparing a standard deviation of the prescribed characteristic value in another sectional image with a sectional image whose probability of including only the background is high.

In the third aspect of the invention, the object detectable and background removal method selects the sectional image including only the background based on the calculated statistic, in the process of the third aspect concerned, in addition thereto, the object detectable and background removal method of the fourth aspect judges a sectional image whose standard deviation of a characteristic value such as brightness and so forth is of the smallest value to be a sectional image whose probability of including only a background is high, subsequently, comparing for instance, a standard deviation of the brightness in the another sectional image with a standard deviation of the sectional image whose probability of including the background is high, thus judging a sectional image whose difference of the standard deviations therebetween is less than the threshold to be a sectional image including only a background.

Namely, in the fourth aspect, when the method causes a sectional image including only a background to be selected from sectional images, for instance, selecting a sectional image whose standard deviation of the brightness is of the most smallest value, subsequently, selecting sectional images whose standard deviations bear resemblance to those of the sectional image selected previously to be sectional images including only backgrounds. On the images inputted thereto, since backgrounds have virtually even distribution, it is capable of being expected that a sectional image including only a background has a small standard deviation. For this reason, a sectional image whose probability of including only a background is obtained due to a condition that a standard deviation is of the most smallest value. For instance, in FIG. 4, the standard deviation of the sectional image 1-A is of the most smallest value, thus the sectional image 1-A is judged to be a sectional image whose probability of including only a background is high. The standard deviation of the sectional image 1-A is set to $\sigma_{bg}$. There is implemented a judgment whether or not another sectional image i-p includes only a background in such a way that it is judged due to a threshold processing of a equation (5) using a standard deviation of the sectional image i-p, the standard deviation of the sectional image 1-A, and two constants η.

$$\eta\sigma - \sigma_{bg} \leq \sigma_{i-p} \leq \eta\sigma + \sigma_{bg} \tag{5}$$

Here, $\eta\sigma-$ is a constant given beforehand which is more than 0 and until 1, further, $\eta\sigma+$ is a constant value given beforehand which is more than 1.

For instance, with respect to a mean value of the brightness, when shading is given on a background, even though a sectional image includes only a background, a mean value of the brightness is of the different value according to a location on an image, thus the mean value of the brightness does not qualify for the judgment whether or not a sectional image includes only a background. The equation (5) is described by way of one example of a threshold processing, however, for instance, a equation (6) by using constant δ to be more than 0 and so forth are capable of constituting effective invention in conformity with a target by defining variously in terms of the threshold processing.

$$\sigma_{bg} - \delta\sigma - \leq \sigma_{i-p} \leq \sigma_{bg} + \delta\sigma + \tag{6}$$

FIG. 5 is an example of selection result of a sectional image including only a background while giving light hatching, thus showing simultaneously an object of detection target 3. A group of sectional images which is image with the exception of an object of detection target 3 and which is not influenced by noise largely is selected to be sectional images including only a background.

According to a fifth aspect of the present invention, there is provided a method of object detectable and background removal for enabling an object to be automatically detected minutely and accurately as far as an outline, wherein the sectional image selection process selects sectional images in such a way that it causes the sectional images of the specified number in order of the smaller number of a standard deviation of the prescribed characteristic value to be selected, thus taking such sectional images to be the sectional image whose probability of including only the background is high.

In the fourth aspect of the present invention, the object detectable and background removal method selects the sectional image whose probability of including only a background is high, in the process of the fourth aspect concerned, in addition thereto, the object detectable and background removal method of the fifth aspect selects sectional images in answer to the specified numbers in order of smaller value of a standard deviation of the brightness to be a sectional image whose probability of including only a background is high.

According to a sixth aspect of the present invention, there is provided a method of object detectable and background removal for enabling an object to be automatically detected minutely and accurately as far as an outline, wherein the sectional image selection process selects sectional images in such a way that it causes the sectional image having the most nearest value to the standard deviation of the prescribed characteristic value instructed beforehand to be selected by way of the sectional image whose prescribed characteristic value of including only the background is high.

In the fourth aspect of the invention, the object detectable and background removal method selects a sectional image whose probability of including only a background is high, in the process of the fourth aspect concerned, in addition thereto, the object detectable and background removal method of the sixth aspect selects a sectional image whose standard deviation is of the most nearest value of the standard deviation of the brightness to be a sectional image whose probability of including only a background is high.

According to a seventh aspect of the invention, there is provided a method of object detectable and background removal for enabling an object to be automatically detected minutely and accurately as far as an outline, wherein the sectional image selection process selects sectional images in such a way that it causes the sectional image by the number specified in order of the nearer number to the standard deviation of the prescribed characteristic value instructed beforehand to be selected by way of the sectional image whose prescribed characteristic value of including only the background is high.

In the fourth aspect of the invention, the object detectable and background removal method selects a sectional image whose probability of including only a background is high, in the process of the fourth aspect concerned, in addition thereto, the object detectable and background removal method of the seventh aspect selects sectional images in answer to the specified numbers in order of nearer value of standard deviation of the brightness instructed beforehand to be a sectional image whose probability of including only a background is high.

According to an eighth aspect of the invention, there is provided a method of object detectable and background removal for enabling an object to be automatically detected minutely and accurately as far as an outline, wherein the sectional image selection process selects sectional images in such a way that it causes the sectional image having the most nearest value both to the mean value and the standard deviation of the prescribed characteristic value instructed beforehand to be selected by way of the sectional image whose probability of including only the background is high.

In the fourth aspect of the invention, the object detectable and background removal method selects a sectional image whose probability of including only a background is high, in the process of the fourth aspect concerned, in addition thereto, the object detectable and background removal method of the eighth aspect selects a sectional image whose mean value and standard deviation are the most nearest value of the mean value and the standard deviation of the brightness instructed beforehand to be a sectional image whose probability of including only a background is high.

Namely, the eighth aspect of the invention specifies for instance, not only a standard deviation of the brightness but also a mean value thereof beforehand when selecting a sectional image whose probability of including only a background is high in comparison with the seventh aspect. If shading is given on a background, it is difficult to utilize a mean value of the brightness and so forth, lastly when selecting a sectional image including only a background. However, when there is selected a sectional image whose probability of including only a background coming to be a criterion of the selection, namely, when selecting a sectional image including only a typical background, the eighth aspect comes to be an effective invention in conformity with a target.

According to a ninth aspect of the invention, there is provided a method of object detectable and background removal for enabling an object to be automatically detected minutely and accurately as far as an outline, wherein the sectional image selection process selects sectional images in such a way that it causes the sectional images of the number specified in order of the nearer value to the mean value and the standard deviation of the prescribed characteristic value instructed beforehand to be selected by way of the sectional image whose probability of including only the background.

In the fourth aspect of the invention, the object detectable and background removal method selects the sectional image whose probability of including a background, in the process of the fourth aspect concerned, in addition thereto, the object detectable and background removal method of the ninth aspect for instance, selects sectional images in answer to the specified number in order of nearer value both of a mean value and a standard deviation of the brightness instructed beforehand to be a sectional image whose probability of including a background.

According to a tenth aspect of the invention, there is provided a method of object detectable and background removal for enabling an object to be automatically detected minutely and accurately as far as an outline, wherein the sectional image selection process causes the sectional image whose probability of including only the background is high to be either single image or a plurality of images instructed beforehand.

In the fourth aspect of the invention, the object detectable and background removal method selects the sectional image whose probability of including only the background is high, in the process of the fourth aspect concerned, in addition thereto, the object detectable and background removal method of the tenth aspect judges a partial image whose probability of including only a background is high to be either single sectional image or a plurality of sectional images instructed beforehand.

Namely, in the invention of the tenth aspect, there is instructed beforehand a partial image whose probability of including only a background is high. For instance, as shown in FIG. 1, when an image is taken photograph while controlling so as to locate an object in the center of image, in this case, it is certain that four corners of the image of the sectional images 1-A, 9-A, 1-I, 9-I in FIG. 4 are backgrounds. In another case of photograph of person appears in a news paper, both corners located above sectional images 1-A, and 9-A are backgrounds surely in FIG. 4. As described above, the tenth aspect enables another sectional images including only a background to be selected based on the sectional images including surely only a background.

According to an eleventh aspect of the invention, there is provided a method of object detectable and background removal for enabling an object to be automatically detected minutely and accurately as far as an outline, wherein the sectional image selection process selects a sectional image whose probability of including only the background is high from sectional images included in an area instructed beforehand.

In the fourth to ninth aspects of the invention, the object detectable and background removal method selects the sectional image whose probability of including only the background is high, in the process of the fourth aspect to ninth aspect concerned, in addition thereto, when the object detectable and background removal method of the eleventh aspect selects a sectional image whose probability of including only a background is high, selecting it from a predicted area of including only a background beforehand instead of the whole sectional images.

According to a twelfth aspect of the invention, there is provided a method of object detectable and background removal for enabling an object to be automatically detected minutely and accurately as far as an outline, wherein the sectional image selection process selects a sectional image whose probability of including only the background is high from sectional images included in a plurality of areas instructed beforehand.

In the fourth aspect to the ninth aspect of the invention, the object detectable and background removal method selects the sectional image whose probability of including only the background is high, in the process of the fourth aspect to ninth aspect concerned, in addition thereto when the object detectable and background removal method of the twelfth aspect selects a sectional image whose probability of including only a background is high, from sectional images involved in a plurality of areas instructed beforehand.

According to a thirteenth aspect of the invention, there is provided a method of object detectable and background removal for enabling an object to be automatically detected minutely and accurately as far as an outline, wherein said statistic calculation process consists of a sectional image division process dividing the input image into sectional images, and a mean value and standard deviation calculation process calculating a skewness from a mean value and standard deviation of a prescribed characteristic value of a sectional image.

In the second aspect of the invention, the object detectable and background removal method calculates the statistic in every respective sectional images while dividing the input image into sectional images, in the process of the second aspect concerned, in addition thereto, the object detectable and background removal method of the thirteenth aspect for instance, calculates a mean value, a standard deviation, and a skewness of the brightness of a sectional image while dividing an input image into sectional images.

Namely, the invention of the thirteenth aspect newly calculates the skewness in comparison with the third aspect. The skewness of the sectional image i-p is defined based on the literature: "Mathematical Statistics" written by Takashi Takeuchi, published by Toyo Keizai, 1963, pp. 29, by a following equation (7).

$$\zeta_{i\text{-}p} = (1/\sigma_{i\text{-}p}^3)\{\Sigma_{x,y \epsilon C_{i\text{-}p}}(I_{x,y} - \mu_{i\text{-}p})^3 / \Sigma_{x,y \epsilon C_{i\text{-}p}} 1\} \tag{7}$$

As described in the same literature "Mathematical Statistics" pp. 29, a skewness is quantity used for representing slippage from normal distribution, and also is a standard judging lateral symmetric property of distribution. On the assumption that a background is virtually even state in a sectional image, it is capable of being understood that for instance, brightness distribution is like a normal distribution, thereby, the skewness is of usefulness by way of judgement material whether or not an image is a background. The skewness becomes zero when the distribution concerned agrees with the normal distribution, the skewness take a separated value from zero when the distribution concerned gets out of the normal distribution.

In the thirteenth aspect of the invention, a kurtosis which is described in the same literature is capable of being used instead of the skewness. The kurtosis is available quantity by way of judgement condition whether or not an image is a background, and is available standard of simplicity of the brightness distribution.

According to a fourteenth aspect of the invention, there is provided a method of object detectable and background removal for enabling an object to be automatically detected minutely and accurately as far as an outline, wherein the sectional image selection process judges a sectional image whose standard deviation of the prescribed characteristic value is of the most smallest one as a sectional image whose probability of including only the background is high among sectional images whose absolute value of skewness of the prescribed characteristic value is less than a threshold, while in another sectional images, the sectional image selection process judges a sectional image whose absolute value of the skewness of the prescribed characteristic value is less than the threshold and whose difference of a standard deviation of the prescribed characteristic value between the sectional image whose probability of including only the background is high and the sectional image concerned is less than the threshold as a sectional image including only the background.

In the thirteenth aspect of the invention, the object detectable and background removal method selects the sectional image including only the background based on the calculated statistics, in the above process of the thirteenth aspect concerned, in addition thereto, the object detectable and background removal method of the fourteenth aspect judges a sectional image whose standard deviation of the brightness is of the most smallest value to be a sectional image whose probability of including only a background is high among sectional images whose absolute value of the skewness of the brightness and so forth is less than the threshold, in another sectional images, for instance, the fourteenth aspect judges a sectional image whose absolute value of the skewness of the brightness and so forth is less than the threshold and whose difference of standard deviation between the sectional image concerned and the sectional image whose probability of including only the background is high is less than the threshold to be a sectional image including only a background.

In the invention of the fourteenth aspect, the skewness is utilized when judging whether or not a sectional image includes only a background. For instance, there can be realized a threshold processing whether or not the sectional image includes a background by a equation (8).

$$|\zeta_i - \rho| < \eta \zeta \quad (8)$$

Here, $\eta \zeta$ is a constant determined beforehand which takes larger value more than zero (0). According to judgement of the present skewness, it enables a distribution maybe background whose brightness value distribution is virtually even to be investigated within sectional images.

According to a fifteenth aspect of the invention, there is provided a method of object detectable and background removal for enabling an object to be automatically detected minutely and accurately as far as an outline, wherein the sectional image selection process judges a sectional image whose absolute value of a skewness of the prescribed characteristic value is less than the threshold as a sectional image whose probability of including only the background is high.

In the fourteenth aspect of the invention, the object detectable and background removal method selects the sectional image whose probability of including only the background is high, in the process of the fourteenth aspect concerned, in addition thereto, the object detectable and background removal method of the fifteenth aspect for instance, judges a sectional image whose absolute value of the skewness of the brightness is less than the threshold to be a sectional images whose probability of including only a background is high.

Namely, the invention of the fifteenth aspect investigates only a distribution to be a background whose skewness is of the small value and whose brightness value distribution is approximately uniform in the sectional images.

According to a sixteenth aspect of the invention, there is provided a method of object detectable and background removal for enabling an object to be automatically detected minutely and accurately as far as an outline, wherein the sectional image selection process selects sectional images of the number specified in order of smaller standard deviation among sectional images whose absolute value of a skewness of the prescribed characteristic value is less than the threshold, subsequently judging the sectional image concerned as a sectional image whose probability of including only the background is high.

In the fourteenth aspect of the invention, the object detectable and background removal method selects the sectional image whose probability of including only the background is high, in the process of the fourteenth aspect concerned, in addition thereto, the object detectable and background removal method of the sixteenth aspect for instance, selects sectional images in answer to the specified numbers in order of smaller value of the standard deviation among sectional images whose absolute value of the skewness of the brightness and so forth is less than the threshold to be a sectional image whose probability of including only a background is high.

According to a seventeenth aspect of the invention, there is provided a method of object detectable and background removal for enabling an object to be automatically detected minutely and accurately as far as an outline, wherein the sectional image selection process selects sectional images of the number specified in order of smaller standard deviation among sectional images whose absolute value of a skewness of the prescribed characteristic value is less than the threshold, subsequently judging the sectional image concerned as a partial image whose probability of including only the background is high.

In the fourteenth aspect of the invention, the object detectable and background removal method selects the sectional image whose probability of including only the background is high, in the process of the fourteenth aspect concerned, in addition thereto, the object detectable and background removal method of the seventeenth aspect for instance, selects a sectional image whose standard deviation is of the most nearest value of the standard deviation of the brightness instructed beforehand among sectional images whose absolute value of the skewness of the brightness and so forth is less than the threshold, thus judging to be a sectional image whose probability of including only a background is high.

According to a eighteenth aspect of the invention, there is provided a method of object detectable and background removal for enabling an object to be automatically detected minutely and accurately as far as an outline, wherein the sectional image selection process selects sectional images as many as the number specified in order of the most nearest value to the standard deviation of the skewness of the prescribed characteristic value instructed beforehand among sectional images whose absolute value of skewness of the prescribed characteristic value is less than the threshold, to judge the sectional image concerned as the sectional image whose probability of including only the background is high.

In the fourteenth aspect of the invention, the object detectable and background removal method selects the sectional image whose probability of including only the background is high, in the process of the fourteenth aspect concerned, in addition thereto, the object detectable and background removal method of the eighteenth aspect for instance, selects sectional images in answer to the specified number in order of nearer value of the standard deviation of the brightness instructed beforehand among sectional images whose absolute value of the skewness of the brightness and so forth is less than the threshold, thus judging to be a sectional image whose probability of including only a background is high.

According to a nineteenth aspect of the invention, there is a method of object detectable and background removal for enabling an object to be automatically detected minutely and accurately as far as an outline, wherein the sectional image selection process selects a partial image whose standard deviation is of the most nearest value to the standard deviation of the prescribed characteristic value instructed beforehand among sectional images whose absolute value of the skewness of the prescribed characteristic value is less than the threshold, thus judging the sectional image concerned as the sectional image whose probability of including only the background is high.

In the fourteenth aspect of the invention, the object detectable and background removal method selects the sectional image whose probability of including only the background is high, in the process of the fourteenth aspect concerned, in addition thereto, the object detectable and background removal method of the nineteenth aspect for instance, selects sectional images in answer to the specified number in order of nearer value of the mean value and the standard deviation of the brightness instructed beforehand among sectional images whose absolute value of the skewness of the brightness and so forth is less than the threshold, thus judging to be a sectional image whose probability of including only a background is high.

According to a twentieth aspect of the invention, there is provided a method of object detectable and background removal for enabling an object to be automatically detected minutely and accurately as far as an outline, wherein the sectional image selection process selects partial images as many as the number specified in order of the most nearest value to a mean value and a standard deviation of the prescribed characteristic value instructed beforehand among sectional images whose absolute value of the skewness of the prescribed characteristic value is less than the threshold, thus judging the sectional image concerned as the sectional image whose probability of including only the background is high.

In the fourteenth aspect of the invention, the object detectable and background removal method selects the sectional image whose probability of including only the background is high, in the process of the fourteenth aspect concerned, in addition thereto, the object detectable and background removal method of the twentieth aspect for instance, selects sectional images in answer to the specified number in order of nearer value of the standard deviation of the brightness and so forth instructed beforehand among sectional images whose absolute value of the skewness of the brightness is less than the threshold, thus judging to be a sectional image whose probability of including only a background is high.

According to a twenty first aspect of the invention, there is provided a method of object detectable and background removal for enabling an object to be automatically detected minutely and accurately as far as an outline, wherein the sectional image selection process to which there is given beforehand a probability of including only the background in every sectional image involved in a plurality of areas instructed beforehand, judges a sectional image whose probability of including only the background is the most highest as the sectional image whose probability of including only the background is high among sectional images whose absolute value of the skewness of prescribed characteristic value is less than the threshold.

In the fourteenth aspect of the invention the object detectable and background removal method thereof selects the sectional image whose probability of including only the background is high, in the process of the fourteenth aspect concerned, in addition thereto, the object detectable and background removal method of the twenty first aspect to which for instance, the probability of including only the background is given beforehand in every sectional images involved in the area instructed beforehand, thus judging a partial image whose probability of including only a background is high to be the sectional image whose probability of including only the background is high among sectional images whose absolute value of the skewness of the brightness is less than the threshold.

Namely, the invention of the twenty first aspect selects the sectional image whose probability of including only the background given beforehand is of the most highest value among sectional images which satisfy the condition that the absolute value of the skewness is less than the threshold. For instance, as shown in FIG. 1, when there is intended to locate an object to the center position, the probability of including only a background in the corners of the image is high rather than the center position. There, firstly, there is given a probability of including only the background to respective sectional images beforehand. For instance, in FIG. 6, there is established beforehand the probability of including only the background of the sectional images 1-A, 2-A, 1-B, and 2-B to 0.8, 0.6, 0.4, and 0.2 respectively, and 0 (zero) is established to another sectional images. There is judged in the twenty first aspect that the sectional image whose probability of including only the background is of the most highest value with the exception of the value of zero and whose absolute value of the skewness of respective sectional images is less than the threshold, to be the sectional image whose probability of including only the background is high. By virtue of the matter described above, there can be selected the sectional image whose higher probability of including only the background on the location of the image while giving it preference.

According to a twenty second aspect of the invention, there is provided a method of object detectable and baackground removal for enabling an object to be automatically detected minutely and accurately as far as an outline, wherein the sectional image selection process to which there is given beforehand a probability of including only the background respectively in every sectional image involved in a plurality of areas instructed beforehand, selects the sectional image whose probability of including only the background is of the highest one from respective areas among sectional images whose absolute value of the skewness of the prescribed characteristic value is less than the threshold, thus judging the sectional image concerned as the sectional image whose probability of including only the background is high.

In the fourteenth aspect of the invention, the object detectable and background removal method selects the sectional image whose probability of including only the background is high, in the process of the fourteenth aspect concerned, in addition thereto, the object detectable and background removal method of the twenty second aspect to which the respective probabilities of including only the background are given in every sectional image involved in a plurality of areas instructed beforehand, selects a sectional image whose probability of including only a background is of the most highest value from respective areas among sectional images whose absolute value of the skewness of the brightness is less than the threshold, thus judging to be a sectional image whose probability of including only the background is high.

Namely, the invention of the twenty second aspect establishes a plurality of group of sectional images to which the probabilities are given in comparison with the twenty first aspect. On account of this matter, it enables the sectional image to be selected while establishing the probabilities of including only the background to four corners of the image independently.

According to a twenty third aspect of the invention, there is provided a method of object detectable and background removal for enabling an object to be automatically detected minutely and accurately as far as an outline, wherein the sectional image whose probability of including only the background is high is selected from the sectional image involved in at least one area instructed beforehand in the sectional image selection process.

In the fourteenth aspect to the twenties aspect of the invention, the object detectable and background removal method selects the sectional image whose probability of including only the background is high, in the process of the fourteenth aspect to the twenties aspect concerned, in addition thereto, the object detectable and background removal method of the twenty third aspect selects a sectional image whose probability of including only a background is high from a sectional image involved in at least one area instructed beforehand.

According to a twenty fourth aspect of the invention, there is provided a method of object detectable and background removal for enabling an object to be automatically detected minutely and accurately as far as an outline, wherein the statistic estimation process estimates a mean value and a standard deviation of the prescribed characteristic value over the whole picture while utilizing the mean value and the standard deviation of the prescribed characteristic value of the sectional image including only the background.

In the second aspect to the twenty third aspect of the invention, the object detectable and background removal method estimates the statistics in the whole picture from the sectional image including only the background, in the process of the second aspect to the twenty third aspect concerned, in addition thereto, the object detectable and background removal method of the twenty fourth aspect estimates a mean value and a standard deviation of the brightness and so forth by way of the background over the whole picture while utilizing for example, the mean value and the standard deviation of the brightness of the sectional image including only the background.

Namely, the invention of the twenty fourth aspect, since the mean value and the standard deviation of the brightness and so forth of the sectional image including only the background selected previously are the mean value and the standard deviation of the brightness and so forth of the background of the location of the sectional image concerned, thus estimating a mean value and a standard deviation of the brightness and so forth of a background over the whole picture due to the fact that the mean value and the standard deviation in the location of the sectional image are subjected to the interpolation and the extrapolation.

According to a twenty fifth aspect of the invention, there is provided a method of object detectable and background removal for enabling an object to be automatically detected minutely and accurately as far as an outline, wherein when the statistics estimation process estimates a mean value and a standard deviation of the prescribed characteristic value by way of the background in the sectional image including image with the exception of the background, if there exists the mean value and the standard deviation of the prescribed characteristic value of the sectional image including only the background located in the neighborhood and the mean value and the standard deviation of the prescribed characteristic value of the sectional image including image with the exception of the background estimated previously in the same neighborhood, thus estimating the mean value and the standard deviation by averaging above respective average values and the standard deviations, while if there does not exist them, estimating the mean value and the standard deviation of the prescribed characteristic value in another sectional images including image with the exception of the background, thus repeating estimation processing both of a mean value and a standard deviation of the prescribed characteristic value of the background until when it is capable of estimating a mean value and a standard deviation of the prescribed characteristic value of the background in the whole sectional images including image with the exception of the background.

In the twenty third aspect of the invention, the object detectable and background removal method estimates the statistics in the whole picture from the partial image including only the background, in the process of the twenty third aspect concerned, in addition thereto, in the object detectable and background removal method of the twenty fifth aspect, when the statistics estimation process estimates for instance, a mean value and a standard deviation of the brightness by way of the background in the sectional image including image with the exception of the background, if there exists the mean value and the standard deviation of the brightness of the sectional image including only the background located in the neighborhood and the mean value and the standard deviation of the brightness of the sectional image including image with the exception of the background estimated previously in the same neighborhood, thus estimating the mean value and the standard deviation by averaging above respective average values and the standard deviations, while if there does not exist them, estimating the mean value and the standard deviation of the brightness in another sectional images including image with the exception of the background, thus repeating estimation processing both of a mean value and a standard deviation of the brightness of the background until when it is capable of estimating a mean value and a standard deviation of the brightness of the background in the whole sectional images including image with the exception of the background.

Namely, the invention of the twenty fifth aspect estimates a mean value and a standard deviation of the brightness and so forth which the background would have, in the location of the sectional image including image with the exception of the background. For instance, in FIG. 5, when there is paid attention to the sectional image 2-A judged as the sectional image including image except the background, three of 1-A, 3-A, and 2-B within the sectional images of the neighborhood having the side in common are judged as the sectional image including only the background. Consequently, it can be understood that the mean value and the standard deviation of the brightness of the background in the location of the sectional image 2-A analogize with those of the above sectional images 1-A, 3-A, and 2-B, therefore, a mean value and a standard deviation of the brightness of the sectional image 2-A can be estimated by a equation (9) based on the mean value and the standard deviation of the brightness of the sectional images 1-A, 3-A, and 2-B.

$$\mu_{2-A} = (\mu_{1-A} + \mu_{3-A} + \mu_{2-B})/3$$

$$\sigma_{2-A} = (\sigma_{1-A} + \sigma_{3-A} + \sigma_{2-B})/3 \qquad (9)$$

Similarly, in FIG. 5, the sectional image 2-D which is judged as the partial image including image except the background, a mean value and a standard deviation thereof is estimated from the mean value and the standard deviation of the partial images 2-C, and 1-A which are judged as the sectional image including only the background. As described above, only the sectional image having a judged sectional image of including only the background in the neighborhood thereof among sectional images judged as image including image except the background, to which the estimation of a mean value and a standard deviation of the brightness by way of the background is implemented. The sectional image obtaining the mean value and the standard deviation by the present estimation is dealt with by way of the sectional image including only the background thereafter, thus being utilized in estimation of another sectional image judged as image including image except the background. It is capable of estimating a mean value and a standard deviation of the brightness by way of the background over the whole sectional images due to repeating of the present operation.

Namely, in the neighborhood of the sectional image 1-p, when there is only one sectional image whose mean value and standard deviation of the brightness and so forth by way of the background are estimated and whose number of the sectional image is set to be j-q, a mean value and a standard deviation of the brightness and so forth by way of a background in the sectional image i-p are estimated by a equation (10).

$$\mu_{i-p} = \mu_{j-q}$$

$$\sigma_{i-p} = \sigma_{j-q} \qquad (10)$$

Similarly, when the mean value and the standard deviation of the brightness are estimated in the neighborhood of the two sectional images j-q and k-r, a mean value and a standard deviation of the brightness and so forth by way of a background in the sectional image i-p are estimated by a equation (11).

$$\mu_{i-p} = (\mu_{j-q} + \mu_{k-r})/2$$

$$\sigma_{i-p} = (\sigma_{j-q} + \sigma_{k-r})/2 \qquad (11)$$

Further, when the mean value and the standard deviation of the brightness are estimated in the neighborhood of the three sectional images j-q, k-r, and l-s, a mean value and a standard deviation of the brightness and so forth by way of a background in the sectional image i-p are estimated by a equation (12).

$$\mu_{i-p} = (\mu_{j-q} + \mu_{l-s})/3$$

$$\sigma\sigma_{i-p} = (\sigma_{j-q} + \sigma_{k-r} + \sigma_{l-s})/3 \qquad (12)$$

And so forth, it is capable of being defined along the number of the sectional images in the neighborhood thereof.

In the above estimation processing, there is defined the sectional image having the side in common in regard to the sectional image by way of the target, to be a neighborhood, in addition thereto, it is capable of defining neighborhood of including sectional image having the vertexes in common, and including a sectional image whose distance is long, as the neighborhood, thus it is capable of implementing the same estimation processing as above. Further, the equations (10), (11), and (12) for estimating a mean value and a standard deviation are simple average, however, it is capable of being utilized the complicated equations such as a equation taking a center value, a equation weighted-averaging by distance of sectional images therebetween, and a equation using a quadratic average, or a cubic average.

According to a twenty sixth aspect of the invention, there is provided a method of object detectable and background removal for enabling an object to be automatically detected minutely and accurately as far as an outline, the statistic estimation process calculates location of the center of gravity of the sectional image including image with the exception of the background to be taken as the location of the center of gravity of an object, and calculating all of distance between respective sectional images and the location of the center of gravity of the object, when the statistic estimation process estimates a mean value and a standard deviation of the prescribed characteristic value by way of the background in the sectional images of including image with the exception of the background, in case where there exists only one set of a mean value and a standard deviation of the sectional image which is located far off more than the distance between the sectional image including images with the exception of the background and the location of the center of gravity, and which is located in the neighborhood thereof including only the background, and which is located at the same as above including images with the exception of the background estimated previously, thus estimating the mean value and the standard deviation concerned by obtaining a mean value thereof, while in case where there does not exists only one set of a mean value and a standard deviation of the sectional image, estimating a mean value and a standard deviation of the prescribed characteristic value in another sectional images including images with exception of the background, thus repeating an estimating processing of a mean value and a standard deviation of the prescribed characteristic value of the background until when it is capable of estimating a mean value and a standard deviation of the prescribed characteristic value of a background in the whole sectional images including images with the exception of the background.

In the twenty fourth aspect of the invention, the object detectable and background removal method estimates the statistics in the whole picture from the sectional image including only the background, in the process of the twenty fourth aspect concerned, in addition thereto, in the object detectable and background removal method of the twenty sixth aspect, the statistic estimation process calculates location of the center of gravity of the sectional image including image with the exception of the background to be taken as the location of the center of gravity of an object, and calculating all of distance between respective sectional images and the location of the center of gravity of the object, when the statistic estimation process estimates a mean value and a standard deviation of the brightness by way of the background in the sectional images of including image with the exception of the background, in case where there exists only one set of a mean value and a standard deviation of the sectional image which is located far off more than the distance between the sectional image including images with the exception of the background and the location of the center of gravity, and which is located in the neighborhood thereof including only the background, and which is located at the same as above including images with the exception of the background estimated previously, thus estimating the mean value and the standard deviation concerned by obtaining a mean value thereof, while in case where there does not exists only one set of a mean value and a standard deviation of the sectional image, estimating a mean value and a standard deviation of the brightness in another sectional images including images with exception of the background, thus repeating an estimating processing of a mean value and a standard deviation of the brightness of the background until when it is capable of estimating a mean value and a standard deviation of the brightness of a background in the whole sectional images except the background.

Namely, the invention of the twenty six aspect obtains a location of the center of gravity of an object to be a detection target while calculating the location of the center of gravity of the sectional image except the background in comparison with the twenty fifth aspect, thus estimating a mean value and a standard deviation of the brightness by way of the background of the sectional image except the background by using only the mean value and the standard deviation of the brightness by way of the background in the sectional image farther away from the location of the center of gravity among the sectional images including only the background in the neighborhood thereof.

For instance, there is supposed that a brightness distribution of a sectional image analogize with that of another sectional image on the inside of background and an object of detection target accidentally. In this case, the processing of an interpolation/extrapolation to the sectional image of the neighborhood as the invention of the twenty fifth aspect can not estimate correctly the mean value of the brightness by way of the background at the intermediate location between the sectional image at the location of background and the sectional image within the object. The invention of the twenty sixth aspect can estimate a mean value of the brightness by way of the background correctly in this case using FIG. 6.

As shown in FIG. 6, the brightness distribution of the background area 2 analogize with that of inside of the object 10, thus the sectional image with the judgement of including only the background appears at both of the background area 2 and the inside of the object 10. However, the sectional image which passes an object-contours 9 is judged as a sectional image except the background because the standard deviation or the skewness becomes large. In FIG. 6, the sectional image with light hatching is the sectional image judged that only the background is included. When there is obtained the mean value of the brightness by way of the background at the location of the sectional image 11 existing on the object-contours 9 in accordance with the twenty fifth aspect from only the sectional images 12, 13, 18, and 19 which are judged that only the background and exists in the neighborhood thereof, there is obtained a wrong intermediate value of the background area 2 and the inside of the object 10.

The twenty sixth aspect can handle such the case because there is calculated the center of gravity of the sectional image judged as except the background to be obtained the location of the center of gravity. The twenty sixth aspect compares the distance between the sectional images 12 to 19 in the neighborhood thereof and an object center location 20 to be rough location of the object with the distance between the watched sectional image 11 and the object center of gravity location 20, subsequently, setting only the sectional images 12, and 13 located farther away therefrom to be candidates of calculation, thus eliminating influence of the sectional image wrongly judged as the background regardless of existence within the object 10. Since the sectional image which passes the object-contours 9 is judged as except the background, the location of the center of gravity viewing from the watched sectional image 11 can not be obtained accurately. However there is no influence.

The influence of the sectional image wrongly judged as only background in the inside of the object remains in the background estimated previously. When there is intended to detect an object based on the background estimated previously thereafter, enabling the influence to be eliminated easily by taking account of connectivity to the sectional image whose probability of including only the background.

According to a twenty seventh aspect of the invention, there is provided a method of object detectable and background removal for enabling an object to be automatically detected minutely and accurately as far as an outline, wherein the statistic estimation process is provided with respective peculiar neighborhood relationships in terms of respective sectional images on an image.

In the twenty fifth aspect of the invention, the object detectable and background removal method estimates the statistics in the whole picture from the sectional image including only the background, in the process of the twenty fifth aspect concerned, in addition thereto, the twenty seventh aspect to which respective peculiar neighborhood relationships are given in terms of the respective sectional images on the image.

Namely, the invention of the twenty seventh aspect does not use the object center of gravity location as described in the twenty sixth aspect, but the neighborhood relationship of the sectional image is set in every respective sectional images of the image beforehand. FIG. 7 is an explanation view showing the neighborhood relationship. When there is estimated a mean value and a standard deviation of the brightness by way of the background in the sectional image 11, thus determining beforehand that which of the sectional images 12 to 19 having the side and the apexes in common is defined as the neighborhood.

As shown in FIG. 8, when the detection target object 3 is taken the photograph at the left corner of the image, it does not necessarily need the location of the center of gravity. When there is estimated the mean value and the standard deviation of the brightness by way of the background in the sectional image 11 in FIG. 8, defining the sectional images 13, 14, and 16 in FIG. 7 to be the neighborhood. On account of this matter, it is capable of being used only the statistics of the sectional image located in the direction of apparently the background, and it is capable of obtaining object contours accurately.

Similarly, as shown in FIG. 9, there is supposed that the detection target object 3 exists beforehand below the center of the picture. When there is taken notice of the sectional image 11 in FIG. 9, there does not occur inversion of relationship of the location between the inside of object and the background because only the sectional images 12, 13, and 15 in FIG. 7 at the left side area of the boundary line 21 are treated as the neighborhood, and because only the sectional images 13, 14, and 16 in FIG. 7 at the right side area of the boundary line 21 are treated as the neighborhood, thus there does not occur wrong estimation in the neighborhood of the boundary. In the person photographs, similar composition is in use in lot of cases, the twenty seventh aspect is effective.

According to a twenty eighth aspect of the invention, there is provided a method of object detectable and background removal for enabling an object to be automatically detected minutely and accurately as far as an outline, wherein the statistic estimation process judges the mean value and the standard deviation of the prescribed characteristic value in the sectional images including only the background as the mean value and the standard deviation of the prescribed characteristic value of the background in the location of a center pixel of the sectional image, when estimating a mean value and a standard deviation of the prescribed characteristic value by way of the background in respective pixels on the image, calculating whole distances between the location of the pixel and the center pixel of the sectional image including only the background, thus estimating a mean value and a standard deviation of the prescribed characteristic value of the background in the location of the pixel, due to the fact that the mean value and standard deviation of the prescribed characteristic value in the location of center pixel of the sectional image including only the background are weighted in answer to the corresponding distance.

In the twenty fifth aspect to the twenty seventh aspect of the invention, the object detectable and background removal method estimates the statistics in the whole picture from the sectional image, however, the object detectable and background removal method of the twenty eighth aspect implements an estimation in every pixel. The invention of the twenty eighth aspect is explained using FIGS. 5 and 10. In FIG. 5, the sectional image with light hatching includes only the background, thus a set of these partial images is taken to be Ψ. Further, a center pixel location of the sectional image group is specified by c1-A, c1-B, . . . , c9-I and column and row. The mean value and the standard deviation of the brightness by way of the background in the center pixel location agree with the mean value and the standard deviation of the brightness of the sectional image concerned.

When there is estimated the mean value and the standard deviation of the brightness by way of the background in the estimated pixel location 22, calculating the distance between the present estimated pixel location 22 and the center pixel location in the set Ψ of the sectional image including only the background respectively. Here, the coordinates location of the estimated pixel location 22 is set to be $(x_q, y_q)$, and the center coordinates location ci-p of the sectional image i-p including only the background is set to be $(x_{ci-p}, y_{ci-p})$, thus the distance $d_{q,ci-p}$ of the two points therebetween is calculated a equation (13).

$$d_{q,ci-p} = \sqrt{\{(x_q - x_{ci-p})^2 + (y_q - y_{ci-p})^2\}} \qquad (13)$$

There is estimated a mean value and a standard deviation of the brightness of the background in the estimated picture element location 22 based on the equation (14), using the distance $d_{q,ci-p}$.

$$\mu_q = \{\Sigma_{i-p \in \Psi} \mu_{i-p}(d_{q,ci-p})^{-2}\} / \{\Sigma_{i-p \in \Psi}(d_{q,ci-p})^{-2}\}$$

$$\sigma_q = \{\Sigma_{i-p \in \Psi} \sigma_{i-p}(d_{q,ci-p})^{-2}\} / \{\Sigma_{i-p \in \Psi}(d_{q,ci-p})^{-2}\} \qquad (14)$$

Here, the denominator is the term for normalization.

Consequently, in the equation (14), the estimation is implemented in such a way that it is weighted to be averaged by quantity in proportion to the squared reciprocal of distance. There is obtained the mean value and the standard deviation of the brightness by way of the background in terms of the whole pixels by repeating above procedure. It is capable of being used a reciprocal or a cube of reciprocal for method of adding weight.

According to a twenty ninth aspect of the invention, there is provided a method of object detectable and background removal for enabling an object to be automatically detected minutely and accurately as far as an outline, wherein the statistic estimation process judges a location of the center of gravity of the sectional image including only the background as the location of the center of gravity of an object, when estimating a mean value and a standard deviation of the prescribed characteristic value by way of the background in respective pixels on an image, thus supposing a straight line connecting the pixel and the location of the center of gravity of the object, and a half straight line located at opposite side of the location of the center of gravity of the object from the pixel on the straight line, subsequently, selecting whole center pixels of the sectional image including only the background, which sectional image intersected location is located on the half straight line while dropping a perpendicular to the straight line from the center pixel of the sectional image including only the background, then, calculating a distance between the pixel and the location of the center pixel of the sectional image including only the background selected previously, thus implementing estimation of a mean value and a standard deviation of the prescribed characteristic value of the background at the location of the pixel on the image, due to the fact that the mean value and standard deviation of the prescribed characteristic value of the background of the location of the center pixel in the sectional image including only the background selected previously are weighted to average in answer to the corresponding distance.

In the twenty fourth aspect of the invention, the object detectable and background removal method estimates the statistics in the whole picture from the sectional image including only the background, in the process of the twenty fourth aspect concerned, in addition thereto, in the object detectable and background removal method of the twenty ninth aspect, the statistic estimation process judges a location of the center of gravity of the sectional image including only the background as the location of the center of gravity of an object, when estimating a mean value and a standard deviation of the brightness by way of the background in respective pixels on an image, thus supposing a straight line connecting the pixel and the location of the center of gravity of the object, and a half straight line located at opposite side of the location of the center of gravity of the object from the pixel on the straight line, subsequently, selecting whole center pixels of the sectional image including only the background, which sectional image intersected location is located on the half straight line while dropping a perpendicular to the straight line from the center pixel of the sectional image including only the background, then, calculating a distance between the pixel and the location of the center pixel of the sectional image including only the background selected previously, thus implementing estimation of a mean value and a standard deviation of the brightness of the background at the location of the pixel on the image, due to the fact that the mean value and standard deviation of the brightness of the background of the location of the center pixel in the sectional image including only the background selected previously are weighted to average in answer to the corresponding distance.

Namely, the invention of the twenty ninth aspect utilizes only the mean value and the standard deviation of the brightness of the sectional image including only the background, which the mean value and the standard deviation are located at the opposite side of the object center of gravity location when there is obtained a mean value and a standard deviation of the brightness by way of the background of a pixel location, in comparison with the twenty eighth aspect. The invention of the twenty ninth aspect will be described referring to FIG. 10.

Firstly, there is obtained the object center of gravity location 20 while calculating the center of gravity location of the sectional image including only the background. When there is obtained the mean value and the standard deviation of the brightness by way of the background in the estimated pixel location 22, supposing a straight line 23 connecting the estimated pixel location 22 and the object center of gravity location 20.

There is dropped the straight line 24 to be the perpendicular line from the center pixel location c1-B of the sectional image to the straight line 23 while taking notice of 1-B of the sectional images including only the background. Since the intersection point of the straight line 23 and the straight line 24 belongs to a half straight line located at opposite side of the object center of gravity location 20 from the estimated pixel location 22 of the straight line 23, putting it into the set Ψ of the sectional image for utilizing in case of estimation of the sectional image 1-B. Above operation is repeated in terms of the whole sectional images including only the background, before implementing the estimation processing based on the equation (14).

The invention of the twenty ninth aspect repeats the present estimation processing over the whole pixels.

According to a thirtieth aspect of the invention, there is provided a method of object detectable and background removal for enabling an object to be automatically detected minutely and accurately as far as an outline, wherein the statistic estimation process is provided with a location of the center of gravity of an object which comes to be the center of gravity of an object beforehand.

In the twenty sixth aspect to the twenty ninth aspect of the invention, the object detectable and background removal method estimates the statistics in the whole picture from the sectional image including only the background, in the process of the twenty sixth aspect to the twenty ninth aspect concerned, in addition thereto, in the object detectable and background removal method of the thirtieth aspect, the object center of gravity location to be the center of gravity of the object is given beforehand.

According to a thirty first aspect of the invention, there is provided a method of object detectable and background removal for enabling an object to be automatically detected minutely and accurately as far as an outline, wherein in regard to isolation of only the object of detection target at the comparison process, when the comparison process implements threshold processing in the respective location of the pixels, firstly a first threshold is calculated to be defined in such a way that a constant set beforehand is multiplied by the standard deviation of the prescribed characteristic value of the background estimated previously, then the above multiplied number is subtracted from a mean value of the prescribed characteristic value of the background estimated previously, secondly a second threshold is calculated to be defined in such a way that also a constant set beforehand is multiplied by the standard deviation of the prescribed characteristic value of the background estimated previously, then the above multiplied number is added to a mean value of the prescribed characteristic value of the background estimated previously, thus in case where the prescribed characteristic value of the location of the pixel is lager than the first threshold and is smaller than the second threshold, judging the pixel as the background, so that the comparison process removes the background to isolate the object due to the fact that the comparison process causes the same processing to be executed over the whole pixels.

In the second aspect to the thirtieth aspect of the invention, the object detectable and background removal method determines the threshold over the whole picture from the statistics estimated previously, subsequently, comparing the determined threshold over the whole picture with the input image, thus isolating only the detection target object, in the process of the second aspect to the thirtieth aspect concerned, in addition thereto, in the object detectable and background removal method of the thirty first aspect, in regard to isolation of only the object of detection target at the comparison process, when the comparison process implements threshold processing in the respective location of the pixels, firstly a first threshold is calculated to be defined in such a way that a constant set beforehand is multiplied by the standard deviation of the brightness of the background estimated previously, then the above multiplied number is subtracted from a mean value of the brightness of the background estimated previously, secondly a second threshold is calculated to be defined in such a way that also a constant set beforehand is multiplied by the standard deviation of the brightness of the background estimated previously, then the above multiplied number is added to a mean value of the brightness of the background estimated previously, thus in case where the brightness of the location of the pixel is lager than the first threshold and is smaller than the second threshold, judging the pixel as the background, so that the comparison process removes the background to isolate the object due to the fact that the comparison process causes the same processing to be executed over the whole pixels.

Namely, the invention of the thirty first aspect removes only the background area to isolate the object to be the detection target as far as contours accurately by calculating the threshold based on the mean value and the standard deviation of the brightness of the background estimated previously from the input image.

The brightness values of the background scatter in the vicinity of the mean value of the brightness. The size of dispersion is capable of being estimated by the standard deviation. According to table 1 of normal distribution function described in the literature: "Mathematical Statistics" written by T. Takeuchi, published by Toyo Keizai, 1963, pp. 361, there can be read the probability that the slipping off from the mean value disperses more than three times of the standard deviation is 0.26%. There is expressed in different words, when the brightness value of the background is in a state of the normal distribution, 99.74% of the pixel in the whole picture elements belong to the inside of three times of a mean value±a standard deviation.

Consequently, the first threshold for judging whether or not a pixel located certain coordinates position (x, y) is a background is calculated by a equation (15) using a constant α− whose value is positive or zero determined beforehand, a mean value $\mu_{i\text{-}p}$ in the sectional image i-p including the pixel location, and the standard deviation $\sigma_{i\text{-}p}$.

$$\tau_{1,x,y} = \mu_{i\text{-}p} - \alpha - \sigma_{i\text{-}p} \tag{15}$$

Similarly, the second threshold is calculated by a equation (16) using a constant α+ whose value is positive or zero determined beforehand.

$$\tau_{2,x,y} = \mu_{i\text{-}p} - \alpha + \sigma_{i\text{-}p} \tag{16}$$

It becomes possible to distinguish only the pixels constituting the background due to the threshold processing of a equation (17) utilizing above two thresholds.

$$\tau_{1,x,y} \leq I_{x,y} \leq \tau_{2,x,y} \quad (17)$$

The invention of the thirty first aspect is described by using the arithmetic mean or the standard deviation, however it is capable of constituting the invention of the aspect by using a geometric mean, a harmonic mean, a median and so forth which are statistical estimation amount to be representative value, and the statistics representing dispersion such as an absolute deviation, and a quarter deviation described in the literature: "Encyclopedia of Mathematical Sciences" published by Maruzen Co., Ltd, 1991, pp. 495.

According to a thirty second aspect of the invention, there is provided a method of object detectable and background removal for enabling an object to be automatically detected minutely and accurately as far as contours, wherein in regard to isolation of only the object of detection target at the comparison process, the comparison process implements a threshold processing over the whole pixels, to detect areas linked one another by way of areas to be a candidate of a background, thus judging the areas concerned as areas including the most large number of sectional images whose probability of including only the background among candidate areas of the background.

In the thirty first aspect of the invention, the object detectable and background removal method determines the threshold in the whole picture from the statistics described above, subsequently, comparing the threshold in the whole picture determined previously with the input image, thus isolating only the object to be the detection target, in the process of the twenty first aspect concerned, the object detectable and background removal method of the thirty second aspect implements the threshold processing over the whole pixel, before detecting the areas linked with each other by way of the area to be the candidate of the background, thus removing the background to isolate the object due to the fact that there is taken the candidate area including the largest number of the sectional images whose probability of including only the background to be the background area among the candidate areas of the background.

Namely, the invention of the thirty second aspect removes the background to isolate the object due to the fact that there is taken the candidate area including the largest number of the sectional images whose probability of including only the background. In virtue of this matter, even though when the brightness distribution of the background is close to the brightness distribution of the inside of object, there is prevented that a part of the inside of the object is wrongly removed as the background.

According to a thirty third aspect of the invention, there is provided a method of object detectable and background removal for enabling an object to be automatically detected minutely and accurately as far as an outline, wherein in regard to isolation of only the object of detection target at the comparison process, the comparison process implements a threshold processing over the whole pixels, to detect areas linked one another by way of areas to be a candidate of a background, thus judging the areas concerned as areas including the most large number of sectional images whose probability of including only the background among candidate areas of the background.

In the thirty first aspect of the invention, the object detectable and background removal method determines the threshold in the whole picture from the statistics described above, subsequently, comparing the threshold in the whole picture determined previously with the input image, thus isolating only the object to be the detection target, in the process of the twenty first aspect concerned, the object detectable and background removal method of the thirty second aspect implements the threshold processing over the whole pixel, before detecting the areas linked with each other by way of the area to be the candidate of the background, thus removing the background to isolate the object due to the fact that there is taken the candidate area including the largest number of the sectional images including only the background to be the background area among the candidate areas of the background. According to a thirty fourth aspect of the invention, there is provided a method of object detectable and background removal for enabling an object to be automatically detected minutely and accurately as far as contours, wherein in regard to isolation of only the object of detection target at the comparison process, the comparison process implements a threshold processing over the whole pixels, to detect areas linked one another by way of areas to be a candidate of a background, thus judging the area concerned including the most smallest number of sectional images which include image with the exception of the background among the candidate areas of the background as a background area, so that the comparison process removes the background to isolate the object.

In the thirty first aspect of the invention, the object detectable and background removal method determines the threshold in the whole picture from the statistics described above, subsequently, comparing the threshold in the whole picture determined previously with the input image, thus isolating only the object to be the detection target, in the process of the twenty first aspect concerned, the object detectable and background removal method of the thirty second aspect implements the threshold processing over the whole pixel, before detecting the areas linked with each other by way of the area to be the candidate of the background, thus removing the background to isolate the object due to the fact that there is taken the candidate area including the smallest number of sectional images except the background among the candidate areas of the background to be a background area.

According to a thirty fifth aspect of the invention, there is provided a device of object detectable and background removal for enabling an object to be automatically detected minutely and accurately as far as contours comprising a sectional image statistic calculation means for calculating a mean value and a standard deviation of the prescribed characteristic value of the sectional image while dividing to be processed an input image into sectional images, a background sectional image selection means judging a sectional image whose standard deviation is of the smallest value in the sectional images as a sectional image whose probability of including only a background, subsequently, comparing a standard deviation of the prescribed characteristic value of the sectional image with a standard deviation of the prescribed characteristic value of another sectional images, thus judging a sectional image having a standard deviation whose difference between the standard deviation concerned and another standard deviation is less than a threshold to be a sectional image including only the background, a background statistic estimation means for investigating all of mean values and standard deviations in the sectional images including only the background and in another sectional images by way of the background estimated previously, further in the sectional images including images with the exception of said background and in the sectional images including only the background located in the neighborhood of the sectional image, and in the sectional image by way of the background estimated previously in another sectional image, and a threshold generation object detectable and background removal means wherein in order to isolate an object to be removed background by using the mean value and the standard deviation in the whole sectional images, a second threshold is calculated to be defined in such a way that also a constant set beforehand is multiplied by the standard deviation of the prescribed characteristic value of the background estimated previously, then the above multiplied number is added to a mean value of the prescribed characteristic value of the background estimated previously, subsequently, calculating it all over the pictures to be outputted, thus judging pixels within the threshold as a background while using said two kinds of thresholds and judging pixels without the threshold as an object of detection target.

According to a thirty sixth aspect of the invention, there is provided a device of object detectable and background removal for enabling an object to be automatically detected minutely and accurately as far as contours, with an image constituted by virtually even background and an object of detection target, the device roughly consisting of a sectional image statistic calculation means, a background sectional image selection means, a background statistic estimation means, and a threshold generation object detectable and background removal means, the sectional image statistic calculation means comprising a sectional image division means for dividing input images into sectional images, a mean value and a standard deviation calculation means which calculates to be outputted a mean value and a standard deviation of the prescribed characteristic value in every respective sectional images with the sectional image signals as inputs, and a sectional image statistic storage means storing to be outputted the mean value and the standard deviation of the prescribed characteristic value of respective sectional images with the mean value and the standard deviation of the prescribed characteristic value of the sectional images as inputs, said background sectional image selection means comprising a minimum standard deviation reference background only sectional image selection means for outputting a sectional image whose standard deviation of the prescribed characteristic value is of the most smallest value among sectional images as a sectional image whose probability of including only a background with the mean value and the standard deviation of the prescribed characteristic value of the sectional image, a background only sectional image selection means comparing a standard deviation of the prescribed characteristic value of a sectional image whose probability of including only the background with a standard deviation of the prescribed characteristic value in another sectional images, thus judging to be outputted a partial image having standard deviation whose difference between the standard deviation concerned and a standard deviation of the prescribed characteristic value of a sectional image whose probability of including only the background is less than a threshold as a sectional image including only a background and a background only sectional image statistic storage means storing a location of the sectional image including only the background and the mean value and the standard deviation of the prescribed characteristic value of the sectional image concerned to output them at any time, the background statistic estimation means comprising a background exception sectional image selection means, when a command for investigating a sectional image including image with the exception of a background comes thereto, investigating both of a mean value and a standard deviation of the prescribed characteristic value in a sectional image including only a background and a mean value and a standard deviation of the prescribed characteristic value by way of an estimated background in another sectional images, if there exists a sectional image whose no estimated value of a mean value and a standard deviation of the prescribed characteristic value by way of a background exists, outputting the partial image concerned, in case where a mean value and a standard deviation of the prescribed characteristic value are estimated with regard to whole sectional images, so that the background statistic estimation means issues a command of generating a threshold for the sake of object detectable and background removal, a neighborhood background only sectional image existence judgement means investigating mean values and standard deviations both of sectional images including images with the exception of a background and sectional images including only a background located in the neighborhood of the sectional images, and investigating mean values and standard deviations of the prescribed characteristic value by way of a background estimated previously in another sectional images, when there exists a sectional image whose only one set of a mean value and a standard deviation of the prescribed characteristic value are estimated in the neighborhood thereof, thus issuing a command so as to estimate a mean value and a standard deviation of the prescribed characteristic value of a sectional image including image with the exception of the background, a mean value and a standard deviation interpolation/extrapolation means, when receiving a command to estimate a mean value and a standard deviation of the prescribed characteristic value in the sectional image including image with the exception of the background, estimating to be outputted by averaging both of mean values and standard deviations of the prescribed characteristic value of a sectional image including only the background in the neighborhood thereof, simultaneously, outputting an estimated sectional image selection command signal so as to select next sectional image, and an estimated statistic storage means storing the mean value and the standard deviation of the prescribed characteristic value estimated previously to be outputted whenever necessary, and the threshold generation object detectable and background removal means comprising a threshold generation means, when a command for calculating a threshold is entered therein after completing whole mean values and standard deviations of the prescribed characteristic value in the whole sectional images, by using the mean value and the standard deviation in the whole sectional images, a second threshold is calculated to be defined in such a way that also a constant set beforehand is multiplied by the standard deviation of the prescribed characteristic value of the background estimated previously, then the above multiplied number is added to a mean value of the prescribed characteristic value of the background estimated previously, subsequently, calculating it all over the pictures to be outputted, and a threshold processing means judging pixels within the threshold as a background while using the two kinds of thresholds and judging pixels without the threshold as an object of detection target.

According to a thirty seventh aspect of the invention, there is provided a device of object detectable and background removal for enabling an object to be automatically detected minutely and accurately as far as contours, wherein the prescribed characteristic value is at least one of a brightness, a color information, and an edge information.

According to a thirty eighth aspect of the invention, there is provided a device of object detectable and background removal for enabling an object to be automatically detected minutely and accurately as far as contours, wherein the background sectional image selection means comprises a minimum standard deviation reference background only sectional image selection means outputting partial images in such a way that it causes the sectional images of the specified number in order of the smaller number of a standard deviation of the prescribed characteristic value to be outputted while taking such sectional images to be the sectional image whose probability of including only the background with the mean value and the standard deviation of the prescribed characteristic value of the sectional image as inputs, a background only sectional image selection means compares a standard deviation of the prescribed characteristic value of the sectional image whose probability of including only the background with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

According to a thirty ninth aspect of the invention, there is provided a device of object detectable and background removal for enabling an object to be automatically detected minutely and accurately as far as contours, wherein the background sectional image selection means further comprises a standard deviation difference background only sectional image selection means selecting to be outputted a sectional image whose standard deviation is of the most nearest value of the standard deviation of the prescribed characteristic value instructed beforehand, a background only sectional image selection means comparing a standard deviation of the prescribed characteristic value of the sectional image whose probability of including only the background with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

According to a fortieth aspect of the invention, there is provided a device of object detectable and background removal for enabling an object to be automatically detected minutely and accurately as far as contours, wherein the background sectional image selection means comprises a standard deviation reference background only sectional image selection means which outputs sectional images as many as the number specified in order of the most nearest value to the standard deviation of the skewness of the prescribed characteristic value instructed beforehand, judging the sectional image concerned as the sectional image whose probability of including only the background is high, a background only sectional image selection means comparing a standard deviation of the prescribed characteristic value of the sectional image whose probability of including only the background with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

According to a forty first aspect of the invention, there is provided a device of object detectable and background removal for enabling an object to be automatically detected minutely and accurately as far as concurs, wherein the background sectional image selection means comprises a mean value and standard deviation reference background only sectional image selection means outputting a sectional image whose standard deviation is of the most nearest value to the mean value and the standard deviation of the prescribed characteristic value instructed beforehand as a sectional image whose probability of including only a background, a background only sectional image selection means comparing a standard deviation of the prescribed characteristic value of the sectional image whose probability of including only the background with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

According to forty second aspect of the invention, there is provided a device of object detectable and background removal for enabling an object to be automatically detected minutely and accurately as far as an outline, wherein said background sectional image selection means comprises a mean value and standard deviation reference background only sectional image selection means which outputs sectional images as many as the number specified in order of nearer number to the mean value and the standard deviation of the prescribed characteristic value instructed beforehand as a sectional image whose probability of including only a background, a background only sectional image selection means comparing a standard deviation of the prescribed characteristic value of the sectional image whose probability of including only the background with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

According to a forty third aspect of the invention, there is provided a device of object detectable and background removal for enabling an object to be automatically detected minutely and accurately as far as contours, wherein the background sectional image selection means selects a sectional image whose probability of including only a background is high from sectional image involved in an area instructed beforehand.

According to a forty fourth aspect of the invention, there is provided a device of object detectable and background removal for enabling an object to be automatically detected minutely and accurately as far as contours, wherein the background sectional image selection means selects a sectional image whose probability of including only a background is high from sectional images involved in a plurality of areas instructed beforehand.

According to a forty fifth aspect of the invention, there is provided a device of object detectable and background removal for enabling an object to be automatically detected minutely and accurately as far as contours, with an image constituted by virtually even background and an object of detection target, the device roughly consisting of four means of a sectional image statistic calculation means, a background sectional image selection means, a background statistic estimation means, and a threshold generation object detectable and background removal means, the sectional image statistic calculation means comprises a sectional image division means performing division output of input image into sectional images, a mean value and standard deviation and skewness calculation means calculating to be outputted a mean value, a standard deviation, and a skewness of a prescribed characteristic value in every respective sectional images with the sectional image signal as inputs, a sectional image statistic storage means storing to be outputted whenever necessary a mean value, a standard deviation, and a skewness of the prescribed characteristic value of respective sectional images with the mean value, the standard deviation, and the skewness of the prescribed characteristic value of the sectional images as inputs, and the background sectional image selection means comprises a skewness threshold and minimum standard deviation reference background only sectional image selection means outputting a sectional image whose absolute value of the skewness is less than a threshold given beforehand in sectional images, and whose standard deviation of the prescribed characteristic value is of the smallest value as a sectional image whose probability of including only a background, a background only sectional image selection means judging to be outputted a sectional image having a standard deviation whose difference between the standard deviation of the prescribed characteristic value of the sectional image whose probability of including only the background is high and the standard deviation of the prescribed characteristic value in the sectional images is less than the threshold, and outputting a sectional image whose absolute value of the skewness is less than a threshold given beforehand as a sectional image including only a background, and a background only sectional image statistic storage means storing the location of the sectional image including only the background and the mean value and the standard deviation of the prescribed characteristic value of the sectional image concerned, thus outputting them whenever necessary; and the background statistic estimation means comprises a background exception sectional image selection means, when a command for investigating sectional images including images with the exception of a background, investigating a mean value and a standard deviation of the prescribed characteristic value of the sectional image including only the background and a mean value and a standard deviation of the prescribed characteristic value by way of estimated background of another sectional images, if there exists a sectional image whose mean value and standard deviation of the prescribed characteristic value by way of the background is not estimated, outputting the sectional image concerned, while if the mean value and the standard deviation of the prescribed characteristic value by way of the background in respect to whole sectional images are instructed, issuing a command so as to generate a threshold for the sake of object detectable and background removal, a neighborhood background only sectional image existence judgement means investigating all of mean values and standard deviations of the prescribed characteristic values both of sectional images including images with the exception of backgrounds and sectional images including only background located in the neighborhood of the sectional images, and mean values and standard deviations of the prescribed characteristic value by way of the estimated background of another sectional images, even though when there exists only one sectional image whose mean value and standard deviation of the prescribed characteristic value in the neighborhood, issuing a command so as to estimate a mean value and a standard deviation of the prescribed characteristic value of the sectional image including images with the exception of the background, while when there exist no sectional image whose mean value and standard deviation of the prescribed characteristic value are estimated, issuing a command so as to select next sectional image, a mean value and standard deviation interpolation extrapolation means, when receiving a command for estimating a mean value and a standard deviation of the prescribed characteristic value in the sectional image including images with the exception of the background, thus estimating to be outputted by averaging the mean value and the standard deviation of the prescribed characteristic value of the sectional image including only the background in the neighborhood thereof, and by averaging the mean value and the standard deviation of the prescribed characteristic value by way of the estimated background of the sectional image in the neighborhood thereof, simultaneously outputting an estimated sectional image selection command signal so as to select next sectional image, and an estimated statistic storage means storing to be outputted the mean value and the standard deviation of the prescribed characteristic value estimated previously; the threshold generation object detectable and background removal means comprises a threshold generation means, when receiving a command for calculating threshold after the mean value and the standard deviation of the prescribed characteristic value by way of the background in the whole sectional image had been estimated, a first threshold is obtained in such a way that it causes a standard deviation multiplied by a constant given beforehand to be subtracted from the mean value by using the mean value and the standard deviation of the prescribed characteristic by way of the estimated background in the whole sectional images for the sake of detecting object and removing background, and a second threshold is obtained in such a way that it causes a standard deviation multiplied by a constant given beforehand to be added to the mean value, thus the first and the second threshold are calculated over whole picture to be outputted, and a threshold processing means taking pixels involved between two thresholds to be a background, and taking another pixels to be an object of detection target by using the two thresholds.

According to a fourth sixth aspect of the invention, there is provided a device of object detectable and background removal for enabling an object to be automatically detected minutely and accurately as far as contours, wherein the background sectional image selection means comprises a skewness threshold background only sectional image selection means judging to be outputted the sectional image whose absolute value of skewness is less than the threshold given beforehand among the sectional images as a sectional image whose probability of including only a background with the mean value and the standard deviation of the prescribed characteristic value of the sectional image and the skewness of the sectional image as inputs, a background only sectional image selection means outputting a sectional image having a standard deviation whose difference between the standard deviation thereof and the standard deviation of the prescribed characteristic value of the sectional image whose probability of including only the background is less than threshold given beforehand and whose absolute value of skewness is less than the threshold as a sectional image including only the background while comparing a standard deviation of the prescribed characteristic value of the sectional image whose probability of including the background with the standard deviation of the prescribed characteristic value in another sectional images, and a background only sectional image statistic storage means storing the mean value and the standard deviation of the prescribed characteristic value of a location of the sectional image including only the background and the sectional image concerned to be outputted whenever necessary.

According to a forty seventh aspect of the invention, there is provided a device of object detectable and background removal for enabling an object to be automatically detected minutely and accurately as far as contours, wherein the background sectional image selection means comprises a skewness threshold and minimum standard deviation reference background only sectional image selection means outputting sectional images whose absolute value of skewness is less than the threshold given beforehand and whose number is specified in order of smaller value of a standard deviation of the prescribed characteristic value as a sectional image whose probability of including only a background with a mean value and a standard deviation of the prescribed characteristic value of sectional images and a skewness of sectional images as inputs, a background only sectional image selection means outputting a sectional image having a standard deviation whose difference between the standard deviation thereof and the standard deviation of the prescribed characteristic value of the sectional image whose probability of including only the background is less than threshold given beforehand and whose absolute value of skewness is less than the threshold as a sectional image including only the background while comparing a standard deviation of the prescribed characteristic value of the sectional image whose probability of including the background with the standard deviation of the prescribed characteristic value in another sectional images, and a background only sectional image statistic storage means storing the mean value and the standard deviation of the prescribed characteristic value of a location of the sectional image including only the background and the sectional image concerned to be outputted whenever necessary.

According to a forty eighth aspect of the invention, there is provided a device of object detectable and background removal for enabling an object to be automatically detected minutely and accurately as far as contours, wherein the background sectional image selection means comprises a skewness threshold and standard deviation reference background only sectional image selection means outputting a sectional image whose absolute value of skewness is less than the threshold value and whose standard deviation is the most nearest value of the standard deviation of the prescribed characteristic value instructed beforehand among sectional images as a sectional image whose probability of including only the background with a mean value and a standard deviation of the prescribed characteristic value of sectional images and a skewness of sectional images as inputs, a background only sectional image selection means outputting a sectional image having a standard deviation whose difference between the standard deviation thereof and the standard deviation of the prescribed characteristic value of the sectional image whose probability of including only the background is less than threshold given beforehand and whose absolute value of skewness is less than the threshold as a sectional image including only the background while comparing a standard deviation of the prescribed characteristic value of the sectional image whose probability of including the background with the standard deviation of the prescribed characteristic value in another sectional images, and a background only sectional image statistic storage means storing the mean value and the standard deviation of the prescribed characteristic value of a location of the sectional image including only the background and the sectional image concerned to be outputted whenever necessary.

According to a forty ninth aspect of the invention, there is provided a device of object detectable and background removal for enabling an object to be automatically detected minutely and accurately as far as contours, wherein the background sectional image selection means comprises a skewness threshold and standard deviation reference background only sectional image selection means outputting a sectional image whose absolute value of skewness is less than the threshold value and whose number is specified in order of nearer value to the standard deviation of the prescribed characteristic value instructed beforehand among sectional images as a sectional image whose probability of including only the background with a mean value and a standard deviation of the prescribed characteristic value of sectional images and a skewness of sectional images as inputs, a background only sectional image selection means outputting a sectional image having a standard deviation whose difference between the standard deviation thereof and the standard deviation of the prescribed characteristic value of the sectional image whose probability of including only the background is less than threshold given beforehand and whose absolute value of skewness is less than the threshold as a sectional image including only the background while comparing a standard deviation of the prescribed characteristic value of the sectional image whose probability of including the background with the standard deviation of the prescribed characteristic value in another sectional images, and a background only sectional image statistic storage means storing the mean value and the standard deviation of the prescribed characteristic value of a location of the sectional image including only the background and the sectional image concerned to be outputted whenever necessary.

According to a fiftieth aspect of the invention, there is provided a device of object detectable and background removal for enabling an object to be automatically detected minutely and accurately as far as contours, wherein the background sectional image selection means comprises a skewness threshold and mean value and standard deviation reference background only sectional image selection means outputting a sectional image whose absolute value of skewness is less than the threshold value and whose mean value and standard deviation are of the most nearest values of the mean value and standard deviation of the prescribed characteristic value instructed beforehand among sectional images as a sectional image whose probability of including only the background with a mean value and a standard deviation of the prescribed characteristic value of sectional images and a skewness of sectional images as inputs, a background only sectional image selection means outputting a sectional image having a standard deviation whose difference between the standard deviation thereof and the standard deviation of the prescribed characteristic value of the sectional image whose probability of including only the background is less than threshold given beforehand and whose absolute value of skewness is less than the threshold as a sectional image including only the background while comparing a standard deviation of the prescribed characteristic value of the sectional image whose probability of including the background with the standard deviation of the prescribed characteristic value in another sectional images, and a background only sectional image statistic storage means storing the mean value and the standard deviation of the prescribed characteristic value of a location of the sectional image including only the background and the sectional image concerned to be outputted whenever necessary.

According to a fifty first aspect of the invention, there is provided a device of object detectable and background removal for enabling an object to be automatically detected minutely and accurately as far as contours, wherein the background sectional image selection means comprises a skewness threshold and mean value and standard deviation reference background only sectional image selection means outputting a sectional image whose absolute value of skewness is less than the threshold value and whose number is specified in order of nearer value of the mean value and the standard deviation of the prescribed characteristic value instructed beforehand among sectional images as a sectional image whose probability of including only the background with a mean value and a standard deviation of the prescribed characteristic value of sectional images and a skewness of sectional images as inputs, a background only sectional image selection means outputting a sectional image having a standard deviation whose difference between the standard deviation thereof and the standard deviation of the prescribed characteristic value of the sectional image whose probability of including only the background is less than threshold given beforehand and whose absolute value of skewness is less than the threshold as a sectional image including only the background while comparing a standard deviation of the prescribed characteristic value of the sectional image whose probability of including the background with the standard deviation of the prescribed characteristic value in another sectional images, and a background only sectional image statistic storage means storing the mean value and the standard deviation of the prescribed characteristic value of a location of the sectional image including only the background and the sectional image concerned to be outputted whenever necessary.

According to a fifty second aspect of the invention, there is provided a device of object detectable and background removal for enabling an object to be automatically detected minutely and accurately as far as contours, wherein the background sectional image selection means comprises a skewness threshold background only sectional image selection means outputting a sectional image whose absolute value of skewness is less than the threshold given beforehand and whose probability of including only background is of the most highest value among sectional images as a sectional image whose probability of including only a background with a mean value and a standard deviation of the prescribed characteristic value of sectional images and skewness of sectional images, and probability of including only a background given in every sectional images within the area instructed beforehand as inputs, a background only sectional image selection means outputting a sectional image having a standard deviation whose difference between the standard deviation thereof and the standard deviation of the prescribed characteristic value of the sectional image whose probability of including only the background is less than threshold given beforehand and whose absolute value of skewness is less than the threshold as a sectional image including only the background while comparing a standard deviation of the prescribed characteristic value of the sectional image whose probability of including the background with the standard deviation of the prescribed characteristic value in another sectional images, and a background only sectional image statistic storage means storing the mean value and the standard deviation of the prescribed characteristic value of a location of the sectional image including only the background and the sectional image concerned to be outputted whenever necessary.

According to a fifty third aspect of the invention, there is provided a device of object detectable and background removal for enabling an object to be automatically detected minutely and accurately as far as contours, wherein the background sectional image selection means comprises a skewness threshold background only sectional image selection means outputting a sectional image whose absolute value of skewness is less than the threshold given beforehand and whose probability of including only background is of the most highest value among sectional images as a sectional image whose probability of including only a background with a mean value and a standard deviation of the prescribed characteristic value of sectional images and skewness of sectional images, and probability of including only a background given in every sectional images within the area instructed beforehand as inputs, a background only sectional image selection means outputting a sectional image having a standard deviation whose difference between the standard deviation thereof and the standard deviation of the prescribed characteristic value of the sectional image whose probability of including only the background is less than threshold given beforehand and whose absolute value of skewness is less than the threshold as a sectional image including only the background while comparing a standard deviation of the prescribed characteristic value of the sectional image whose probability of including the background with the standard deviation of the prescribed characteristic value in another sectional images, and a background only sectional image statistic storage means storing the mean value and the standard deviation of the prescribed characteristic value of a location of the sectional image including only the background and the sectional image concerned to be outputted whenever necessary.

According to fifty fourth aspect of the invention, there is provided a device of object detectable and background removal for enabling an object to be automatically detected minutely and accurately as far as contours, wherein the background sectional image selection means comprises a background exception sectional image selection means, when a command for investigating sectional images including images with the exception of a background, investigating a mean value and a standard deviation of the sectional image including only the background and a mean value and a standard deviation of the prescribed characteristic value by way of estimated background of another sectional images, if there exists a sectional image whose mean value and standard deviation of the prescribed characteristic value by way of the background is not estimated, outputting the sectional image concerned, while if the mean value and the standard deviation of the prescribed characteristic value by way of the background in terms of whole sectional images are estimated, issuing a command so as to generate a threshold for the sake of object detectable and background removal, a neighborhood background only sectional image existence judgement means investigating all of mean values and standard deviations of the prescribed characteristic values both of sectional images including images with the exception of backgrounds and sectional images including only background located in the neighborhood of the sectional images, and mean values and standard deviations of the prescribed characteristic value by way of the estimated background of another sectional images, even though when there exists only one sectional image whose mean value and standard deviation of the prescribed characteristic value in the neighborhood, issuing a command so as to estimate a mean value and a standard deviation of the prescribed characteristic value of the sectional image including images with the exception of the background, while when there exist no sectional image whose mean value and standard deviation of the prescribed characteristic value are estimated, issuing a command so as to select next sectional image, a mean value and standard deviation interpolation extrapolation means, when receiving a command for estimating a mean value and a standard deviation of the prescribed characteristic value in the sectional image including images with the exception of the background, thus estimating to be outputted by averaging the mean value and the standard deviation of the prescribed characteristic value of the sectional image including only the background in the neighborhood thereof, and by averaging the mean value and the standard deviation of the prescribed characteristic value by way of the estimated background of the sectional image in the neighborhood thereof, simultaneously outputting an estimated sectional image selection command signal so as to select next sectional image, and an estimated statistic storage means storing to be outputted the mean value and the standard deviation of the prescribed characteristic value estimated previously, thus selecting a sectional image whose probability of including only a background is high from sectional images involved within areas instructed beforehand.

According to a fifty fifth aspect of the invention, there is provided a device of object detectable and background removal for enabling an object to be automatically detected minutely and accurately as far as contours, wherein the background sectional image selection means selects a sectional image whose probability of including only a background is high from sectional images involved within a plurality of areas instructed beforehand.

According to fifty sixth aspect of the invention, there is provided a device of object detectable and background removal for enabling an object to be automatically detected minutely and accurately as far as contours, wherein the background statistic estimation means comprises a center of gravity location calculation means outputting a location of the center of gravity as a location of the center of gravity of an object of detection target while investigating the mean value and the standard deviation of the prescribed characteristic value in the sectional images including only the background, and while calculating a location of the center of gravity with a location of sectional images without a mean value and a standard deviation of the prescribed characteristic value investigated, a sectional image to center of gravity location distance calculation means calculating to be outputted a distance between a location of center pixel of respective sectional images and the location of the center of gravity concerned, with the location of the center of gravity of the object of detection target, a background exception sectional image selection means, when a command for investigating sectional images including images with the exception of a background, investigating a mean value and a standard deviation of the prescribed characteristic value of the sectional image including only the background and a mean value and a standard deviation of the prescribed characteristic value by way of estimated background of another sectional images, if there exists a sectional image whose mean value and standard deviation of the prescribed characteristic value by way of the background is not estimated, outputting the sectional image concerned, while if the mean value and the standard deviation of the prescribed characteristic value by way of the background in respect to whole sectional images are instructed, issuing a command so as to generate a threshold for the sake of object detectable and background removal, a neighborhood background only sectional image existence judgement means investigating all of mean values and standard deviations of the prescribed characteristic values both of sectional images including images with the exception of backgrounds and sectional images including only background located in the neighborhood of the sectional images, and mean values and standard deviations of the prescribed characteristic value by way of the estimated background of another sectional images, even though when there exists only one sectional image whose mean value and standard deviation of the prescribed characteristic value in the neighborhood, issuing a command so as to estimate a mean value and a standard deviation of the prescribed characteristic value of the sectional image including images with the exception of the background, while when there exist no sectional image whose mean value and standard deviation of the prescribed characteristic value are estimated, issuing a command so as to select next sectional image, a mean value and standard deviation interpolation/extrapolation means, when receiving a command for estimating a mean value and a standard deviation of the prescribed characteristic value in the sectional image including images with the exception of the background, thus estimating to be outputted by averaging the mean value and the standard deviation of the prescribed characteristic value of the sectional image including only the background in the neighborhood thereof, and by averaging the mean value and the standard deviation of the prescribed characteristic value by way of the estimated background of the sectional image in the neighborhood thereof, simultaneously outputting an estimated sectional image selection command signal so as to select next sectional image, and an estimated statistic storage means storing to be outputted the mean value and the standard deviation of the prescribed characteristic value estimated previously.

According to fifty seventh aspect of the invention, there is provided a device of object detectable and background removal for enabling an object to be automatically detected minutely and accurately as far as contours, wherein the background statistic estimation means comprises a background exception sectional image selection means, when receiving a command for investigating sectional images including images with the exception of a background, investigating a mean value and a standard deviation of the sectional image including only the background and a mean value and a standard deviation of the prescribed characteristic value by way of the estimated background of another sectional images, if there exists a sectional image whose mean value and standard deviation of the prescribed characteristic value by way of the background is not estimated, outputting the sectional image concerned, while if the mean value and the standard deviation of the prescribed characteristic value by way of the background in terms of whole sectional images are estimated, issuing a command so as to generate a threshold for the sake of object detectable and background removal, a neighborhood background only sectional image existence judgement means investigating all of mean values and standard deviations of the prescribed characteristic values both of sectional images including images with the exception of backgrounds and sectional images including only background located in the neighborhood of the sectional images, and mean values and standard deviations of the prescribed characteristic value by way of the estimated background of another sectional images, even though when there exists only one sectional image whose mean value and standard deviation of the prescribed characteristic value by way of the background among the sectional images to be neighborhood relationship given beforehand in every respective sectional images, issuing a command so as to estimate a mean value and a standard deviation of the prescribed characteristic value of the sectional image including images with the exception of the background, while when there exist no sectional image whose mean value and standard deviation of the prescribed characteristic value are estimated, issuing a command so as to select next sectional image, a mean value and standard deviation interpolation extrapolation means, when receiving a command for estimating a mean value and a standard deviation of the prescribed characteristic value in the sectional image including images with the exception of the background, estimating to be outputted signal of a mean value and a standard deviation by averaging the mean value and the standard deviation of the prescribed characteristic value of the sectional image including only the background in the neighborhood thereof, and by averaging the mean value and the standard deviation of the prescribed characteristic value by way of the estimated background of the sectional image in the neighborhood thereof, simultaneously outputting an estimated sectional image selection command signal so as to select next sectional image, and an estimated statistic storage means storing to be outputted the mean value and the standard deviation of the prescribed characteristic value estimated previously.

According to a fifty eighth aspect of the invention, there is provided a device of object detectable and background removal for enabling an object to be automatically detected minutely and accurately as far as contours, wherein the background statistic estimation means comprises a background exception pixel selection means scanning a pixel successively in order of the command in every reception for investigating next pixel, when the pixel which is watched agrees with the center pixel of the sectional image including only the back ground, causing the mean value and the standard deviation of the prescribed characteristic value to be the statistic of the pixel in the sectional image including only the background, while when the pixel which is watched disagrees with the center pixel of the sectional image including only the back ground, outputting the location of the pixel, subsequently in case where the scanning is completed in terms of the whole pixels, issuing a command so as to generate a threshold for the sake of an object detectable and background removal, a background exception pixel distance calculation means calculating to be outputted a distance between the location of pixel which is watched and the location of the center pixel of the whole sectional images including only the background, a mean value and standard deviation interpolation extrapolation means implementing estimation of a mean value and a standard deviation of the prescribed characteristic value by way of the background in the watched location of the pixel, due to the fact that the mean value and standard deviation of the prescribed characteristic value of the sectional image including only the background are weighted to average in answer to the location of center pixel and watched location of pixel and the corresponding distance, thus issuing a command so as to select next pixel, and an estimated statistic storage means storing the mean value and the standard deviation of the prescribed characteristic value by way of the estimated background, and the mean value and the standard deviation of the prescribed characteristic value in the location of the center pixel of the sectional image including only the background, thus outputting whenever necessary.

According to a fifty ninth aspect of the invention, there is provided a device of object detectable and background removal for enabling an object to be automatically detected minutely and accurately as far as contours, wherein the background statistic estimation means comprises a center of gravity location calculation means which investigates the mean value and the standard deviation of the prescribed characteristic value in the sectional images including only a background, subsequently, which investigates a location of a sectional image having no mean value and no standard deviation of the prescribed characteristic value to calculate a location of the center of gravity, thus outputting it by way of a location of the center of gravity of an object of detection target, a background exception pixel selection means scanning a pixel successively in order of the command in every reception for investigating next pixel, when the pixel which is watched agrees with the center pixel of the sectional image including only the back ground, causing the mean value and the standard deviation of the prescribed characteristic value to be the statistic of the pixel in the sectional image including only the background, while when the pixel which is watched disagrees with the center pixel of the sectional image including only the back ground, outputting the location of the pixel, subsequently in case where the scanning is completed in terms of the whole pixels, issuing a command so as to generate a threshold for the sake of an object detectable and background removal, a background only sectional image center pixel selection means supposing a straight line connecting the watched pixel and the location of the center of gravity of the object, and a half straight line located at opposite side of the location of the center of gravity of the object from the pixel on the straight line, subsequently, selecting whole center pixels of the sectional image including only the background, which sectional image intersected location is located on the half straight line while dropping a perpendicular to the straight line from the center pixel of the sectional image including only the background, a background exception pixel distance calculation means calculating to be outputted a distance between the watched location of the pixel and the location of center pixel of the selected sectional image including only the background, a mean value and standard deviation interpolation extrapolation means implementing estimation of a mean value and a standard deviation of the prescribed characteristic value by way of the background in the watched location of the pixel, due to the fact that the mean value and standard deviation of the prescribed characteristic value of the sectional image including only the background are weighted to average in answer to the location of center pixel and watched location of pixel and the corresponding distance, thus issuing a command so as to select next pixel, and an estimated statistic storage means storing the mean value and the standard deviation of the prescribed characteristic value by way of the estimated background, and the mean value and the standard deviation of the prescribed characteristic value in the location of the center pixel of the sectional image including only the background, thus outputting whenever necessary.

According to a sixtieth aspect of the invention, there is provided a device of object detectable and background removal for enabling an object to be automatically detected minutely and accurately as far as contours, wherein the background statistic estimation means does not possess a center of gravity location calculation means but a location of the center of gravity of an object to be the center of gravity of the object is given beforehand.

According to a sixty first aspect of the invention, there is provided a device of object detectable and background removal for enabling an object to be automatically detected minutely and accurately as far as contours, wherein the threshold generation object detectable and background removal means comprises a threshold generation means, when receiving a command for calculating threshold after the mean value and the standard deviation of the prescribed characteristic value by way of the background in the whole partial image had been estimated, a first threshold is obtained in such a way that it causes a standard deviation multiplied by a constant given beforehand to be subtracted from the mean value by using the mean value and the standard deviation of the prescribed characteristic by way of the estimated background in the whole sectional images for the sake of detecting object and removing background, and a second threshold is obtained in such a way that it causes a standard deviation multiplied by a constant given beforehand to be added to the mean value, thus the first and the second threshold are calculated over whole picture to be outputted, a threshold processing means taking pixels involved between two thresholds to be a background, a background candidate area detection means detecting area connecting together to the pixel judged as the background, by way of an area to be candidate of a background, and a background judgement means taking a candidate area including the greatest number of sectional images whose probability of including only the background is high to be background areas and taking another candidate areas to be target objects.

According to a sixty second aspect of the invention, there is provided a device of object detectable and background removal for enabling an object to be automatically detected minutely and accurately as far as contours, wherein the threshold generation object detectable and background removal means comprises a threshold generation means, when receiving a command for calculating threshold after the mean value and the standard deviation of the prescribed characteristic value by way of the background in the whole partial image had been estimated, a first threshold is obtained in such a way that it causes a standard deviation multiplied by a constant given beforehand to be subtracted from the mean value by using the mean value and the standard deviation of the prescribed characteristic by way of the estimated background in the whole sectional images for the sake of detecting object and removing background, and a second threshold is obtained in such a way that it causes a standard deviation multiplied by a constant given beforehand to be added to the mean value, thus the first and the second threshold are calculated over whole picture to be outputted, a threshold processing means taking pixels involved between two thresholds to be a background, a background candidate area detection means detecting area connecting together to the pixel judged as the background, by way of an area to be candidate of a background, and a background judgement means taking a candidate area including the greatest number of sectional images including only the background to be background areas and taking another candidate areas to be target objects.

According to a sixty third aspect of the invention, there is provided a device of object detectable and background removal for enabling an object to be automatically detected minutely and accurately as far as contour, wherein the threshold generation object detectable and background removal means comprises a threshold generation means, when receiving a command for calculating threshold after the mean value and the standard deviation of the prescribed characteristic value by way of the background in the whole partial image had been estimated, a first threshold is obtained in such a way that it causes a standard deviation multiplied by a constant given beforehand to be subtracted from the mean value by using the mean value and the standard deviation of the prescribed characteristic by way of the estimated background in the whole sectional images for the sake of detecting object and removing background, and a second threshold is obtained in such a way that it causes a standard deviation multiplied by a constant given beforehand to be added to the mean value, thus the first and the second threshold are calculated over whole picture to be outputted, a threshold processing means taking pixels involved between two thresholds to be a background, a background candidate area detection means detecting area connecting together to the pixel judged as the background, by way of an area to be candidate of a background, and a background judgement means taking a candidate area including the smallest number of sectional images including images with the exception of backgrounds to be background areas and taking another candidate areas to be target objects.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 7 is a view explaining neighborhood of the sectional image of processing for estimating the background and the distribution thereof;

FIG. 20 is a view explaining edge detection processing.

DETAILED DESCRIPTION OF THE PREFERRED EMBODIMENTS

A preferred embodiment of method and device of an object detectable and background removal and storage media for storing program thereof according to the present invention will be described in detail referring to the accompanying drawings. Referring to FIGS. 3 to 20, there is shown the embodiment of the method and device of the object detectable and background removal and storage media for storing program thereof of the present invention.

First Embodiment

Figure 1:
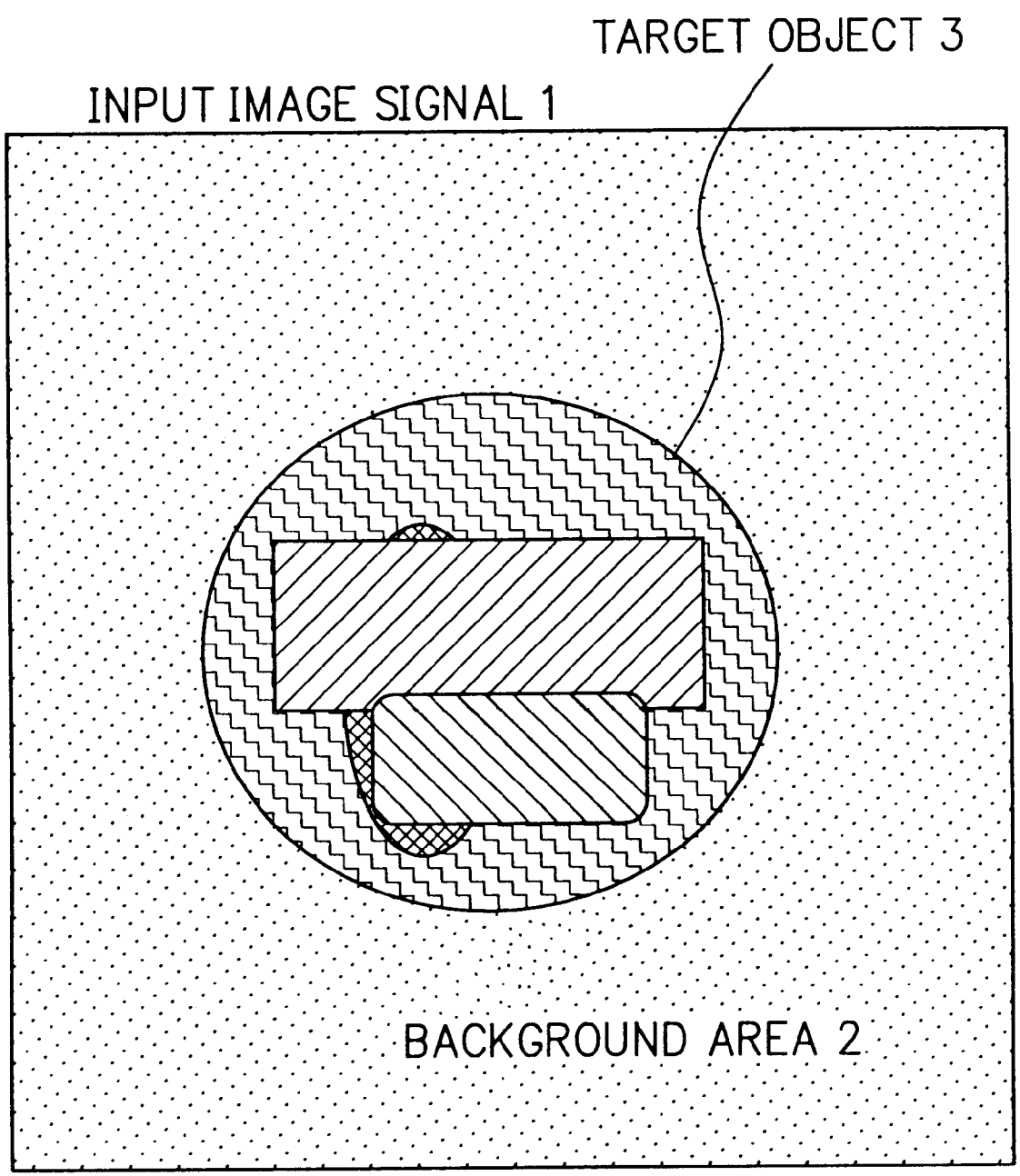
FIG. 1 is an explanation view showing one embodiment of an image of input image signal.
Figure 3:
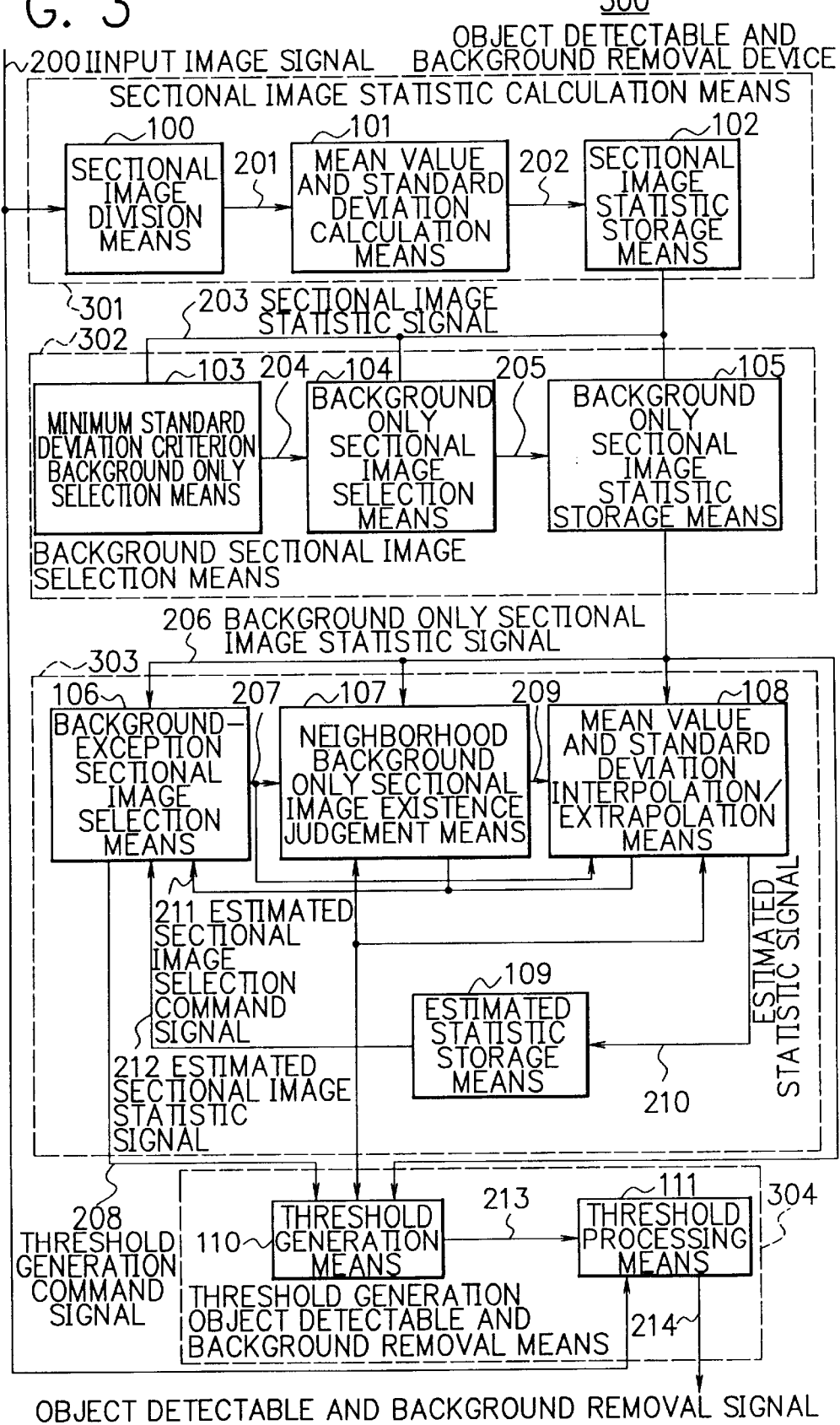
FIG. 3 is a block diagram showing a first embodiment of an object detectable and background removal device of the present invention.

FIG. 3 is a block diagram showing configuration of a first embodiment of an object detectable and background removal device according to the present invention. Supposing the input image signal 1 as shown in FIG. 1 is inputted by way of an input image signal 200. The present object detectable and background removal device 300 roughly comprises four means of a sectional image statistic calculation means 301, a background sectional image selection means 302, a background statistic estimation means 303, and a threshold generation object detectable and background removal means 304.

Figure 4:
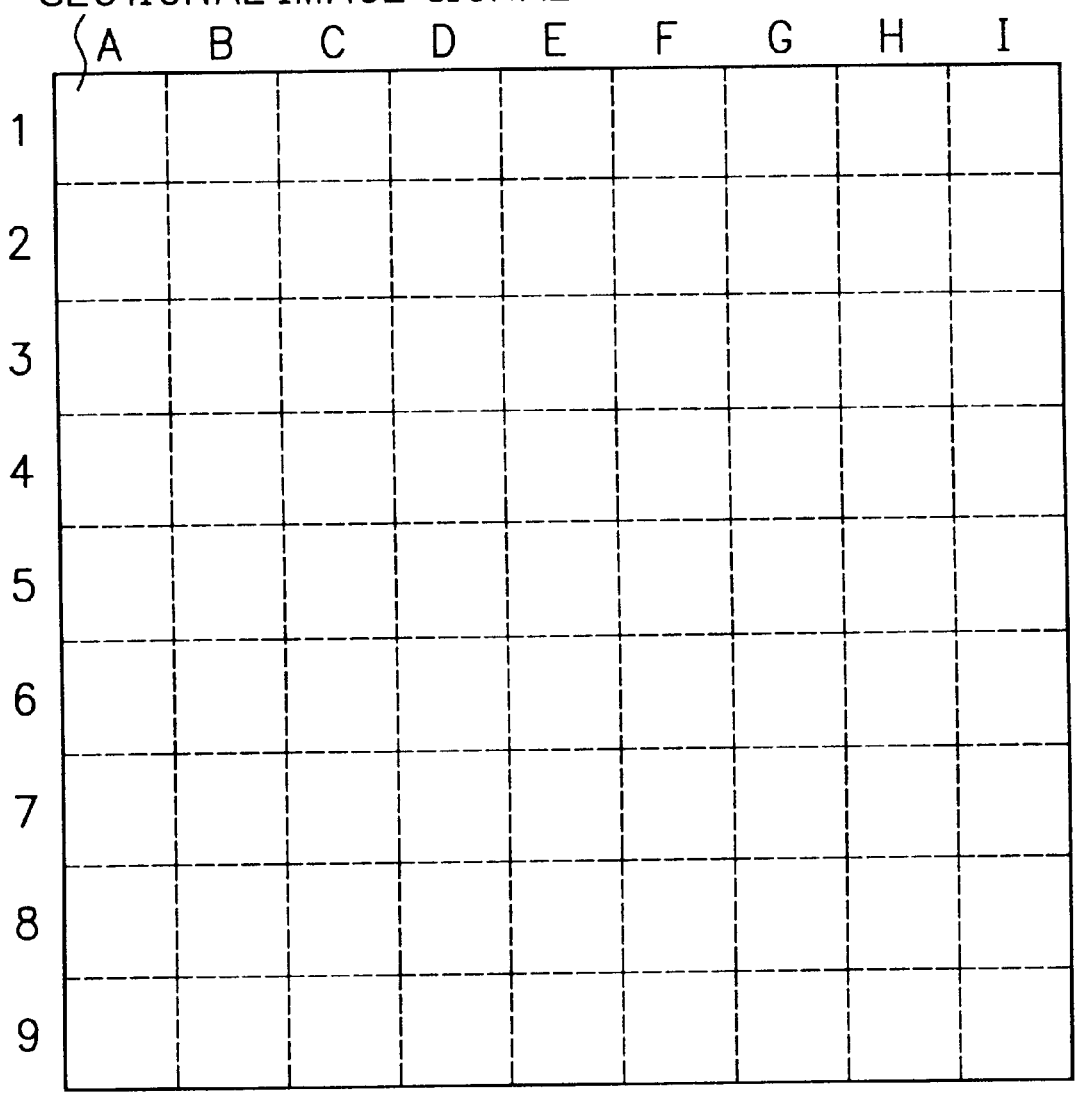
FIG. 4 is an explanation view showing an example of division into sectional image, the sectional image in the drawing is specified by row and column as 1-A and so forth.
Figure 5:
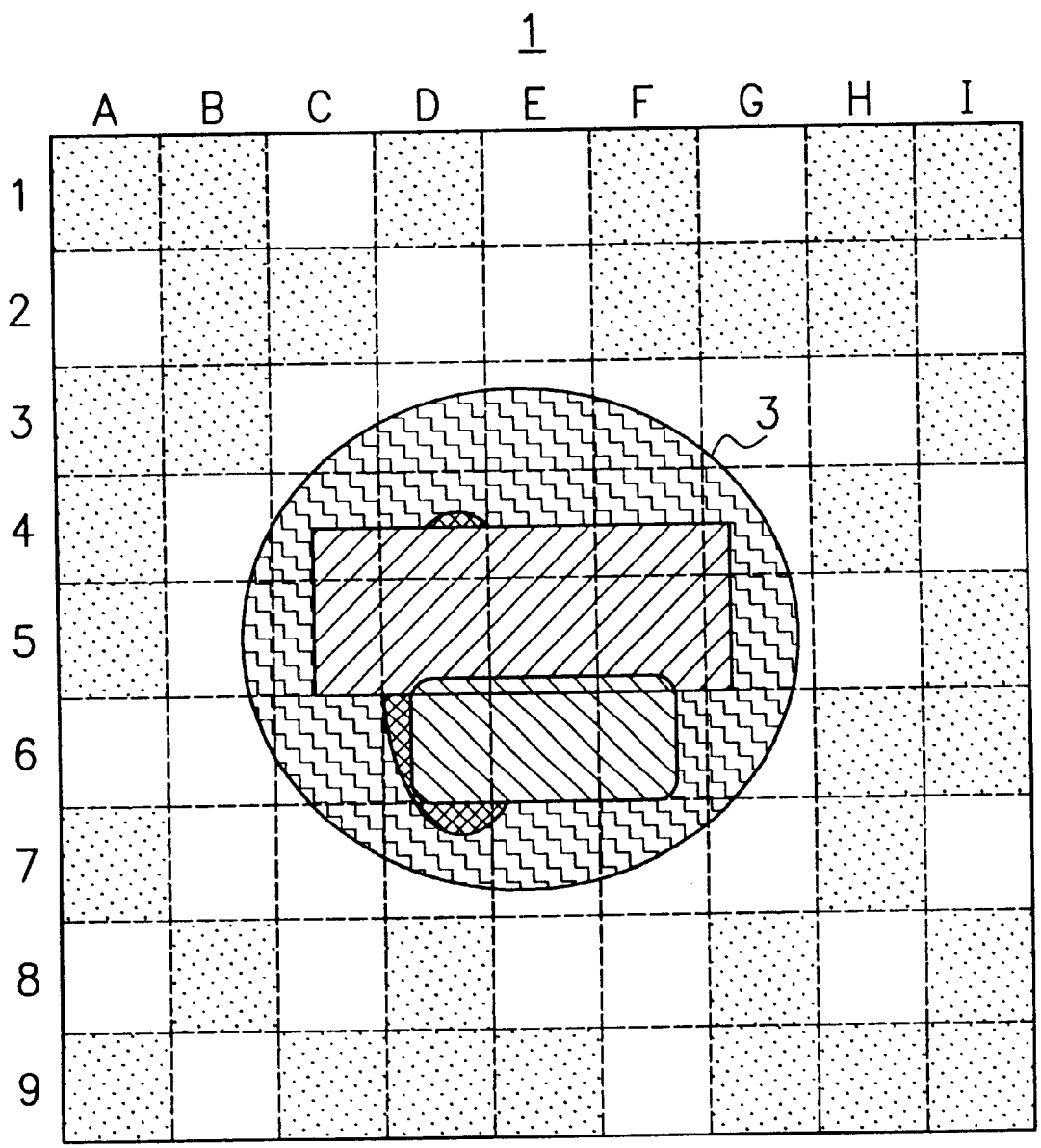
FIG. 5 is an explanation view showing one example of processing result judging whether or not the sectional image is the background.
Figure 6:
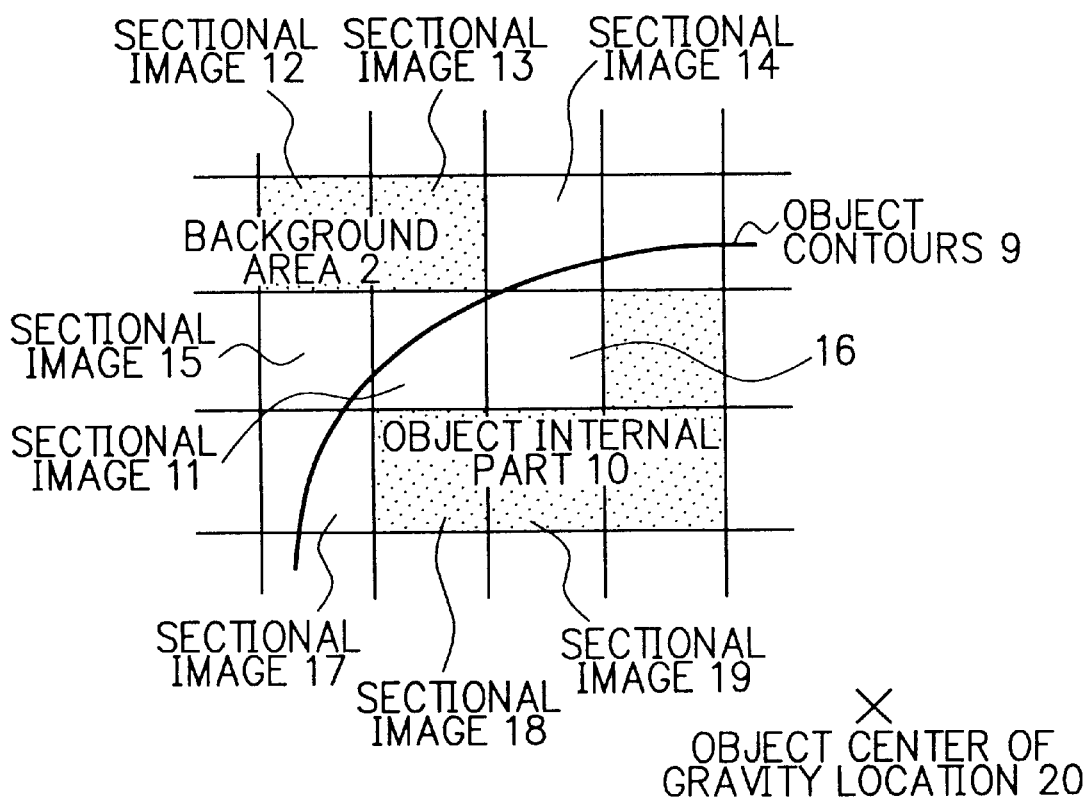
FIG. 6 is an explanation view showing one example of processing for estimating the background and the distribution thereof.
Figure 8:
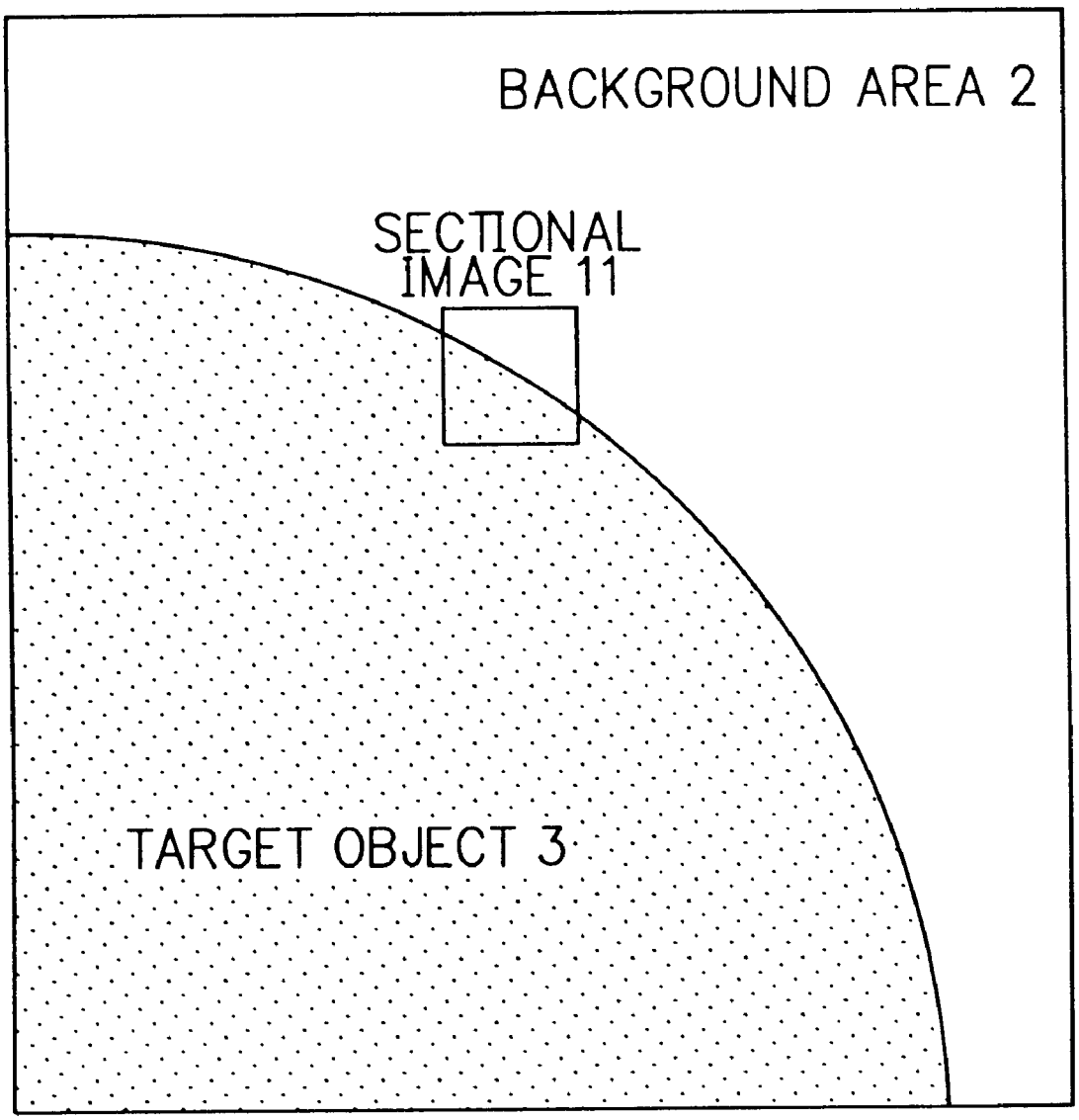
FIG. 8 is an explanation view showing one example of processing for estimating the background and the distribution thereof.
Figure 9:
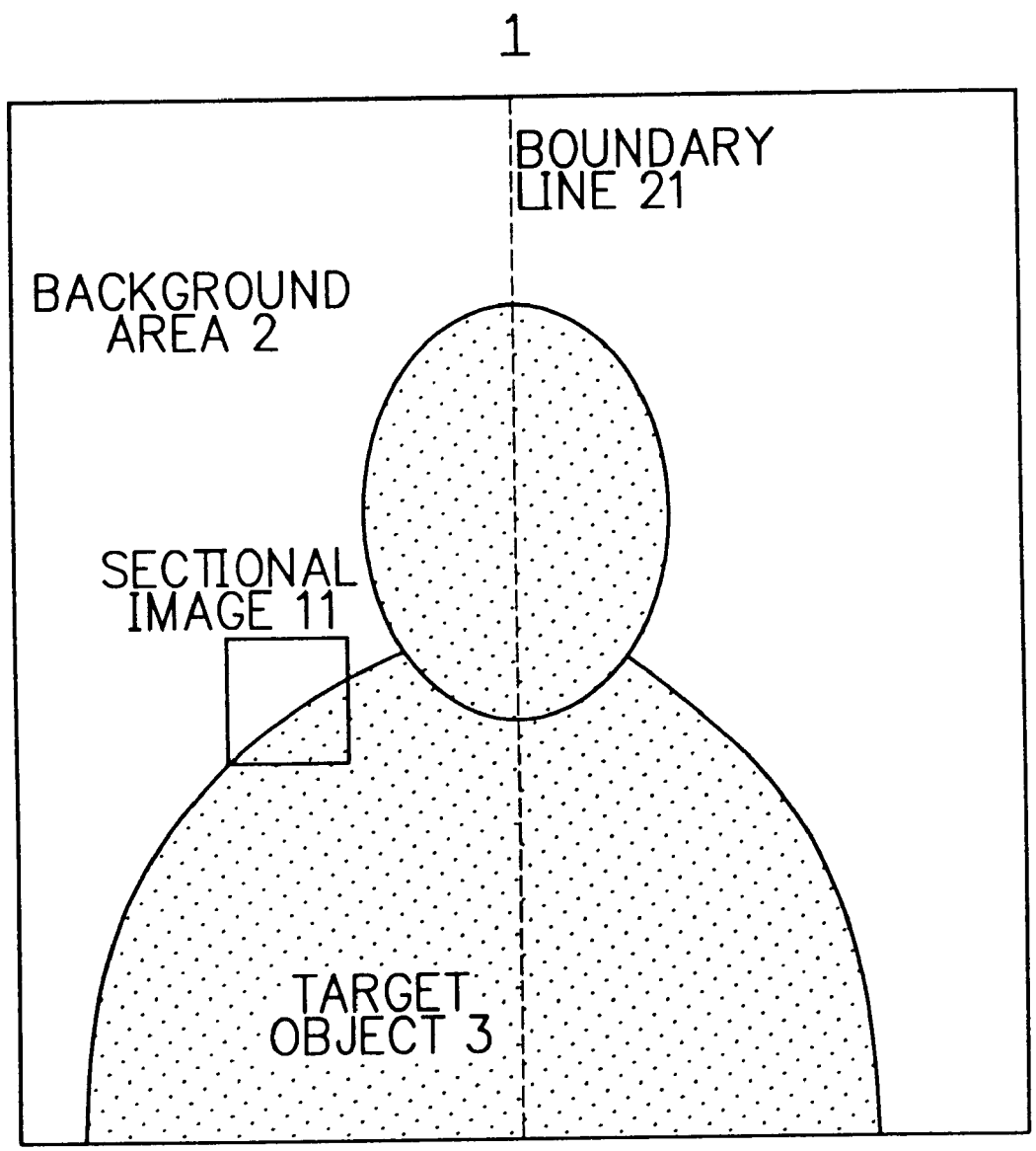
FIG. 9 is an explanation view showing one example of processing for estimating the background and the distribution thereof.
Figure 10:
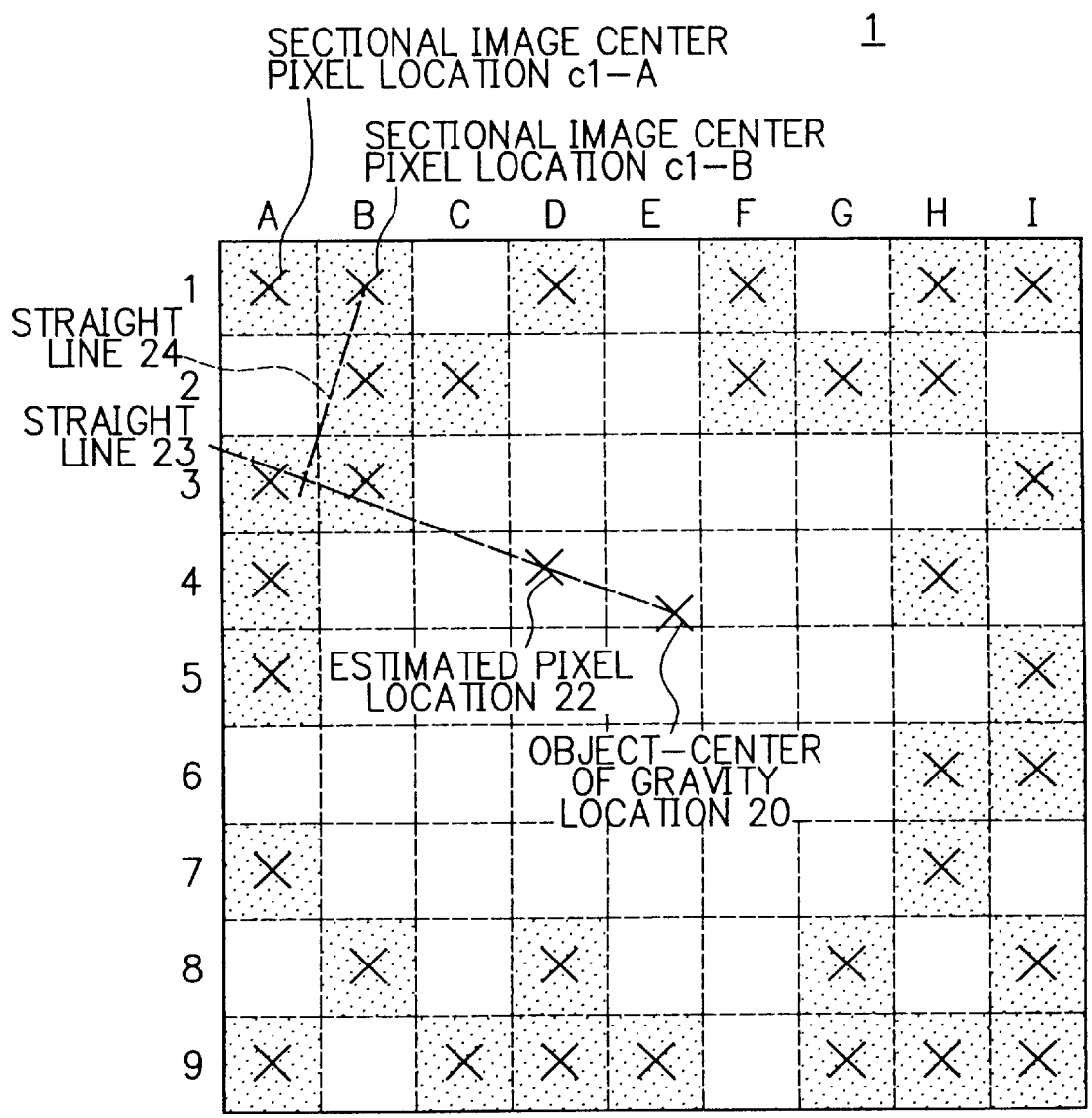
FIG. 10 is an explanation view showing one example of processing for estimating the background and the distribution thereof, and a center pixel location of the sectional image in the drawing is specified by row and column.

The sectional image statistic calculation means 301 consists of respective configuration elements such as a sectional image division means 100, a mean value and standard deviation calculation means 101, and a sectional image statistic storage means 102. The sectional image division means 100 of these configuration elements inputs the input image signal 200, as shown in FIG. 4, to divide the image into tile shaped sectional image, thus outputting the sectional images 1-A, 2-A, 3-A in order, by way of a sectional image signal 201. The mean value and standard deviation calculation means 101 inputs the sectional image signal 201, to calculate a mean value and standard deviation of the brightness in every respective sectional images based on the respective equations (3) and (4), thus outputting them by way of sectional image statistic signal 202. The sectional image statistic storage means 102 stores the mean value of the brightness and the standard deviation of the respective sectional images with the sectional image statistic signal 202 as the input, thus outputting it by way of the sectional image statistic signal 203 whenever it is necessary.

The background sectional image selection means 302 consists of respective configuration elements such as a minimum standard deviation criterion background only sectional image selection means 103, a background only sectional image selection means 104, and a background only sectional image statistic storage means 105. The minimum standard deviation criterion background only sectional image selection means 103 of these configuration elements 103 inputs the sectional image statistic signal 203, judging the sectional image whose standard deviation of brightness is of the most smallest value among the sectional images to be the sectional image whose probability of including only the background is high, thus outputting the sectional image by way of the sectional image signal 204 having only high probability background. The background only sectional image selection means 104 inputs both of the high probability background only sectional image signal 204 and the sectional image statistic signal 203, thus comparing the standard deviation of the brightness of the sectional image whose probability of including only the background with the standard deviation of the brightness in another sectional image based on the equation (5). The result of this comparison, it causes the background only sectional image signal 205 to be outputted while regarding the sectional image having the standard deviation of the brightness within the threshold determined beforehand as the sectional image including only the background. The background only sectional image statistic storage means 105 inputs both of the background only sectional image signal 205 and the sectional image statistic signal 203, to store the mean value and the standard deviation of the brightness of the sectional image which is judged that only the background is included therein, thus outputting it by way of the background only sectional image statistic signal 206 whenever it is necessary.

The background statistic estimation means 303 consists of respective configuration elements such as a background-exception sectional image selection means 106, a neighborhood background only sectional image existence judgement means 107, a mean value and standard deviation interpolation/extrapolation means 108, and a mean value and standard deviation storage means 109. In these configuration elements, the background-exception sectional image selection means 106 inputs the sectional image statistic signal 206, an estimation sectional image selection command signal 211, and an estimation sectional image statistic signal 212, thus investigating both of the background only sectional image statistic signal 206 and the estimated sectional image statistic signal 212 when the command of the investigation of the sectional image reaches thereto. When the sectional image whose mean value and the standard deviation of the brightness by way of the background are not yet estimated exists, outputting the sectional image by way of a background-exception sectional image signal, while when the mean value and standard deviation of the brightness by way of the background are estimated with respect to the whole sectional images, outputting a threshold generation command signal 208 so as to generate a threshold for the object detection and background removal. The neighborhood background only sectional image existence judgement means 107 investigates a mean value and a standard deviation of the brightness of the sectional image located neighborhood of the sectional image except the background, being specified by the background-exception sectional image signal, with the background-exception sectional image signal 207, the background only sectional image statistic signal 206, and the estimation sectional image statistic signal 212 as the inputs.

Supposing the watched sectional image is the sectional image 11 in FIG. 7, the neighborhoods are the sectional images located at the sectional images 12 to 19. In cases where even though one of the sectional images whose mean value and standard deviation of the brightness are estimated by way of the background exists in the neighborhood, outputting a background statistic estimation command signal 209 so as to estimate the mean value and the standard deviation of the sectional image specified by the background-exception sectional image signal 207, while when in another case, the neighborhood background only sectional image existence judgement means 107 outputs the estimated sectional image selection command signal 211 to select next sectional image.

The mean value and standard deviation interpolation/extrapolation means 108 inputs the background statistic estimation command signal 209, the background-exception sectional image signal 207, the estimated sectional image statistic signal 212, and the background only sectional image statistic signal 206. In these inputs, when the mean value and standard deviation interpolation/extrapolation means 108 receives the command from the background statistic estimation command signal 209, referring to the mean value and the standard deviation of the brightness by way of the background in the sectional image except the background specified by the background-exception sectional image signal 207. Further, the mean value and the standard deviation interpolation/extrapolation means 108 estimates the mean value and the standard deviation of the brightness by way of the background in the specified sectional image, by taking the average of the values shown in the equations (10), (11), and (12), while referring to the mean value and the standard deviation of the brightness of the sectional image estimated at the neighborhood. The estimated mean value and standard deviation of the brightness is outputted by way of the estimated statistic signal 210, simultaneously, outputting the estimated sectional image selection command signal 211 so as to select next sectional image. The estimated statistic storage means 109 inputs the estimated statistic signal 210, to store the mean value and the standard deviation of the brightness being estimated, thus outputting it by way of the estimated sectional image statistic signal 212.

The threshold generation object detectable and background removal means 304 consists of a threshold generation means 110 and a threshold processing means 111. In these configuration elements, the threshold generation means 110 inputs the threshold generation command signal 208, the estimation sectional image statistic signal 212, and the background only sectional image statistic signal 206. In these inputs, the mean value and the standard deviation of the brightness become complete by way of the background in the whole sectional images by the threshold generation command signal 208. Consequently, when the command for calculating the threshold enters therein, the threshold generation object detectable background removal means 304 calculates two thresholds over the whole picture by the equations (15), and (16) using the mean value and the standard deviation of the brightness in the whole sectional images, thus outputting it by way of the threshold signal 213. The threshold processing means 111 inputs the threshold signal 213 and the input image signal 200 to output an object detectable background removal signal 214 such that the pixel which the equation (17) becomes true is the background, and another pixel which comes to be a detection target is the object, while comparing input image with two thresholds by the equation (17).

Figure 2:
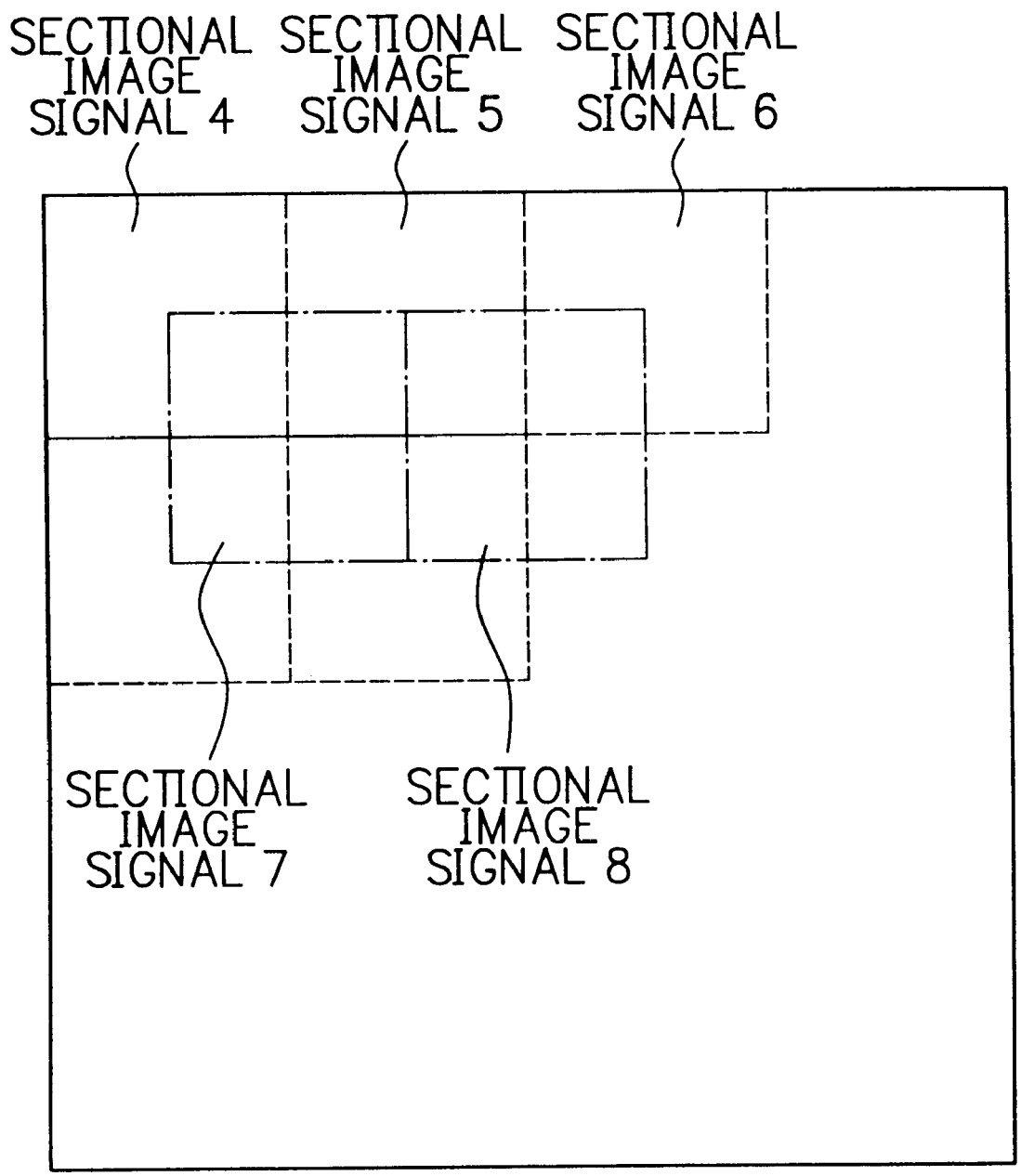
FIG. 2 is an explanation view showing one example of conventional object detection method.

In the present embodiment, the sectional image division means 100, as shown in FIG. 4, divides the image into tile-shaped sectional images. However, as shown in FIG. 2, the present invention is also capable of being constituted such that the sectional images are arranged so as to overlap with each other, and the sectional images are disengaged to be arranged with each other.

In the present embodiment, the background sectional image selection means 302 selects the sectional image whose standard deviation of the brightness is of the most smallest value as the sectional image whose probability of including only the background is high. However present method includes following various variations. For instances, the background sectional image selection means 302 causes the sectional images in answer to the specified number in order of the smaller value of the standard deviation of the brightness to be selected. The background sectional image selection means 302 causes the sectional image having the most nearest value to the standard deviation of the predirected brightness to be selected. The background sectional image selection means 302 causes the sectional image in answer to the specified number in order of the nearer number to the standard deviation of the brightness instructed beforehand to be selected. The background sectional image selection means 302 causes the sectional image having the most nearest value both to the mean value and the standard deviation of the brightness instructed beforehand to be selected. The background sectional image selection means 302 causes the sectional image in answer to the specified number in order of the nearer value to the mean value and the standard deviation of the brightness instructed beforehand to be selected. The background sectional image selection means 302 causes the predirected single or a plurality of sectional images instructed beforehand to be selected. It is capable of constituting effective invention in accordance with the target in any above described cases. Further, the sectional images which should become selection target are selected from the sectional images included in area instructed beforehand, or are selected from a plurality of the same areas as the instructed area respectively. It is also capable of constituting effective invention in accordance with the target in any above described selection.

Furthermore, the neighborhood background only sectional image existence judgement means 107 causes the sectional image which holds side and top in common to be defined by using FIG. 7 by way of the neighborhood of the sectional image. Somewhere else by way of the neighborhood, there is defined only the sectional image which hold the side in common, or there is defined that it causes the sectional image of the long distance to be included. These definitions enable effective invention to be constituted in accordance with the target.

Second Embodiment

Figure 11:
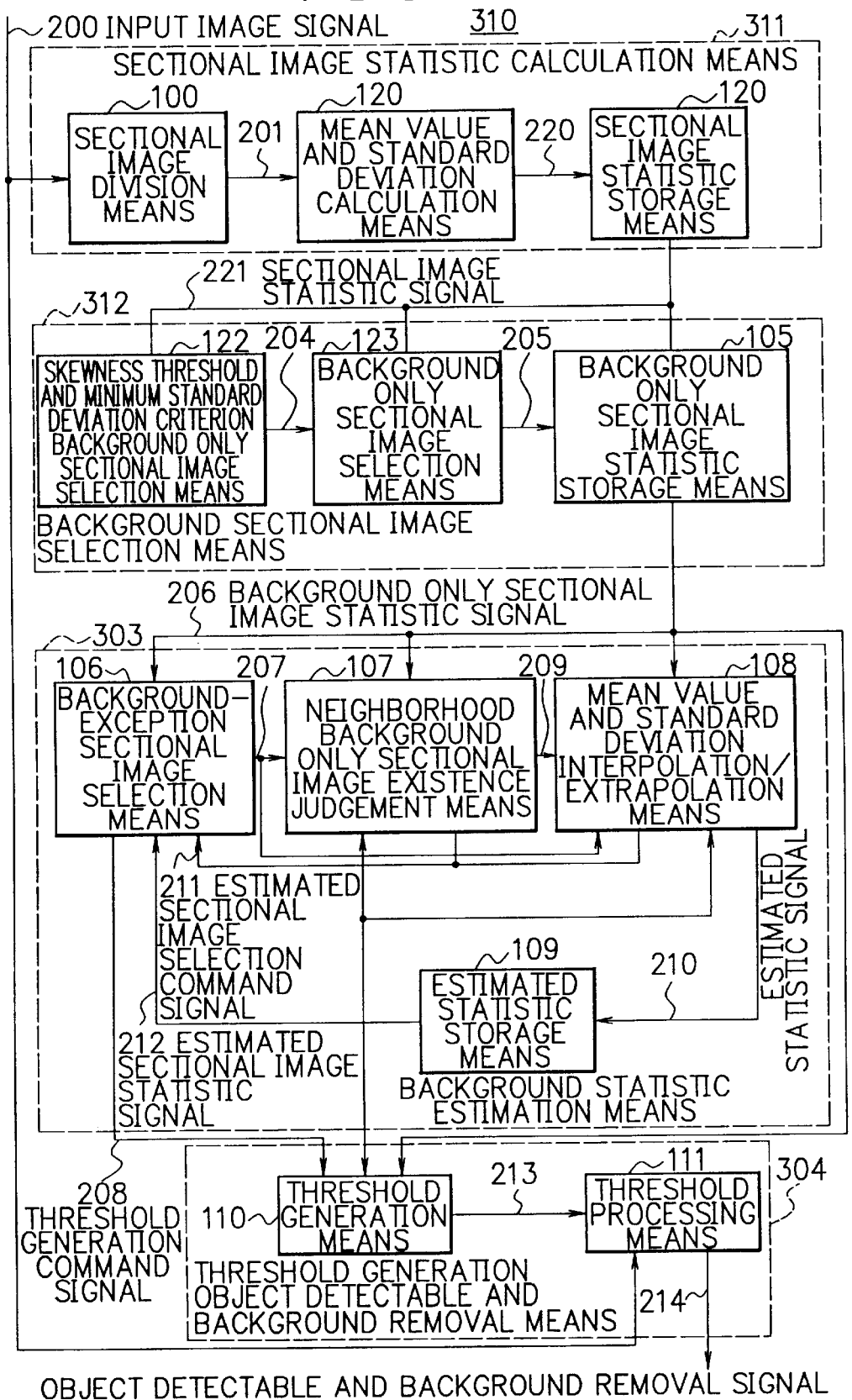
FIG. 11 is a block diagram showing a second embodiment.

FIG. 11 is a block diagram showing a configuration of a second embodiment of the object detectable and background removal device according to the present invention. Supposing the input image signal 1 as shown in FIG. 1 is inputted by way of an input image signal 200. The present object detectable and background removal device 310 roughly comprises four means of a sectional image statistic calculation means 311, a background sectional image selection means 312, a background statistic estimation means 303, and a threshold generation object detectable and background removal means 304. Among them, the background statistic estimation means 303, and the threshold generation object detectable and background removal means 304 are the same means as those of the first embodiment.

The sectional image statistic calculation means 311 consists of respective configuration elements such as a sectional image division means 100, a mean value and standard deviation and skewness calculation means 120, and a sectional image statistic storage means 121. In these configuration elements, the sectional image division means 100 inputs the input image signal 200, as shown in FIG. 4, to divide the image into tile shaped sectional images, thus outputting sectional images 1-A, 2-A, 3-A in order, by way of a sectional image signal 201. The mean value and standard deviation and skewness calculation means 120 inputs the sectional image signal 201, to calculate a mean value, a standard deviation, and a skewness of brightness in every respective sectional images based on respective equations (3), (4), and (7) thus outputting them by way of sectional image statistic signal 220. The sectional image statistic storage means 121 inputs the sectional image statistic signal 220, subsequently, storing the mean value, the standard deviation, and the skewness of the brightness of the respective sectional images, thus outputting signals by way of the sectional image statistic signal 221 whenever necessary.

The background sectional image selection means 312 consists of the respective constitution elements of the skewness threshold and minimum standard deviation background only sectional image selection means 122, the background only sectional image selection means 123, and the background only sectional image statistic storage means 105. In these constitution elements, the skewness threshold and minimum standard deviation background only sectional image selection means 122 inputs the sectional image statistic signal 221, thus regarding the sectional image whose skewness is judged as less than the threshold given beforehand based on the equation (8), and whose standard deviation of the brightness is the most smallest value as the sectional image whose probability of including only background is high. A high-probability background only sectional image signal 204 and the sectional image statistic signal 221 of the background sectional image are inputted, thus comparing the standard deviation of the brightness of the sectional image whose probability of including only background is high with the standard deviation of the brightness in another sectional images based on the equation (5). The result of the comparison, the sectional image whose standard deviation of the brightness is within the threshold and whose skewness is less than the threshold, is judged by the equation (8). The result of the judgement is taken to be the background only sectional image which is the sectional image including only the background. Further, the skewness threshold and minimum standard deviation background only sectional image selection means 122 inputs the background only sectional image signal 205 and the sectional image statistic signal 203, subsequently, storing the mean value and the standard deviation of the brightness of the sectional image judged that only background is included, thus outputting signal by way of the background only sectional image statistic signal 206 whenever necessary.

In the present embodiment, the background sectional image selection means 312 selects the sectional image whose absolute value of the skewness is less than the threshold and whose standard deviation of the brightness is of the most smallest value as the sectional image with high probability of including only the background. However present method includes following various variations. For instance, there is only one condition that the absolute value of the skewness is less than the threshold. In addition to the above condition of the skewness, the background sectional image selection means 312 causes the sectional images in answer to the specified number in order of the smaller value to the standard deviation to be selected. In addition to the above condition of the skewness, the background sectional image selection means 312 causes the sectional image having the most nearest value to the standard deviation of the predirected brightness to be selected. In addition to the above condition of the skewness, the background sectional image selection means 312 causes the sectional images in answer to the number specified in order of the nearer value to the standard deviation of the predirected brightness to be selected. In addition to the above condition of the skewness, the background sectional image selection means 312 causes the sectional image having the most nearest value both to the mean value and the standard deviation of the predirected brightness to be selected. In addition to the above condition of the skewness, the background sectional image selection means 312 causes the sectional images in answer to the number specified in order of the nearer value to the mean value and the standard deviation of the brightness instructed beforehand to be selected. In addition to the above condition of the skewness, the background sectional image selection means 312 causes a single or a plurality of sectional images instructed beforehand to be selected. It is capable of constituting effective invention in accordance with the target in any above described cases.

Further, the sectional images which should become selection targets are selected from the sectional images included in the area instructed beforehand, or are selected from a plurality of the same areas as the area instructed beforehand respectively. It is also capable of constituting effective invention in accordance with the target in any above described selection.

The respective sectional images which are included in the area have the probability of including only the background, thus being selected the sectional image whose probability comes to be maximum value, while conforming to the conditions that the absolute value of the skewness is less than the threshold, or there are a plurality of the same areas, the invention is also capable of being constituted by selecting from respective the same areas. There will be described the ultimate example referring to FIG. 12 hereinafter.

Figure 12:
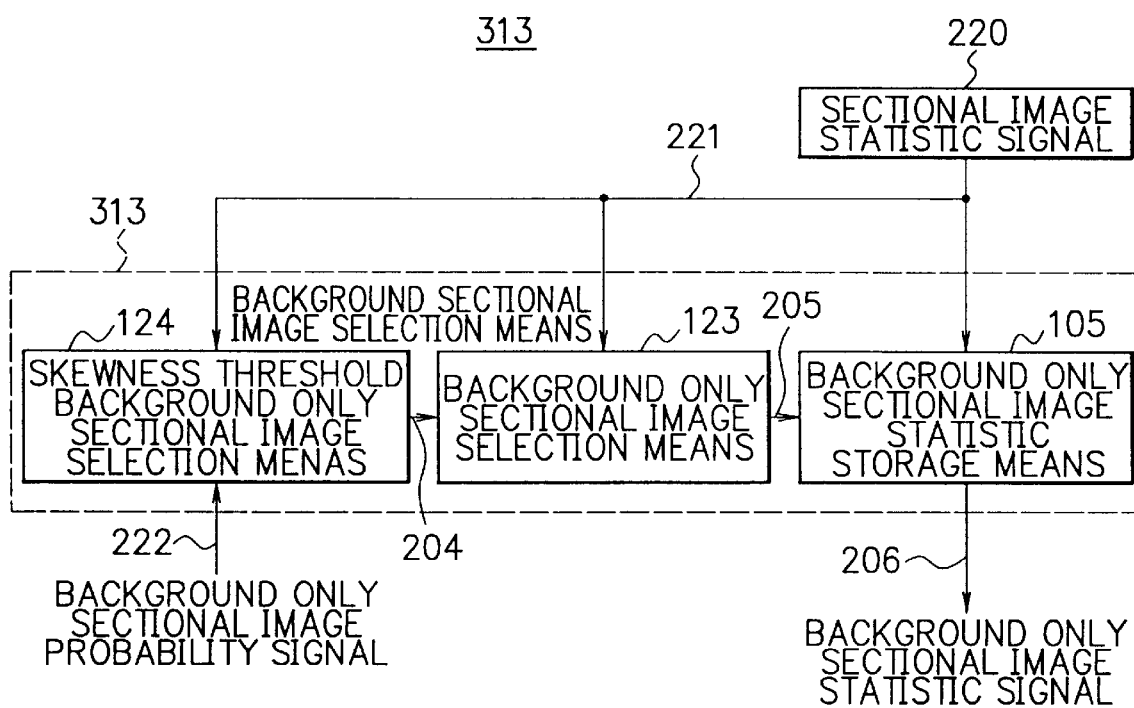
FIG. 12 is a block diagram showing a constitution example of background sectional image selection means.

FIG. 12 is a block diagram showing another configuration example of a background sectional image selection means 312. Another object detectable background removal device is constituted in such a way that the present background sectional image selection means 313 is substituted for the background sectional image selection means 312 shown in FIG. 11.

In FIG. 12, the skewness threshold background only sectional image selection means 124 inputs both of the sectional image static signal 221, and the background only sectional image probability signal 222, namely, the skewness threshold background only sectional image selection means 124 inputs the mean value, the standard deviation and skewness and the probability of including only background which is supplied in every respective sectional images within a plurality of areas instructed beforehand. Subsequently to these inputs, among the sectional images, the sectional image whose absolute value of the skewness is judged as less than the threshold given beforehand according to the equation (8), and whose probability of including only background is the highest is selected from respective areas, thus outputting signal by way of the sectional image whose probability of including only background is high.

Figure 13:
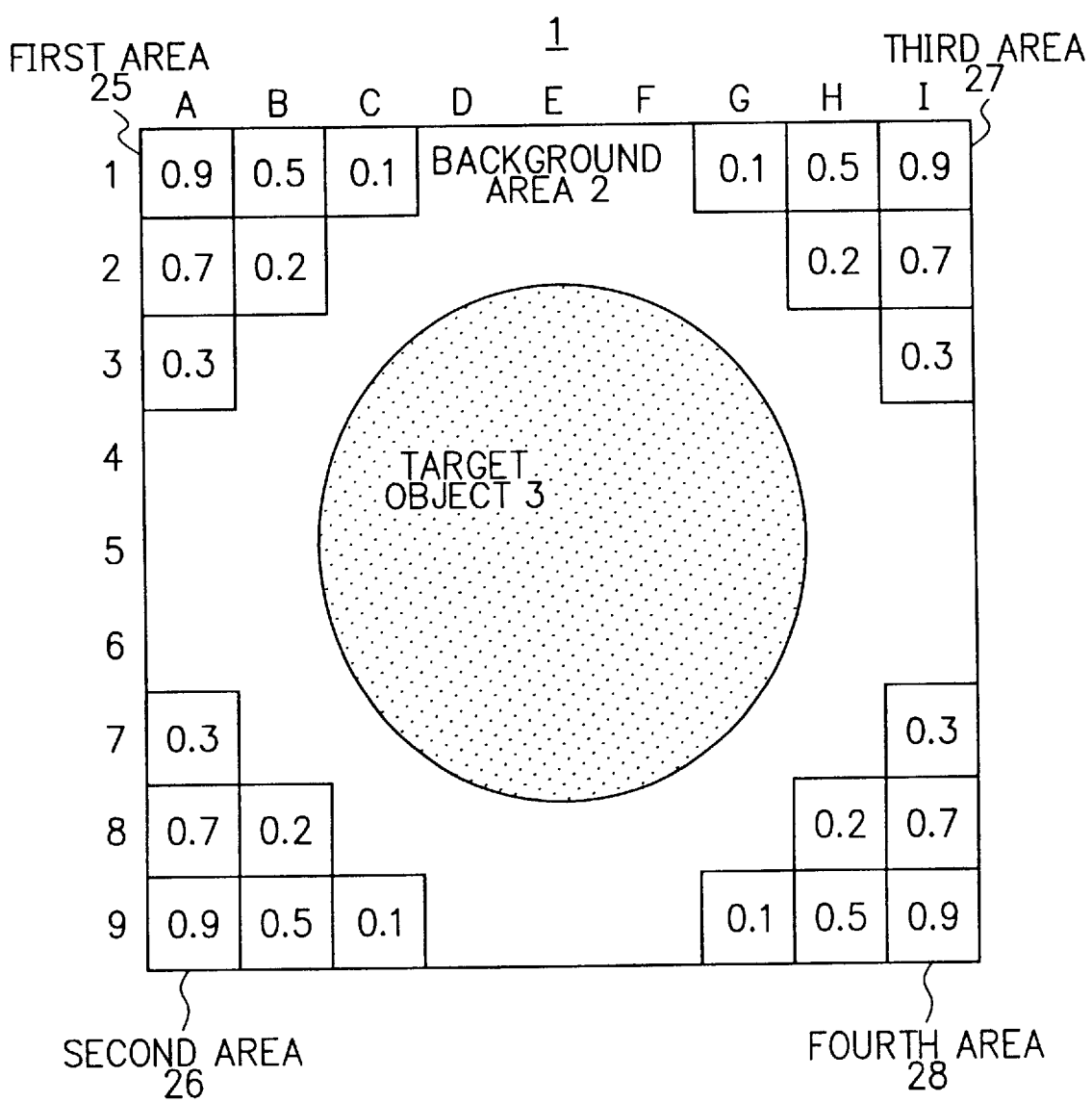
FIG. 13 is an explanation view showing one example of processing for selecting sectional image whose probability of including only the background is high.

FIG. 13 is an explanation view showing one example of processing for selecting sectional image which is of high probability of including only the background, which shows one example of the background only sectional image probability signal 222 in the shape of model. In the state of affairs where the detection object 3 is taken photograph at approximately center of the input image signal 1, the sectional image of the first area 25, the sectional image of the second area 26, the sectional image of the third area 27, and the sectional image of the fourth area which are corresponding to the four corners of the image, whose probability of including only each background is extremely high. There is given the probabilities of including only background beforehand in terms of the sectional image included in respective areas 25, 26, 27, or 28. In FIG. 13, the probability 0.9 is given to the sectional image 1-A involved in the first area 25, the probability 0.7 is given to the sectional image 2-A, the probability 0.5 is given to 1-B, the probability 0.3 is given to the sectional image 3-A, the probability 0.2 is given to the sectional image 2-B, and the probability 0.1 is given to the sectional image 1-C. Similarly, in terms of the second area 26, the respective probabilities 0.9, 0.7, 0.5, 0.3, 0.2, and 0.1 are given to the respective sectional images 9-A, 8-A, 9-B, 7-A, 8-B, and 9-C. In terms of the third area 27, the respective probabilities 0.9, 0.7, 0.5, 0.3, 0.2, and 0.1 are given to the respective sectional images 1-I, 2-I, 1-H, 3-I, 2-H, and 1-G. In terms of the fourth area 28, the respective probabilities 0.9, 0.7, 0.5, 0.3, 0.2, and 0.1 are given to the respective sectional images 9-I, 8-I, 9-H, 7-I, 8-H, and 9-G. The skewness threshold background only sectional image selection means 124 selects the sectional image whose probability of including only background is high among the sectional images which conforms to the equation (8) in every respective areas.

The background only sectional image selection means 123 inputs the high probability background only sectional image signal 204 and the sectional image statistic signal 221, subsequently, comparing the standard deviation of the brightness of the sectional image whose probability of including only background is high with the standard deviation of the brightness in another sectional images, based on the equation (5). The result of the comparison, the background only sectional image selection means 123 outputs the signal by way of the background only sectional image signal 205 which is the sectional image including only background while judging the sectional image whose standard deviation of the brightness is within the threshold, and whose skewness is less than the threshold according to the equation (8). The background only sectional image statistic storage means 105 inputs both of the background only sectional image signal 205 and the sectional image statistic signal 203, subsequently, storing the mean value and the standard deviation of the brightness of the sectional image judged that only background is involved, thus outputting signal by way of the background only sectional image statistic signal 206 whenever necessary.

In the above-described the object detectable and background removal device of the first and the second embodiments, the background statistic estimation means 303 has many kinds of variations. When it causes the statistic of the background in some sectional image to be estimated, the mean value and the standard deviation of the brightness of sectional image in the neighborhood thereof are referred to. In the first and the second embodiments, neighborhood relationship in the whole image is defined by one, however, it is capable of constituting effective invention corresponding to the target due to the fact that it causes the sectional image being in use for estimation to be further limited from the neighborhood sectional images based on the location of the center of gravity of the sectional image judged that image except the background is involved. Further, it is appropriate that the neighborhood relationship is defined in every sectional image. There will be described hereinafter in terms of the former embodiment referring to FIG. 14.

Embodiment of Background Statistic Estimation Means

Figure 14:
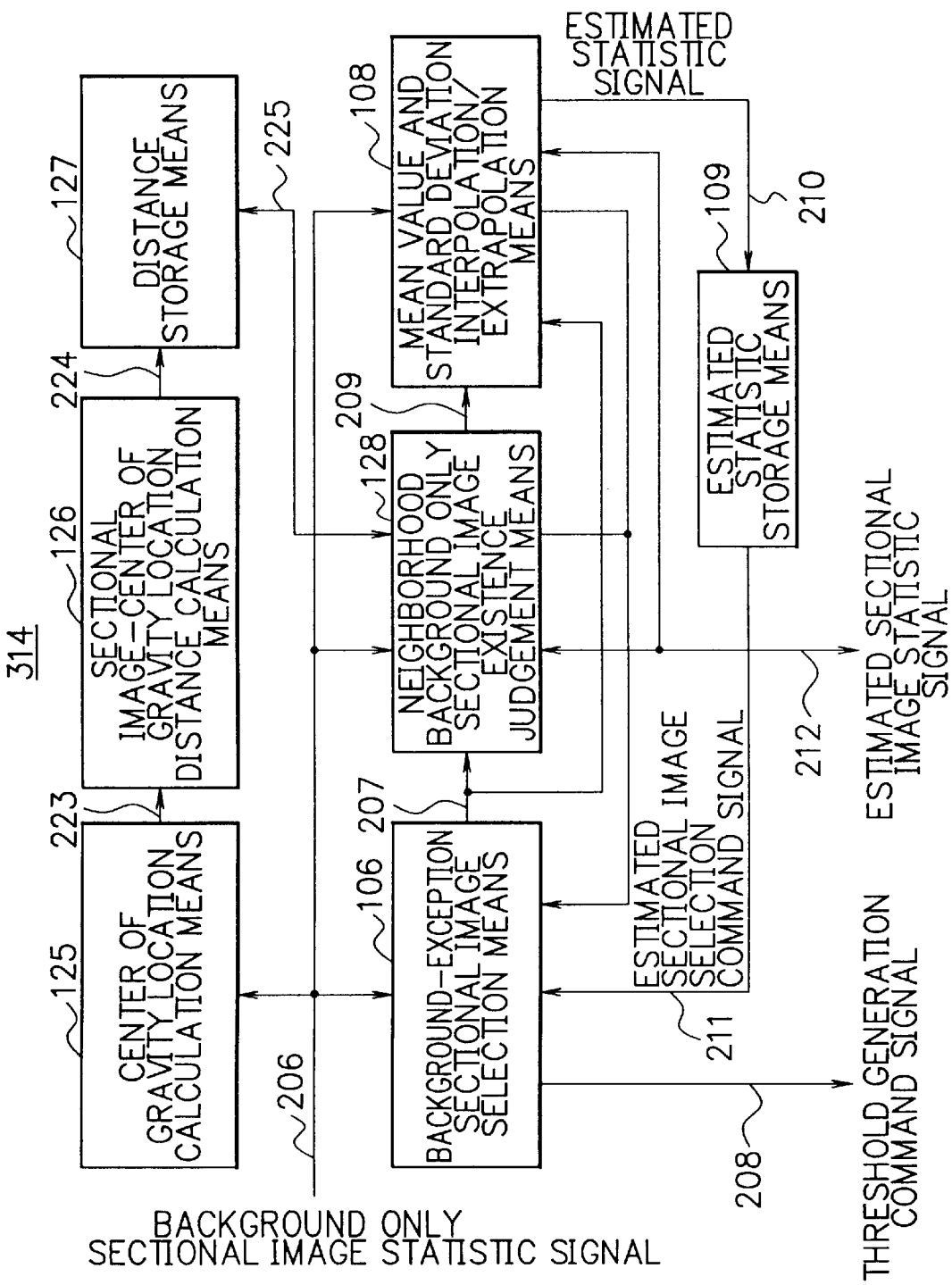
FIG. 14 is a block diagram showing a background statistic estimation means 314 of another configuration example of a background statistic estimation means 303.

FIG. 14 is a block diagram showing a background statistic estimation means 314 of another configuration example of the background statistic estimation means 303 in the present invention. Another object detectable and background removal device is constituted in such a way that the present background statistic estimation means 314 is substituted for the background statistic estimation means 303 shown in FIGS. 3 or 11.

In FIG. 14, a center of gravity location calculation means 125 inputs the background only sectional image statistic signal 206, firstly, investigating the mean value and the standard deviation of the brightness of the sectional image which includes only the background, secondly, investigating whole location of the sectional image whose mean value and the standard deviation of the brightness do not exist, thirdly, obtaining location of the center of gravity of the object which is to be the detection target while calculating the location of the center of gravity, thus outputting the signal by way of the center of gravity location signal 223. A sectional image-center of gravity distance calculation means 126 calculates distance between location of center pixel of whole sectional images and location of center of gravity of the object to be the detection target with the center of gravity location signal 223 as the input, thus outputting the signal by way of a sectional image-center of gravity location distance signal 224. A distance storage means 127 inputs the sectional image-center of gravity location distance signal 224, subsequently, storing distance between whole sectional images and the location of the center of gravity, thus outputting the signals by way of a sectional image-center of gravity location distance signal 225 whenever necessary.

The background-exception sectional image selection means 106 inputs the background only sectional image statistic signal 206, an estimated sectional image selection command signal 211, and an estimated sectional image statistic signal 212, thus investigating both of the background only sectional image statistic signal 206 and the estimated sectional image statistic signal 212 when command of the investigation of the sectional image which is judged that the sectional image except the background by the estimated sectional image selection command signal 211 enters the background exception sectional image selection means 106. When there exists the sectional image whose mean value and standard deviation of the brightness by way of the background are not estimated yet, outputting this sectional image by way of the background-exception sectional image signal 207, while when the estimation of the mean value and the standard deviation of the brightness by way of the background in terms of whole sectional images are completed, thus outputting a threshold generation command signal 208 so as to generate the threshold for the object detectable and background removal.

The neighborhood background only sectional image existence judgement means 107 inputs the background-exception sectional image signal 207, the background only sectional image statistic signal 206, the estimated sectional image statistic signal 212, and the sectional image-center of gravity location distance signal 225, in the sectional image which includes the image except the background specified by the background exception sectional image signal, thus investigating the mean value and the standard deviation of the brightness in the sectional image of the neighborhood whose distance from the center of gravity is farther than the sectional image. The watched sectional image is the sectional image 11 in FIG. 8. When even though there exists the sectional image whose mean value and standard deviation of the brightness estimated by one sectional image at the neighborhood, outputting a background statistic estimation command signal 209 so as to estimate the mean value and the standard deviation of the brightness of the sectional image specified by the background exception sectional image signal 207, in another cases, outputting the estimated sectional image selection command signal 211 so as to select next sectional image.

The mean value and standard deviation interpolation/extrapolation means 108 receives the command by the background statistic estimation command signal 209, the background-exception sectional image signal 207, and the estimated sectional image statistic signal 212, thus obtaining the mean value shown in the equations (10), (11), and (12), while referring the mean value and the standard deviation of the brightness of the sectional image except the background specified by the background-exception sectional image signal 207 to the background statistic estimation command signal 209, while referring the mean value and the standard deviation of the brightness of the sectional image including only the background of the neighborhood to the background only sectional image statistic signal 206, and while referring the mean value and the standard deviation of the brightness of the estimated sectional image of the neighborhood to the estimated sectional image statistic signal 212. On account of these matters, it causes the mean value and the standard deviation of the brightness to be estimated by way of the background of the estimated sectional images. The mean value and the standard deviation of the estimated brightness are outputted by way of the estimation statistic signal 210, simultaneously, it causes the estimated sectional image selection command signal 211 to be outputted so as to select next sectional image. The estimated statistic storage means 109 inputs the estimated statistic signal 210, subsequently, storing the mean value and the standard deviation of the brightness by way of the estimated background, thus outputting the signal by way of the estimated sectional image statistic signal 212 whenever necessary.

In the above-described matters, there is estimated the mean value and the standard deviation of the brightness in every sectional image by way of the background statistic estimation means, however, it is capable of estimating the mean value and the standard deviation in every pixel. Further, similar to the prior embodiment, it is capable of selecting information being in use for estimation based on the location of center of gravity. These two embodiments will described referring to FIGS. 15, and 16.

Figure 15:
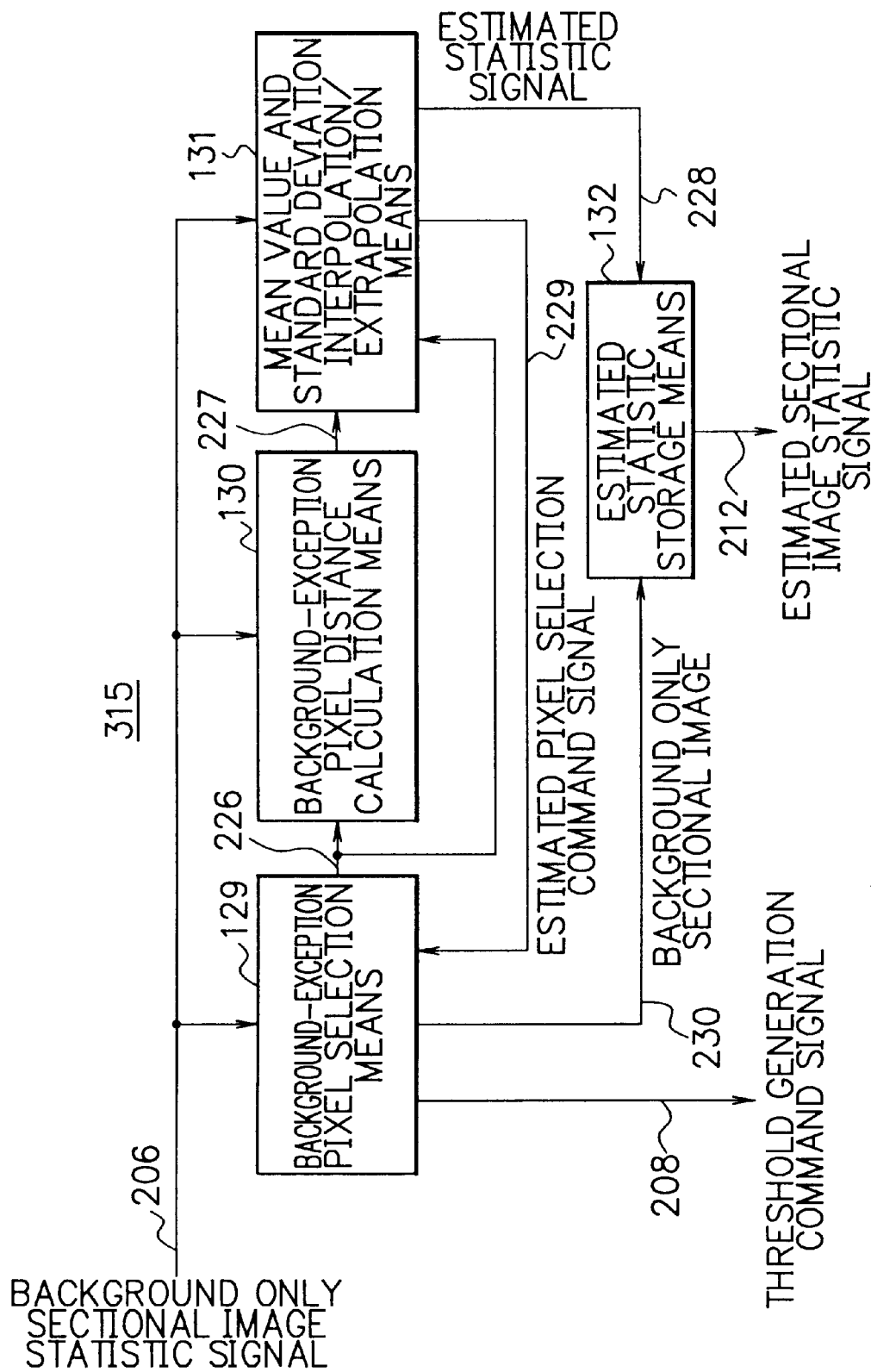
FIG. 15 is a block diagram showing a background statistic estimation means 315 of another configuration example of a background statistic estimation means 303.

FIG. 15 is a block diagram showing a background statistic estimation means 315 which is another configuration example of the background statistic estimation means 303 in the present invention. A different configuration of the object detectable and background removal device is constituted in such a way that the present background statistic estimation means 315 is substituted for the background statistic estimation means 303 shown in FIGS. 3 or 11.

In FIG. 15, the background exception pixel selection means 129 inputs the background only sectional image statistic signal 206 and the estimated pixel selection command signal 229. The background exception pixel selection means 129 causes the pixel to be scanned successively in order for every reception of command for investigating next pixel due to the estimated pixel selection command signal 229. The background-exception pixel selection means 129 investigates the background only sectional image statistic signal 206, when the pixel which is watched agrees with the center pixel of the sectional image including only the back ground, causing the mean value and the standard deviation of the brightness to be the statistic of the pixel in the sectional image including only the background, thus outputting the signal by way of a background only sectional image center pixel statistic signal 230. While when the pixel which is watched is different from the center pixel of the sectional image including only the back ground, outputting the location of the pixel by way of the background exception picture element signal 226. In cases where it causes the scanning to be completed in terms of the whole pixels, the background-exception pixel selection means 129 outputs a threshold generation command signal 208 so as to generate the threshold for object detectable and background removal.

A background-exception pixel distance calculation means 130 calculates distance between the location of the pixel which is watched and the location of center of pixel of the sectional image including only whole backgrounds based on the equation (13) with the background only sectional image statistic signal 206 and the background-exception pixel signal 226, thus outputting the signals by way of a pixel distance signal 227. The mean value and standard deviation interpolation/extrapolation means 131 inputs the background-exception pixel signal 226, the background only sectional image statistic signal 206, and the pixel distance signal 227, subsequently, estimating the mean value and the standard deviation of the brightness by way of the background in the watched location of the pixel based on the equation (14), thus outputting the signal by way of an estimated statistic signal 228. When the estimation is completed, the mean value and standard deviation interpolation/extrapolation means 131 outputs an estimated pixel selection command signal 229 which commands to select next pixel.

An estimated statistic storage means 132 inputs a background only sectional image center pixel statistic signal 230 and the estimated statistic signal 228, subsequently, storing the mean value and the standard deviation of the brightness over the whole images, thus outputting the signal by way of the estimated sectional image signal 212 whenever necessary.

Figure 16:
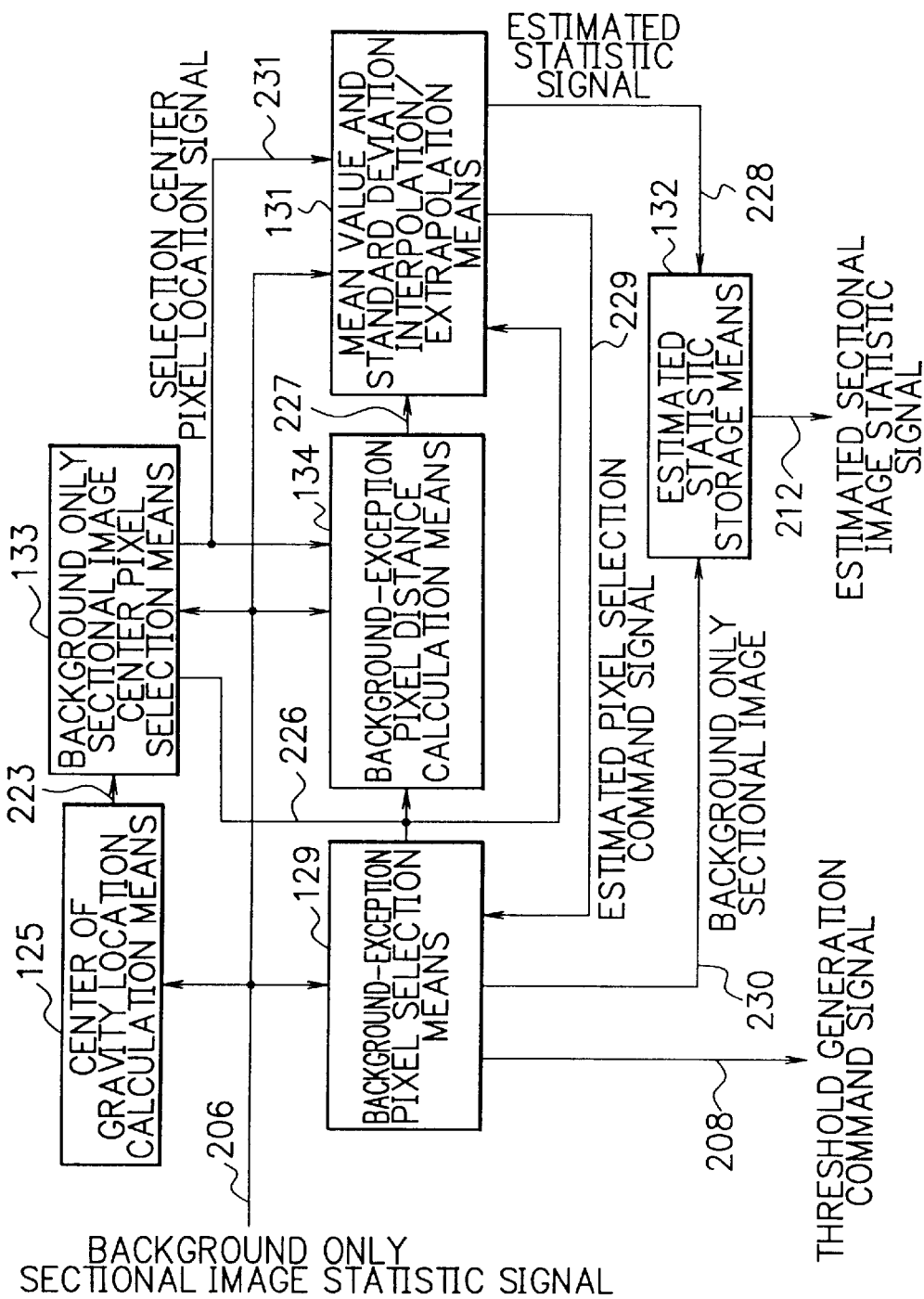
FIG. 16 is a block diagram showing a background statistic estimation means 316 of another configuration example of a background statistic estimation means 303.

FIG. 16 is a block diagram showing a background statistic estimation means 316 which is another configuration example of the background statistic estimation means 303 in the present invention. A different configuration of the object detectable background removal device is constituted in such a way that the present background statistic estimation means 316 is substituted for the background statistic estimation means 303 shown in FIG. 3 or 11.

A center of gravity location calculation means 125 inputs the background only sectional image statistic signal 206, firstly, investigating the mean value and the standard deviation of the brightness in the sectional image including only the background, secondly, investigating whole location of the sectional image where the mean value and the standard deviation of the brightness do not exist, thirdly, obtaining the location of center of gravity of the object to be detection target while calculating the location of center of gravity, thus outputting the signal by way of a center of gravity location signal 223.

A background-exception pixel selection means 129 inputs the background only sectional image statistic signal 206 and an estimated pixel selection command signal 229 thereto. The background exception pixel selection means 129 causes the pixel to be scanned successively in order for every reception of command for investigating next pixel due to the estimated pixel selection command signal 229. The background exception pixel selection means 129 investigates the background only sectional image statistic signal 206, when the pixel which is watched agrees with the center pixel of the sectional image including only the back ground, causing the mean value and the standard deviation of the brightness to be the statistic of the pixel in the sectional image including only the background, thus outputting the signal by way of a background only sectional image center pixel statistic signal 230. While when the pixel which is watched is different from the center pixel of the sectional image including only the back ground, outputting the location of the pixel by way of the background exception picture element signal 226. In cases where it causes the scanning to be completed in terms of the whole pixels, the background exception pixel selection means 129 outputs a threshold generation command signal 208 so as to generate the threshold for object detectable and background removal.

A background only sectional image center pixel selection means 133 inputs the background exception picture element signal 226, a center of gravity location signal 223, and the background only sectional image statistic signal 206, thus supposing a straight line connecting the pixel which is watched and the location of center of gravity of the object, and a half straight line located at opposite side of the location of center of gravity of the object from the pixel on the straight line. The background only sectional image center pixel selection means 133 outputs the signal by way of a selected center pixel location signal 231, while selecting whole center pixels of the sectional image including only the background, which sectional image intersected location is located on the half straight line while dropping a perpendicular to the straight line from the center pixel of the sectional image including only the background.

A background exception pixel distance calculation means 134 inputs the background only sectional image statistic signal 206, the background exception pixel signal 226, and a selected center pixel location signal 231, subsequently, calculating distance between the location of pixel which is watched and the location of center picture element of the sectional image including only the selected background based on the equation (13), thus outputting the signal by way of a pixel distance signal 227. A mean value and standard deviation interpolation/extrapolation means 135 inputs the background exception pixel signal 226, the background only sectional image statistic signal 206, the selected center pixel location signal 231, and the pixel distance signal 227, subsequently, estimating the mean value and the standard deviation of the brightness by way of the background in the watched location of the pixel from the statistic of the sectional image including only the selected background based on the equation (14), thus outputting the signal by way of an estimated statistic signal 229. When the estimation is completed, outputting an estimated pixel selection command signal 229.

An estimated statistic storage means 132 inputs the background only sectional image center pixel statistic signal 230, and the estimated statistic signal 228, subsequently, storing the mean value and the standard deviation of the brightness over the whole images, thus outputting the signal by way of the estimated sectional image statistic signal 212 whenever necessary.

Here, when it is known beforehand that the location of the center of gravity of the object of detection target, or the object of detection target is taken photograph at which location on the image, it is capable of being set the situation where the location is given beforehand while eliminating the center of gravity location calculation means.

The same as above, in the object detectable and background removal device of the above first and second embodiment, the threshold generation object detectable and background removal means 304 has various variations. A threshold generation object detectable and background removal means 317 which is another configuration example of the threshold generation object detectable and background removal means 304 will be described referring to FIG. 17.

Modified Example

Figure 17:
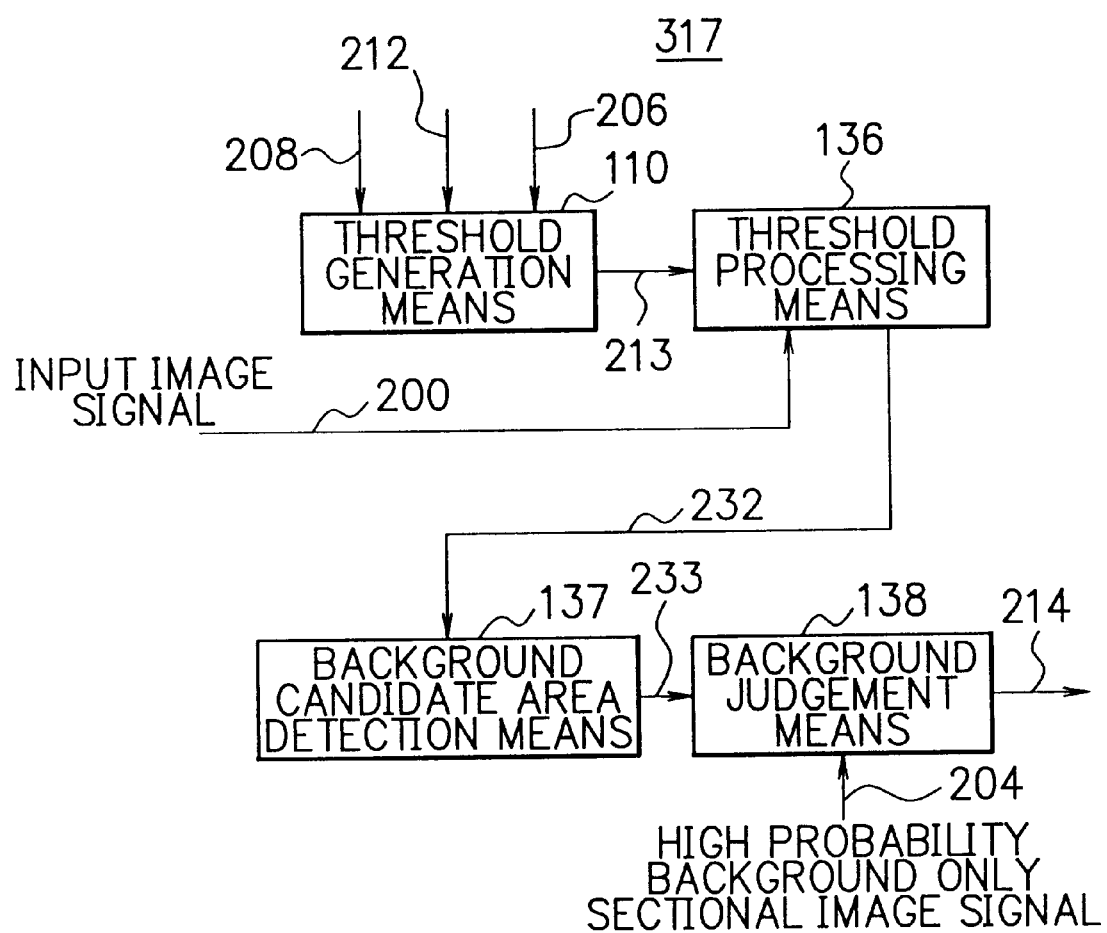
FIG. 17 is block diagram showing one embodiment of threshold generation object detectable and background removal means.

FIG. 17 is a block diagram showing one embodiment of a threshold generation object detectable and background removal means in the present invention. A different configuration of the object detectable and background removal device is constituted in such a way that the present background statistic estimation means 317 is substituted for the background statistic estimation means 303 shown in FIGS. 3 or 11.

The threshold generation means 110 inputs the threshold generation command signal 208, the estimated sectional image statistic signal 212, and the background only sectional image statistic signal 206. Since the estimation of the mean value and the standard deviation of the brightness are completed by way of the background in the whole sectional images according to the threshold generation command signal 208, when the command of calculating the threshold is entered, comparing two thresholds of the equations (15) and (16) based on the equation (17) using the mean value and the standard deviation of the brightness in the whole sectional images, thus outputting a background candidate pixel signal 232, while regarding the pixel which the equation (17) comes to be true as the background.

A background candidate area detection means 137 inputs the background pixel signal 232, subsequently, detecting a group of the pixels linked with one another, thus outputting the signal by way of a background candidate area signal 233. A background judgement means 138 inputs a high probability background only sectional image signal 204 and the background candidate area signal 233, thus outputting an object detectable and background removal signal 214 while regarding image including the largest number of sectional images whose probability of including only the background is high as a background area, and while regarding another images as a target object.

With respect to the above background judgement means 138, it regards image including the largest number of sectional images whose probability of including only the background is high as a background area, however, by way of another case, or it regards image including the largest number of sectional images includes only the background as a background area, it regards image including the smallest number of sectional images except the background as a background area, so that it is capable of obtaining the same effect.

In the embodiments described-above, only the brightness is in use by way of information of the image, as another case, color information or edge information instead of the brightness can be used or the color information and the edge information can be arranged.

In general, color image is constituted by three components of red•green•blue. In the above embodiments, only the brightness is in use, for instance, when large difference between the background and the target object is observed in terms of red component of the color image, it is capable of constituting the invention agreed with the target object due to using only red component instead of the brightness. Further, it is capable of treating the color image consisting of three components of cyanogen•magenta•yellow being in use for printing or consisting of four components of cyanogen•magenta•yellow•black similarly. Furthermore, it is capable of using them while combining respective components.

Third Embodiment

An embodiment of the invention in which color image consisting of three components of red•green•blue is inputted to be used together will be described referring to FIG. 18.

Figure 18:
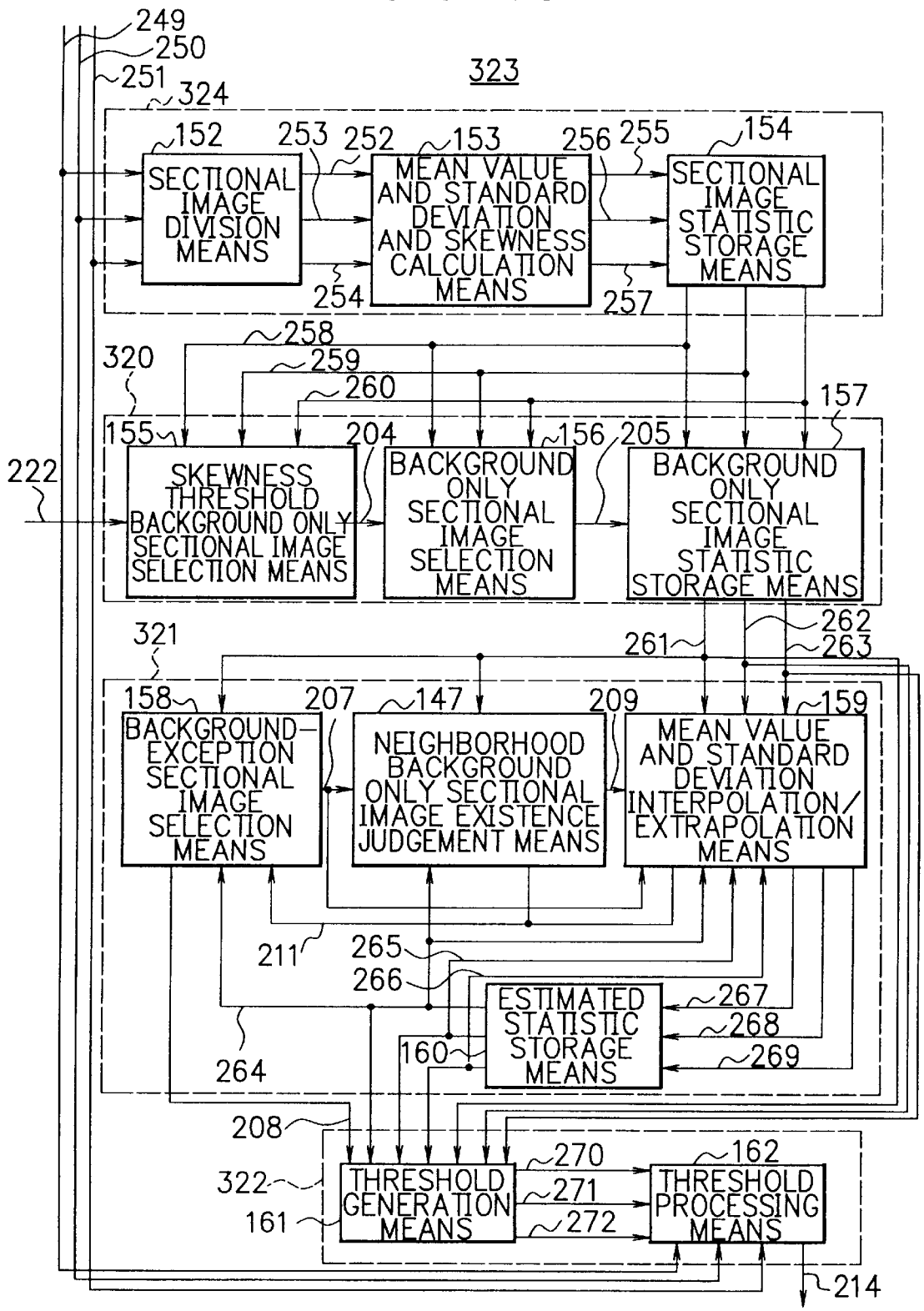
FIG. 18 is a block diagram showing a configuration of a third embodiment of the object detectable and background removal device.

FIG. 18 is a block diagram showing a configuration of a third embodiment of an object detectable and background removal of the present invention. The present object detectable and background removal device 323 roughly consists of four means of a sectional image statistic calculation means 324, a background sectional image selection means 325, a background statistic estimation means 326, and a threshold generation object detectable and background removal means 327.

The sectional image statistic calculation means 324 is constituted by following configuration elements. A sectional image division means 152 inputs an input image red signal 249, an input image green signal 250, and an input image blue signal 251, subsequently, dividing three images of red•green•blue into tile shaped configuration of sectional image as shown in FIG. 4 thus appending 1-A, 2-A, 3-A, . . . to the respective sectional images in order, so that red component of the image is outputted by way of the sectional image red signal 252, green component of the image is outputted by way of the sectional image green signal 253, and blue component of the image is outputted by way of the sectional image blue signal 254. The sectional image statistic storage means 154 inputs a sectional image red statistic signal 255, a sectional image green statistic signal 256, and a sectional image blue statistic signal 257, subsequently, storing the mean value, the standard deviation, and the skewness of each component of red•green•blue of respective sectional images, thus outputting a sectional image red statistic signal 258, a sectional image green statistic signal 259, and a sectional image blue statistic signal 260.

The background sectional image selection means 325 is constituted by following configuration elements. A skewness threshold background only sectional image selection means 155 inputs the sectional image red statistic signal 258, the sectional image green statistic signal 259, the sectional image blue statistic signal 260, and a background only sectional image probability signal 222, thus obtaining the sectional image judged that the skewness of each component of red•green•blue is lower than the threshold according to the equation (8). Further, referring to the background only sectional image probability signal 222 representing probability including only the background in every sectional image shown in FIG. 13, subsequently, selecting the sectional image whose probability is the most highest in the sectional images whose skewness is lower than the threshold from respective first area 25, second area 26, third area 27, and fourth area 28, thus regarding it as the sectional image with high probability of including only the background, so that the sectional image is outputted by way of the high probability background only sectional image signal 204.

A background only sectional image selection means 156 inputs the high probability background only sectional image signal 204, the sectional image red statistic signal 258, the sectional image green statistic signal 259, and the sectional image blue statistic signal 260, subsequently, comparing the skewness of each component of red•green•blue of the sectional image with high probability of including only the background with the threshold based on the equation (8), thus taking the sectional image whose respective standard deviation and skewness are within the threshold to be the sectional image including only the background, subsequently, outputting the signal by way of a background only sectional image signal 205. A background only sectional image statistic storage means 157 inputs the background only sectional image signal 205, the sectional image red statistic signal 258, the sectional image green statistic signal 259, and the sectional image blue statistic signal 260, subsequently, storing the mean value and the standard deviation of each component of red•green•blue in the sectional image judged as including only the background, thus outputting a background only sectional image red statistic signal 261, a background only sectional image green statistic signal 262, and a background only sectional image blue statistic signal 263 whenever necessary.

The background statistic estimation means 321 is constituted by following configuration elements. A background-exception sectional image selection means 158 investigates both of the background only sectional image red statistic signal 261 and the estimated sectional image statistic signal 264 when the command of investigation of the sectional image judged that image except the background is included by the estimated image selection command signal 211 with the background only sectional image red statistic signal 264 as the input. When there exists the sectional image whose mean value and standard deviation of red component by way of the background are not estimated yet, outputting the sectional image by way of the background exception sectional image signal 207. Further, when the mean value and the standard deviation of the red component by way of the background in terms of the whole sectional images are estimated, outputting the threshold generation command signal 208 so as to generate the threshold for the sake of the object detectable and background removal.

A neighborhood background only sectional image existence judgement means 147 inputs the backgroundexception sectional image signal 207, the background only sectional image red statistic signal 261, and the estimated sectional image red statistic signal 264, thus investigating a mean value and a standard deviation of the red component in the sectional image located at the neighborhood of the sectional image except the background specified by the background exception sectional image signal. There is assumed that a watched sectional image is the sectional image 11 in FIG. 7. Consequently, the neighborhoods are the sectional images located at the sectional images 12 to 19. When there exists any one of the sectional image whose mean value and standard deviation of the brightness are estimated in the neighborhood thereof, outputting the background statistic estimation command signal 209 so as to estimate a mean value and a standard deviation of each component of red•green•blue of the sectional image specified by the background exception sectional image signal 207. In the different case thereabove, the neighborhood background only sectional image existence judgement means 147 outputs an estimated sectional image selection command signal 211 so as to select next sectional image.

The mean value and standard deviation interpolation/extrapolation means 159 inputs the background statistic estimation command signal 209, the background exception sectional image signal 207, the estimated sectional image red statistic signal 264, the estimated sectional image green statistic signal 265, the estimated sectional image blue statistic signal 266, the background only sectional image red statistic signal 261, the background only sectional image green statistic signal 262, and the background only sectional image blue statistic signal 263. Subsequently, when the mean value and standard deviation interpolation/extrapolation means 159 receives the command by the background statistic estimation command signal 209, referring to the mean value and the standard deviation of each component of red•green•blue by way of the background in the sectional image including image with the exception of the background specified by the background-exception sectional image signal 207 from the background only sectional image red statistic signal 261, the background only sectional image green statistic signal 262, and the background only sectional image blue statistic signal 263, and also referring to the mean value and the standard deviation of each component of red•green•blue by way of the background in the sectional image including only the background of the neighborhood from the background only sectional image red statistic signal 261, the background only sectional image green statistic signal 262, and the background only sectional image blue statistic signal 263. The mean value and standard deviation interpolation/extrapolation means 159 refers to the mean value and the standard deviation of each component of red•green•blue by way of the background in the estimated sectional image in the neighborhood thereof from the estimated sectional image red statistic signal 264, the estimated sectional image green statistic signal 265, the estimated sectional image blue statistic signal 266, thus obtaining mean value as shown in the equations (10), (11), and (12).

Due to the above-described matter, the mean value and the standard deviation of each component of red•green•blue by way of the background in the specified sectional image are outputted by way of the estimated sectional image red statistic signal 267, the estimated partial image green statistic signal 268, and the estimated sectional image blue statistic signal 269, simultaneously, outputting the estimated sectional image selection command signal 211 so as to select next sectional image. The estimated statistic storage means 149 takes an estimated sectional image red statistic signal 267, an estimated sectional image green statistic signal 268, and an estimated sectional image blue statistic signal 269 to be inputs, subsequently, storing a mean value and a standard deviation of both of the brightness and the edge which are estimated, thus outputting the signals by way of an estimated partial brightness image statistic signal 243 and an estimated partial edge image statistic signal 244 whenever necessary.

The threshold generation object detectable and background removal means 322 is constituted by following configuration elements. A threshold generation means 161 inputs the threshold generation command signal 208, the estimated sectional image red statistic signal 264, the estimated sectional image green statistic signal 265, the estimated sectional image blue statistic signal 266, the background only sectional image red statistic signal 261, the background only sectional image green statistic signal 262, and the background only sectional image blue statistic signal 263. By virtue of these inputs, the mean value and the standard deviation of each component of red•green•blue by way of the background in the whole sectional images become complete due to the threshold generation command signal 208. Consequently, when the command for calculating the threshold is received, calculating two thresholds in every component covering all over the sectional images by using the mean value and the standard deviation of each component of red•green•blue in the whole sectional images according to the equations (15), and (16), thus outputting signals by way of a red threshold signal 270, a green threshold signal 271, and a blue threshold signal 272. A threshold processing means 162 inputs the red threshold signal 270, the green threshold signal 271, the blue threshold signal 272, the input image red signal 249, the input image green signal 250, and the input image blue signal 251. The threshold processing means 162 compares the red component of the inputted image with the two thresholds in terms of the red component according to the equation (17), similarly, in terms of the green component and the blue component, also comparing with the threshold, thus regarding the image which the equation (17) comes to be true in relation to each component of red•green•blue as the background, and regarding another image as the object to be the detection target, to output an object detections•background rejection signal 214.

In the embodiment described above, red•green•blue which is color equation of the input image is utilized as it is, however it is appropriate to convert to another color equation. The examples of the color equation are shown in the literatures: "Image Analysis Handbook" (Supervision of Mikio Takagi, Y.Shimoda, Tokyo University Publication Meeting, pp 485–491, 1991) in which HSI (H: hue, S: saturation, I: intensity) hexagonal pyramid color model, or HSI bi-hexagonal pyramid color model or the like is shown, and "New Edited Color Science Hand Book" (Edited by Japan Color Congress, Tokyo University Publication Meeting, pp 83–5146, 1980) in which XYZ color equation, Lab, luv, or the like is shown. It is capable of constituting effective invention in compliance with the target object by the same configuration as the above-described embodiment in relation to any color equation.

Fourth Embodiment

There will be described an embodiment of the invention which uses the brightness with the edge information referring to FIG. 19.

Figure 19:
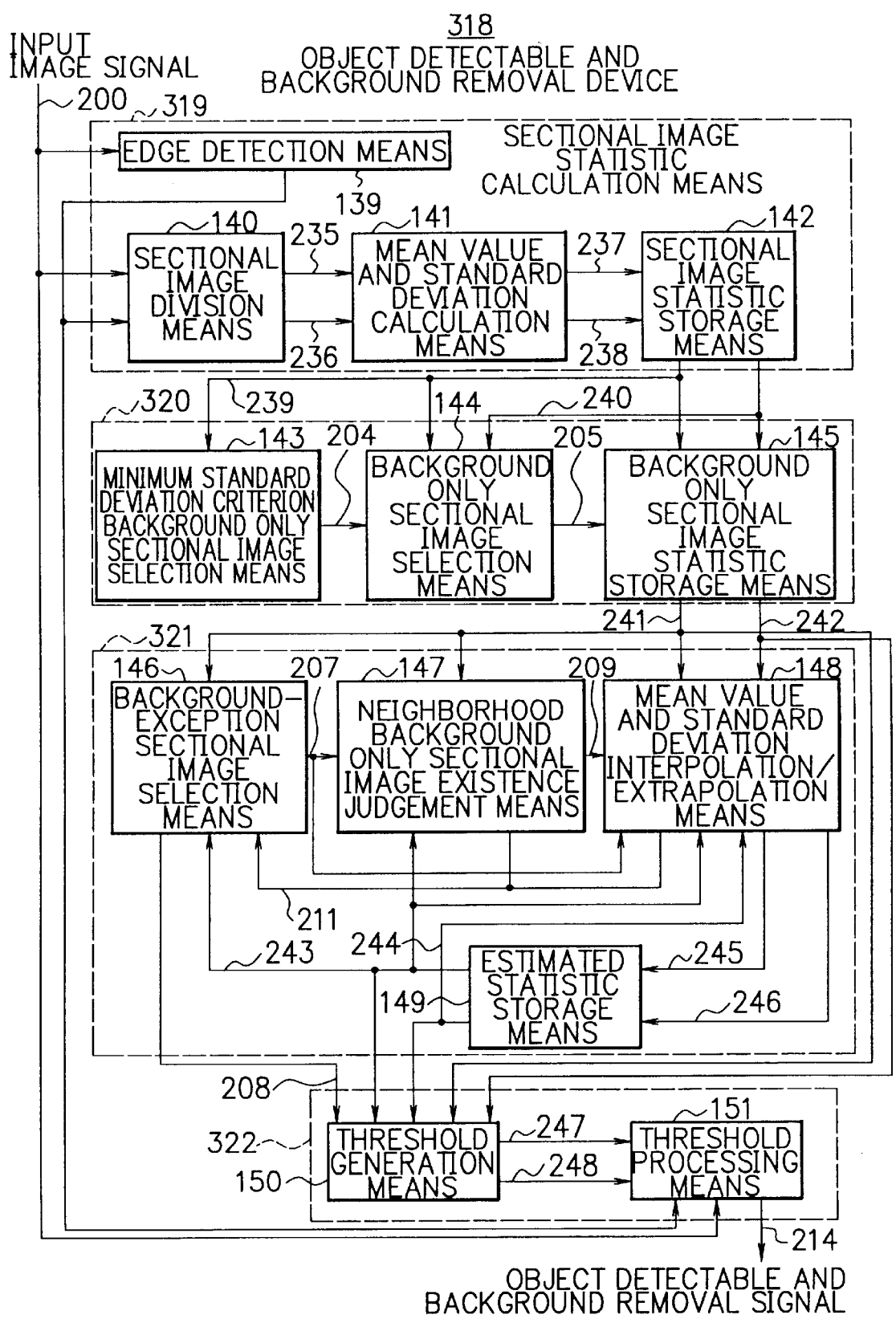
FIG. 19 is a block diagram showing a configuration of a fourth embodiment of the object detectable background removal device.

FIG. 19 is a block diagram showing a configuration of a fourth embodiment of an object detectable and background removal device in the present invention. The present object detectable and background removal device 318 roughly consists of four means of a sectional image statistic calculation means 319, a background sectional image selection means 320, a background statistic estimation means 321, and a threshold generation object detectable and background removal means 322.

The sectional image statistic calculation means 319 is constituted by following configuration elements. An edge detection means 139 takes an input image signal 200 to be an input, thus calculating edge components in respective pixels to output signal by way of an edge image signal 234. Calculation of the edge component is described in the literature: "Image Analysis Hand Book" (Supervision of Mikio Takagi, Y. Shimoda, Tokyo University Publication Meeting, pp 550–564, 1991). The present calculation of the edge component is based on one of Laplacian operator which is in use frequently.

In FIG. 20, the edge component is defined in such a way that it causes the pixel 29 to be watched, subsequently obtaining the value added the brightness values of peripheral pixels 30, 31, 32, 33, 34, 35, 36, and 37, and then subtracting a value increased by eight times as many as brightness value of the watched pixel 29 therefrom. The edge image is capable of being obtained by implementing the edge component calculation covering all over the pixels. A sectional image division means 140 inputs an input image signal 200, and an edge image signal 234, subsequently, dividing both images into tile shape of sectional image as shown in FIG. 4 thus appending 1-A, 2-A, 3-A, . . . to the respective sectional images in order, so that brightness component of the image is outputted by way of the partial brightness image signal 235 and edge component of the image is outputted by way of the partial edge image signal 236. A mean value and standard deviation calculation means 141 inputs the partial brightness image signal 235 and the partial edge image signal 236, subsequently calculating the mean value and the standard deviation of the brightness and the edge in every sectional image based on the respective equations (3), and (4), thus outputting the signals by way of a partial brightness image statistic signal 237, and a partial edge image statistic signal 238. A sectional image statistic storage means 142 takes the partial brightness image statistic signal 237 and the partial edge image statistic signal 238 to be the input, subsequently, storing the mean value and the standard deviation of brightness and edge of respective sectional images, thus outputting the signals by way of a partial brightness image statistic signal 239 and a partial edge image statistic signal 240 whenever necessary.

A background sectional image selection means 320 is constituted by following configuration elements. A minimum standard deviation reference background only sectional image selection means 143 takes the partial brightness image statistic signal 239 to be the input, subsequently taking the sectional image whose standard deviation of the brightness is of the smallest value in the sectional images to be the sectional image whose probability of including only the background is high, thus outputting the sectional image by way of a high probability background only sectional image signal 204. A background only sectional image selection means 144 inputs the high probability background only sectional image signal 204, subsequently, comparing the standard deviation of the brightness of the sectional image whose probability of including only the background is high with the standard deviation of the brightness in the other sectional images based on the equation (5), as well as comparing the standard deviation of the edge based on the equation (5), thus taking the sectional image whose standard deviation of the brightness and the edge are within the threshold respectively to be the sectional image including only the background, to input by way of a background only sectional image signal 205. A background only sectional image statistic storage means 145 inputs the background only sectional image signal 205, the partial brightness image statistic signal 239, and the partial edge image statistic signal 240, subsequently, storing the mean value and the standard deviation of the brightness and the edge in the sectional image judged as including only the background, thus outputting signals by way of a background only partial brightness image statistic signal 241 and a background only partial edge image statistic signal 242 whenever necessary.

A background statistic estimation means 321 is constituted by following configuration elements. A background-exception sectional image selection means 146 inputs a background only partial brightness image statistic signal 241, the estimated sectional image selection command signal 211, and an estimated partial brightness image statistic signal 243, thus investigating both of the background only partial brightness image statistic signal 241 and the estimated partial brightness image statistic signal 243, when command of investigation of the sectional image judged as an image except the background by virtue of the estimate sectional image selection command signal 211 is entered. When there exists sectional image whose mean value and standard deviation of the brightness by way of the background are not estimated yet, outputting the sectional image by way of the background-exception sectional image signal 207, while when the mean value and the standard deviation of the brightness in terms of whole sectional images are estimated, outputting the threshold generation command signal 208 so as to generate a threshold for object detectable and background removal.

A neighborhood background only sectional image existence judgement means 147 inputs the backgroundexception sectional image signal 207, the background only partial brightness image statistic signal 241, and the estimated partial brightness image statistic signal 243, thus investigating the mean value and the standard deviation of the brightness of the sectional image located in the neighborhood of the sectional image except the background specified by the background-exception sectional image signal 207. There is assumed that the watched sectional image is the sectional image 11 in FIG. 7, the neighborhood is the sectional image located at the sectional images 12 to 19. When even though there exists one of the sectional images whose mean value and standard deviation of the brightness are estimated, outputting a background statistic estimation command signal 209 so as to estimate a mean value and a standard deviation of the brightness of the sectional image specified by the background exception sectional image signal 207, while when there exists another image thereof, outputting the estimated sectional image selection command signal 211 so as to select next sectional image.

A mean value and standard deviation interpolation/extrapolation means 148 inputs the background statistic estimation command signal 209, the background exception sectional image signal 207, the estimated partial brightness image statistic signal 243, the estimated partial edge image statistic signal 244, the background only partial brightness image statistic signal 241, and the background only partial edge image statistic signal 242. In virtue of these inputs, when there is received the command by virtue of the background statistic estimation command signal 209, causing the mean value to be obtained as shown in the equations (10), (11), and (12), while referring to the mean value and the standard deviation of the brightness by way of the background in the sectional image except the background specified by the background-exception sectional image signal 207 from the background only partial brightness image statistic signal 241 and the background only partial edge image statistic signal 242, while referring to the mean value and the standard deviation of the brightness and the edge in the sectional image including only the background of the neighborhood from the background only partial brightness image statistic signal 241 and the background only partial edge image statistic signal 242, while referring to the mean value and the standard deviation of the brightness and the edge in the estimated sectional image of the neighborhood from the estimated partial brightness image statistic signal 243 and the estimated partial edge image statistic signal 244, and while referring to the mean value and the standard deviation of the brightness and the edge in the estimated partial brightness image statistic signal 243 from the estimated partial brightness image statistic signal 243 and the estimated partial edge image statistic signal 244. By virtue of these matters, it causes the mean value and the standard deviation of the brightness and the edge by way of the background in the sectional image being specified to be estimated. The estimated mean value and standard deviation of the brightness are outputted by way of an estimated brightness statistic signal 245 and an estimated edge statistic signal 246, simultaneously, outputting the estimated sectional image selection command signal 211 so as to select next sectional image.

An estimated statistic storage means 149 takes the estimated brightness statistic signal 245 and the estimated edge statistic signal 246 to be inputs, subsequently, storing the mean value and the standard deviation of the estimated brightness and edge, thus outputting signals by way of an estimated partial brightness image statistic signal 243 and an estimated partial edge image statistic signal 244.

A threshold generation object detectable and background removal means 322 is constituted by following configuration elements. A threshold generation means 150 takes the threshold generation command signal 208, the estimated partial brightness image statistic signal 243, the estimated partial edge image statistic signal 244, the background only partial brightness image statistic signal 241, and the background only partial edge image statistic signal 242 to be inputs, since the mean value and the standard deviation of the brightness and the edge are complete by way of the background of the whole sectional images in virtue of the threshold generation command signal 208, when the command for calculating the threshold is entered, calculating two thresholds covering over the whole picture using the mean value and the standard deviation of the brightness and the edge in the whole sectional images in virtue of the equations (15) and (16), to output signals by way of a brightness threshold signal 247 and an edge threshold signal 248. A threshold processing means 151 takes the brightness threshold signal 247, the edge threshold signal 248, the input image signal 200, and the edge image signal 234 to be the inputs, subsequently, outputting an object detectable and background removal signal 214 by way of the fact that the image which the equation (17) comes to be true in terms both of the brightness and the edge is the background, and another image thereof is the object to be detection target, while comparing the threshold in terms of the brightness with the brightness of the inputted image in virtue of the equation (17), similarly comparing the edge image with the threshold in terms of two edges.

Here, by way of the edge detection processing, there is described that one of the Laplasian Operator described in the literature: "Image Analysis Hand Book" (Supervision of Mikio Takagi, Y. Shimoda, Tokyo University Publication Meeting, pp 502–505, 1991) is in use. In another cases, a different Laplasian Operator described in the same literature as above or Roberts•Robinson•Prewitt•Kirsch or the like is in use, thereby it is capable of constituting the invention in accordance with the target. Further, in the minimum standard reference background only sectional image selection means 143, which selects the sectional image whose probability of including only the background is high because the standard deviation of the brightness is minimum, however, it is capable of constituting the invention in accordance with the target, by virtue of the fact that the standard deviation of the edge is in use and so forth.

As described above, according to the present invention, the method and device of the object detectable and background removal and the storage media storing program thereof divides the location of the pixels of the input image constituted by the background and the object of the detection target into the sectional images to select the sectional images of including only the background, thus estimating the background on the input image based on the sectional image including the background. Subsequently, there is compared the estimated background with the input image, thus the object of detection target is isolated. Namely, in the first place, the sectional image including only the background is selected while dividing the image into the sectional images, before estimating the background in the whole images based on the sectional image. On account of the procedure, it enables the background and the unknown object for instance, an object with brightness color distribution to be separated to detect accurately. In general, in order to separate accurately two things of the background and the object to be the detection target, it is necessary to know background or distribution of characteristic value such as brightness, color, edge and so forth which the object to be detection target is expressed on the image. Consequently, according to the present invention, it enables the object with unknown brightness and color distribution to be obtained accurately from the image having virtually even background as far as the boundary between the background and the object.

While preferred embodiments of the invention have been described using specific terms, such description is for illustrative purpose only, and it is to be understood that changes and variations may be made without departing from the spirit or scope of the following claims.

What is claimed is:

1. A method of object detectable and background removal for enabling an object to be automatically detected minutely and accurately as far as contours comprising the steps of:

using an image consisting of a virtually even background and an object of detection target as an input image, by way of an input process of said image;

calculating a statistic in every respective sectional images, while dividing said input image into sectional images, by way of a statistic calculation process;

selecting a sectional image including only said background based on said statistic calculated previously in said statistic calculation process, by way of a background only sectional image selection process;

estimating a statistic of a whole picture from said statistic of said sectional image including only said background, by way of a statistic estimation process;

determining a threshold in the whole picture from said estimated statistic, by way of a threshold determination process; and comparing said threshold determined in the whole picture with said input image, by way of a comparison process, wherein said method causes said object of detection target to be isolated from said input image, wherein when said statistic estimation process estimates a mean value and a standard deviation of the prescribed characteristic value by way of the background in the sectional image except the background, if there exists the mean value and the standard deviation of the prescribed characteristic value of the sectional image including only the background located in the neighborhood and the mean value and the standard deviation of the prescribed characteristic value of the sectional image except the background estimated previously in said same neighborhood, thus estimating the mean value and the standard deviation by averaging above respective average values and the standard deviations, while if there does not exist them, estimating the mean value and the standard deviation of the prescribed characteristic value in another sectional images except the background, thus repeating estimation processing both of a mean value and a standard deviation of the prescribed characteristic value of said background until when it is capable of estimating a mean value and a standard deviation of the prescribed characteristic value of the background in the whole sectional images except the background.

2. A method of object detectable and background removal for enabling an object to be automatically detected minutely and accurately as far as contours comprising the steps of:
using an image consisting of a virtually even background and an object of detection target as an input image, by way of an input process of said image;
calculating a statistic in every respective sectional images, while dividing said input image into sectional images, by way of a statistic calculation process;
selecting a sectional image including only said background based on said statistic calculated previously in said statistic calculation process, by way of a background only sectional image selection process;
estimating a statistic of a whole picture from said statistic of said sectional image including only said background, by way of a statistic estimation process;
determining a threshold in the whole picture from said estimated statistic, by way of a threshold determination process; and
comparing said threshold determined in the whole picture with said input image, by way of a comparison process, wherein said method causes said object of detection target to be isolated from said input image,
wherein in regard to isolation of only said object of detection target at said comparison process, when said comparison process implements threshold processing in the respective location of the pixels, firstly a first threshold is calculated to be defined in such a way that a constant set beforehand is multiplied by the standard deviation of the prescribed characteristic value of the background estimated previously, then the above multiplied value is subtracted from a mean value of the prescribed characteristic value of the background estimated previously, secondly a second threshold is calculated to be defined in such a way that also a constant set beforehand is multiplied by the standard deviation of the prescribed characteristic value of the background estimated previously, then the above multiplied value is added to a mean value of the prescribed characteristic value of the background estimated previously, thus in case where the prescribed characteristic value of said location of the pixel is larger than the first threshold and is smaller than the second threshold, judging said pixel as the background, so that said comparison process removes the background to isolate the object due to the fact that said comparison process causes the same processing to be executed over the whole pixels.

3. A method of object detectable and background removal for enabling an object to be automatically detected minutely and accurately as far as contours as claimed in claim 2, wherein in regard to isolation of only said object of detection target at said comparison process, said comparison process implements a threshold processing over the whole pixels, to detect areas linked one another by way of areas to be a candidate of a background, thus judging the areas concerned as areas including the most large number of sectional images whose probability of including only the background among candidate areas of said background.

4. A method of object detectable and background removal for enabling an object to be automatically detected minutely and accurately as far as contours as claimed in claim 2, wherein in regard to isolation of only said object of detection target at said comparison process, said comparison process implements a threshold processing over the whole pixels, to detect areas linked one another by way of areas to be a candidate of a background, thus judging the areas including the most largest number of the sectional images including only the background among candidate areas of said background as a background area, so that said comparison process removes the background to isolate the object.

5. A method of object detectable and background removal for enabling an object to be automatically detected minutely and accurately as far as contours as claimed in claim 2, wherein in regard to isolation of only said object of detection target at said comparison process, said comparison process implements a threshold processing over the whole pixels, to detect areas linked one another by way of areas to be a candidate of a background, thus judging the area concerned including the most smallest number of sectional images which include image with the exception of the background among the candidate areas of said background as a background area, so that said comparison process removes the background to isolate the object.

6. A device of object detectable and background removal for enabling an object to be automatically detected minutely and accurately as far as contours, with an image constituted by virtually even background and an object of detection target, said device roughly consisting of a sectional image statistic calculation means, a background sectional image selection means, a background statistic estimation means, and a threshold generation object detectable and background removal means, said sectional image statistic calculation means comprising:
a sectional image division means for dividing input images into sectional images;
a mean value and a standard deviation calculation means which calculates to be outputted a mean value and a standard deviation of the prescribed characteristic value in every respective sectional images with said sectional image signals as inputs; and
a sectional image statistic storage means storing to be outputted the mean value and the standard deviation of the prescribed characteristic value of respective sectional images with the mean value and the standard deviation of the prescribed characteristic value of said sectional images as inputs, said background sectional image selection means comprising:
  a minimum standard deviation reference background only sectional image selection means for outputting a sectional image whose standard deviation of the prescribed characteristic value is of the most smallest value among sectional images as a sectional image whose probability of including only a background is high with the mean value and the standard deviation of the prescribed characteristic value of the sectional image;
  a background only sectional image selection means comparing a standard deviation of the prescribed characteristic value of a sectional image whose probability of including only the background is high with a standard deviation of the prescribed characteristic value in another sectional images, thus judging to be outputted a partial image having standard deviation whose difference between the standard deviation concerned and a standard deviation of the prescribed characteristic value of a sectional image whose probability of including only said background is less than a threshold as a sectional image including only a background; and
  a background only sectional image statistic storage means storing a location of the sectional image including only said background and the mean value and the standard deviation of the prescribed characteristic value of the sectional image concerned to output them whenever necessary,
said background statistic estimation means comprising:
  a background-exception sectional image selection means, when a command for investigating a sectional image except a background enters thereto, investigating both of a mean value and a standard deviation of the prescribed characteristic value in a sectional image including only a background and a mean value and a standard deviation of the prescribed characteristic value by way of an estimated background in another sectional images, if there exists a sectional image whose no estimated value of a mean value and a standard deviation of the prescribed characteristic value by way of a background exists, outputting the partial image concerned, in case where a mean value and a standard deviation of the prescribed characteristic value are estimated with regard to whole sectional images, so that said background statistic estimation means issues a command of generating a threshold for the sake of object detectable and background removal;
  a neighborhood background only sectional image existence judgement means investigating mean values and standard deviations both of sectional images including images with the exception of a background and sectional images including only a background located in the neighborhood of said sectional images, and investigating mean values and standard deviations of the prescribed characteristic value by way of a background estimated previously in another sectional images, when there exists a sectional image whose only one set of a mean value and a standard deviation of the prescribed characteristic value are estimated in the neighborhood thereof, thus issuing a command so as to estimate a mean value and a standard deviation of the prescribed characteristic value of a sectional image except said background;
  a mean value and standard deviation interpolation/extrapolation means, when receiving a command to estimate a mean value and a standard deviation of the prescribed characteristic value in the sectional image except said background, estimating to be outputted by averaging both of mean values and standard deviations of the prescribed characteristic value of a sectional image including only the background in the neighborhood thereof, simultaneously, outputting an estimated sectional image selection command signal so as to select next sectional image; and
  an estimated statistic storage means storing the mean value and the standard deviation of the prescribed characteristic value estimated previously to be outputted whenever necessary, and
said threshold generation object detectable and background removal means comprising:
  a threshold generation means, when a command for calculating a threshold is entered therein after completing whole mean values and standard deviations of the prescribed characteristic value in the whole sectional images, by using the mean value and the standard deviation in the whole sectional images, a second threshold is calculated to be defined in such a way that also a constant set beforehand is multiplied by the standard deviation of the prescribed characteristic value of the background estimated previously, then the above multiplied number is added to a mean value of the prescribed characteristic value of the background estimated previously, subsequently, calculating it all over the pictures to be outputted; and
  a threshold processing means judging pixels within the threshold as a background while using said two kinds of thresholds and judging pixels without the threshold as an object of detection target.

7. A device of object detectable and background removal for enabling an object to be automatically detected minutely and accurately as far as contours, as claimed in claim 6, wherein said background sectional image selection means comprises a minimum standard deviation criterion background only sectional image selection means outputting sectional images selects the sectional images in answer to specified number in order of the smaller value of a standard deviation of the prescribed characteristic value while taking such sectional images to be the sectional image whose probability of including only the background is high with the mean value and the standard deviation of the prescribed characteristic value of the sectional image as inputs, a background only sectional image selection means compares a standard deviation of the prescribed characteristic value of the sectional image whose probability of including only the background is high with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

8. A device of object detectable and background removal for enabling an object to be automatically detected minutely and accurately as far as contours, as claimed in claim 6, wherein said background sectional image selection means further comprises a standard deviation difference background only sectional image selection means selecting to be outputted a sectional image whose standard deviation is of the most nearest value of the standard deviation of the prescribed characteristic value instructed beforehand, a background only sectional image selection means comparing a standard deviation of the prescribed characteristic value of the sectional image whose probability of including only the background with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

9. A device of object detectable and background removal for enabling an object to be automatically detected minutely and accurately as far as contours, as claimed in claim 6, wherein said background sectional image selection means comprises a standard deviation reference background only sectional image selection means which judges to be outputted sectional images in answer to specified number in order of the most nearest value to the standard deviation of the prescribed characteristic value instructed beforehand, while regarding as the sectional image whose probability of including only the background is high, a background only sectional image selection means comparing a standard deviation of the prescribed characteristic value of the sectional image whose probability of including only the background is high with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

10. A device of object detectable and background removal for enabling an object to be automatically detected minutely and accurately as far as contours, as claimed in claim 6, wherein said background sectional image selection means comprises a mean value and standard deviation criterion background only sectional image selection means for outputting a sectional image whose values are of the most nearest values to the mean value and the standard deviation of the prescribed characteristic value instructed beforehand as a sectional image whose probability of including only a background is high, a background only sectional image selection means for comparing a standard deviation of the prescribed characteristic value of the sectional image whose probability of including only the background is high with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

11. A device of object detectable and background removal for enabling an object to be automatically detected minutely and accurately as far as contours, as claimed in claim 6, wherein said background sectional image selection means comprises a mean value and standard deviation criterion background only sectional image selection means which outputs sectional images in answer to specified number in order of nearer value to the mean value and the standard deviation of the prescribed characteristic value instructed beforehand as a sectional image whose probability of including only a background is high, a background only sectional image selection means for comparing a standard deviation of the prescribed characteristic value of the sectional image whose probability of including only the background is high with a standard deviation of the prescribed characteristic value of another sectional images, thus judging to be outputted the sectional image having a standard deviation whose difference between the standard deviation concerned and a standard deviation of the prescribed value of the sectional image whose probability of including only the background is high as a sectional image including only a background, and a background only sectional image statistic storage means storing the location of the sectional image including only the background and the mean value and the standard deviation of the prescribed characteristic value of the sectional image concerned, thus outputting them whenever necessary.

12. A device of object detectable and background removal for enabling an object to be automatically detected minutely and accurately as far as contours, as claimed in claim 6, wherein said background sectional image selection means selects a sectional image whose probability of including only a background is high from sectional image involved in an area instructed beforehand.

13. A device of object detectable and background removal for enabling an object to be automatically detected minutely and accurately as far as contours, as claimed in claim 6, wherein said background sectional image selection means selects a sectional image whose probability of including only a background is high from sectional images involved in a plurality of areas instructed beforehand.

14. A device of object detectable and background removal for enabling an object to be automatically detected minutely and accurately as far as contours, as claimed in claim 6, wherein said threshold generation object detectable and background removal means comprises a threshold generation means, when receiving a command for calculating threshold after the mean value and the standard deviation of the prescribed characteristic value by way of the background in the whole sectional image had been estimated, a first threshold is obtained in such a way that the method causes a standard deviation multiplied by a constant given beforehand to be subtracted from the mean value by using the mean value and the standard deviation of the prescribed characteristic value by way of the estimated background in the whole sectional images for the sake of detecting object and removing background, and a second threshold is obtained in such a way that it causes a standard deviation multiplied by a constant given beforehand to be added to the mean value, thus the first and the second thresholds are calculated over whole picture to be outputted, a threshold processing means taking pixels involved between two thresholds to be a background, a background candidate area detection means detecting area connecting together to the pixel judged as the background, by way of an area to be candidate of a background, and a background judgement means taking a candidate area including the greatest number of sectional images whose probability of including only the background is high to be background areas and taking another candidate areas to be target objects.

15. A device of object detectable and background removal for enabling an object to be automatically detected minutely and accurately as far as contours, as claimed in claim 6, wherein said threshold generation object detectable and background removal means comprises a threshold generation means, when receiving a command for calculating threshold after the mean value and the standard deviation of the prescribed characteristic value by way of the background in the whole partial image had been estimated, a first threshold is obtained in such a way that the method causes a standard deviation multiplied by a constant given beforehand to be subtracted from the mean value by using the mean value and the standard deviation of the prescribed characteristic by way of the estimated background in the whole sectional images for the sake of detecting object and removing background, and a second threshold is obtained in such a way that the method causes a standard deviation multiplied by a constant given beforehand to be added to the mean value, thus the first and the second thresholds are calculated over whole picture to be outputted, a threshold processing means taking pixels involved between two thresholds to be a background, a background candidate area detection means detecting area connecting together to the pixel judged as the background, by way of an area to be candidate of a background, and a background judgement means taking a candidate area including the greatest number of sectional images including only the background to be background areas and taking another candidate areas to be target objects.

16. A device of object detectable and background removal for enabling an object to be automatically detected minutely and accurately as far as contours, as claimed in claim 6, wherein said threshold generation object detectable and background removal means comprises a threshold generation means, when receiving a command for calculating threshold after the mean value and the standard deviation of the prescribed characteristic value by way of the background in the whole partial image had been estimated, a first threshold is obtained in such a way that the method causes a standard deviation multiplied by a constant given beforehand to be subtracted from the mean value by using the mean value and the standard deviation of the prescribed characteristic by way of the estimated background in the whole sectional images for the sake of detecting object and removing background, and a second threshold is obtained in such a way that the method causes a standard deviation multiplied by a constant given beforehand to be added to the mean value, thus the first and the second threshold are calculated over whole picture to be outputted, a threshold processing means taking pixels involved between two thresholds to be a background, a background candidate area detection means detecting area connecting together to the pixel judged as the background, by way of an area to be candidate of a background, and a background judgement means taking a candidate area including the smallest number of sectional images except backgrounds to be background areas and taking another candidate areas to be target objects.

* * * * *